United States Patent [19]
Suzuki et al.

[11] Patent Number: 6,016,543
[45] Date of Patent: Jan. 18, 2000

[54] MICROPROCESSOR FOR CONTROLLING THE CONDITIONAL EXECUTION OF INSTRUCTIONS

[75] Inventors: Kazumasa Suzuki; Atsushi Mohri; Akira Yamada; Toyohiko Yoshida, all of Tokyo, Japan

[73] Assignee: Mitsubishi Denki Kabushiki Kaisha, Tokyo, Japan

[21] Appl. No.: 08/942,295

[22] Filed: Oct. 1, 1997

[30] Foreign Application Priority Data

May 14, 1997 [JP] Japan .................................. 9-124525
May 14, 1997 [JP] Japan .................................. 9-124526

[51] Int. Cl.[7] .................................................. G06F 11/14
[52] U.S. Cl. ........................ 712/233; 712/234; 712/216; 712/219
[58] Field of Search ........................ 395/800.01, 800.32, 395/800.36, 580, 581, 582; 712/1, 32, 36, 233, 234, 235, 216, 217, 218, 219

[56] References Cited

U.S. PATENT DOCUMENTS

| | | | |
|---|---|---|---|
| 4,513,393 | 4/1985 | Edlund et al. | 395/825 |
| 4,594,651 | 6/1986 | Jaswa et al. | 364/131 |
| 4,982,402 | 1/1991 | Beaven | 364/228 |
| 5,136,697 | 8/1992 | Johnson | 395/586 |
| 5,333,281 | 7/1994 | Nishikana et al. | 395/394 |
| 5,404,552 | 4/1995 | Ikenaga | 395/800.41 |
| 5,461,715 | 10/1995 | Matsuo et al. | 395/388 |
| 5,636,353 | 6/1997 | Ikenaga et al. | 395/394 |
| 5,644,138 | 7/1997 | Takeshi | 250/492.22 |
| 5,717,946 | 2/1998 | Satou et al. | 712/225 |
| 5,815,696 | 9/1998 | Tanaka et al. | 712/233 |

OTHER PUBLICATIONS

U. S. Pat. application Ser. 1 No. 08/783,445, "Microprocessor Having Conditional Execution Instruction," Jan. 16, 1997.

"Arm Data Manual VL86C00, " VLSI Technology, Inc., (1990), pp. 2–3 to 2–29.

A strategy for avoiding pipeline Interlock delays in a Microprocessor (IEEE, 1990).

*Primary Examiner*—Meng-Ai T. An
*Assistant Examiner*—Mackly Monestime

[57] ABSTRACT

In a microprocessor having conditional execution instructions, an execution halt circuit incorporated in an instruction decoder temporarily halts the execution of a current instruction according to the operation result of a preceding instruction in a program. When a conditional execution decision circuit judges to cancel the execution of the preceding instruction, the conditional execution decision circuit cancels a start signal indicating to initiate the operation of the preceding instruction. Furthermore, the conditional execution decision section or circuit judges whether a conditional data stored in a general purpose flag is equal to a condition stored in an execution conditional field, and bypass control sections control use of bypasses and data passes for data transfer operation according to the decision result of the conditional execution decision section.

19 Claims, 33 Drawing Sheets

FIG.6

| CODE : FORMAT | EXECUTION ORDER | |
|---|---|---|
| | OPERATION_0 | OPERATION_1 |
| FM=00 : TWO INSTRUCTIONS | FIRST | FIRST |
| 01 : TWO INSTRUCTIONS | FIRST | SECOND |
| 10 : TWO INSTRUCTIONS | SECOND | FIRST |
| 11 : ONE INSTRUCTION | FIRST | ... |

FIG.7

CODE : CONDITIONS TO BE EXECUTED

CC=000 : ALWAYS

001 : F0=TRUE          AND  F1=DON'T CARE

010 : F0=FALSE         AND  F1=DON'T CARE

011 : F0=DON'T CARE    AND  F1=TRUE

100 : F0=DON'T CARE    AND  F1=FALSE

101 : F0=TRUE          AND  F1=TRUE

110 : F0=TRUE          AND  F1=FALSE

111 : RESERVED

FIG.8

| Format | 0 | 7 | 9 | 15 | 21 | 27 | | |
|---|---|---|---|---|---|---|---|---|
| Short_M | OPCODE (120) | X (124) | Ra (121) | Rb (122) | SOURCE (123) | | 111 | |

| Short_A | OPCODE (120) | X' 0 (125) | Ra (121) | Rb (122) | SOURCE (123) | 112 |

| Short_B1 | OPCODE (120) | 0 0 | 0 | 0 | Rc (126) | 113 |

| Short_B2 | OPCODE (120) | 1 0 | DISPLACEMENT :18 (127) | 114 |

| Short_B3 | OPCODE (120) | Y Z (129)(130) | Ra (121) | SOURCE (128) | 115 |

| Short_D1 | OPCODE (120) | Y 0 (129) | Ra (121) | SOURCE (128) | 116 |

| Short_D2 | OPCODE (120) | Y 0 (129) | ct:6 (131) | SOURCE (128) | 117 |

| Long1 | 0 ... 7 9 15 21 ... 53 | | |
| | OPCODE (120) | 1 0 | Ra (121) | Rb (122) | IMMEDIATE VALUE:32 (132) | 118 |

| Long2 | OPCODE (120) | 1 Z (133) | Ra (121) | Rb (122) | IMMEDIATE VALUE:32 (132) | 119 |

(123)
X=00 =>SOURCE=Rc
X=01 =>SOURCE=Rc ; Rb++
X=11 =>SOURCE=Rc ; Rb· ·
X=10 =>SOURCE=IMMEDIATE
VALUE : 6

(123)
X'=0 =>SOURCE=Rc
X'=1 =>SOURCE=IMMEDIATE
VALUE : 6

(128)
Y=0 =>SOURCE=Rc
Y=1 =>SOURCE=IMMEDIATE
VALUE : 12

Z=0 =>TEST FOR ZERO
Z=1 =>TEST FOR NOT ZERO

FIG.9A

GENERAL PURPOSE REGISTER 5

| | 0 | 15 16 | 31 140 |
|---|---|---|---|
| R0=0 | R0H=0 | | R0L=0 |
| R1 | R1H | | R1L |
| R2 | R2H | | R2L |
| | ... | | |
| R62=LINK | R62H | | R62L |
| R63=SPU | R63H | | R63L | 141
| R63=SPI | R63H | | R63L | 142

FIG.9B

CONTROL REGISTER 150

| | 0 | 31 151 |
|---|---|---|
| CR0 | PC : PROGRAM COUNTER | |
| CR1 | PSW : PROCESSOR STATUS WORD | 10 |
| CR2 | BPC : BACKUP PROGRAM COUNTER | |
| CR3 | BPSW : BACKUP PROCESSOR STATUS FLAG | |
| CR4 | RESERVED | |
| CR5 | RESERVED | |
| CR6 | RPT_C : REPEAT COUNTER | |
| CR7 | RPT_S : REPEAT START ADDRESS | |
| CR8 | RPT_E : REPEAT END ADDRESS | |
| CR9 | MOD_S : MODULO START ADDRESS | |
| CR10 | MOD_E : MODULO END ADDRESS | |
| CR11 | IBA : INSTRUCTION BREAK ADDRESS | |

FIG.9C

ACCUMULATOR 18

| | 0 | 31 32 | 63 |
|---|---|---|---|
| A0 | A0H | | A0L |
| A1 | A1H | | A1L |

FIG.10

| 0 | | | | | | | 7 | 8 | | | | | | | 15 | |
|---|---|---|---|---|---|---|---|---|---|---|---|---|---|---|---|---|
| SM | 0 | EA | DB | 0 | IE | RP | MD | 0 | 0 | 0 | 0 | 0 | 0 | 0 | 0 | 170 |
| 171 | | 172 | 173 | | 174 | 175 | 176 | | | | | | | | | |

| 16 | | | | | | | 23 | 24 | | | | | | | 31 | |
|---|---|---|---|---|---|---|---|---|---|---|---|---|---|---|---|---|
| 0 | F0 | 0 | F1 | 0 | F2 | 0 | F3 | 0 | F4 | 0 | F5 | 0 | F6 | 0 | F7 | 180 |
| | 181 | | | | 182 | | | | | | | | | | | |

SM=0 STACK MODE 0 --> SPU IS USED
SM=1 STACK MODE 1 --> SPI IS USED
EA=0 SDBT IS NOT DETECTED
EA=1 SDBT IS DETECTED
DB=0 CONTEXT IS NOT BEING DEBUGGED
DB=1 CONTEXT IS BEING DEBUGGED

IE=0 INTERRUPTS ARE MASKED
IE=1 INTERRUPTS ARE ACCEPTED
RP=0 A BLOCK REPEAT IS INACTIVE
RP=1 A BLOCK REPEAT IS ACTIVE
MD=0 MODULO ADDRESSING IS DISABLE
MD=1 MODULO ADDRESSING IS ENABLED

F0 EXECUTION CONTROL FLAG
F1 EXECUTION CONTROL FLAG
F2 GENERAL FLAG
F3 GENERAL FLAG
F4(S) SATURATION FLAG
F5(V) OVERFLOW FLAG
F6(VA) ACCUMULATED OVERFLOW FLAG
F7(C) CARRY/BORROW FLAG

BYPASS SELECTION SIGNAL

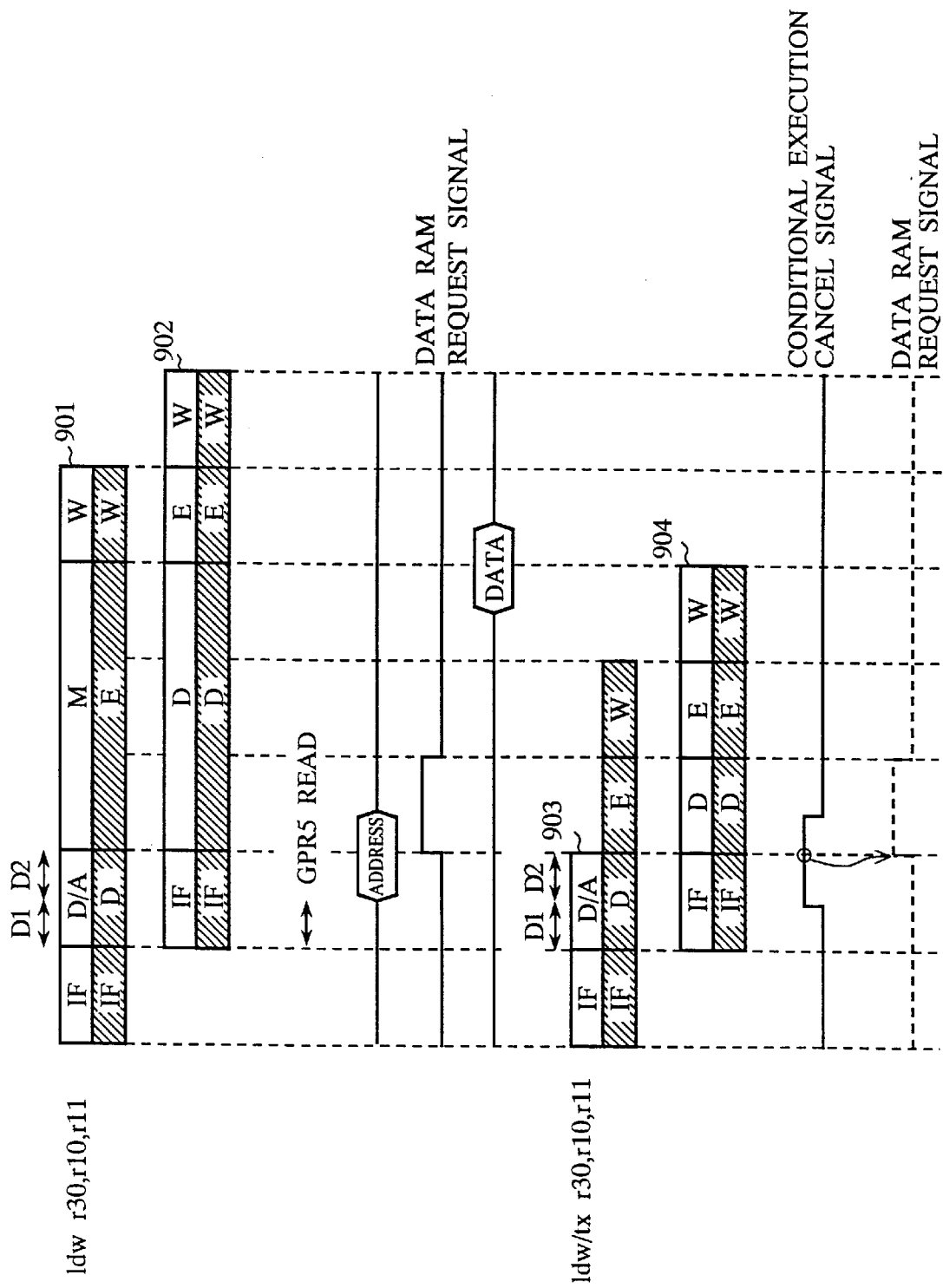

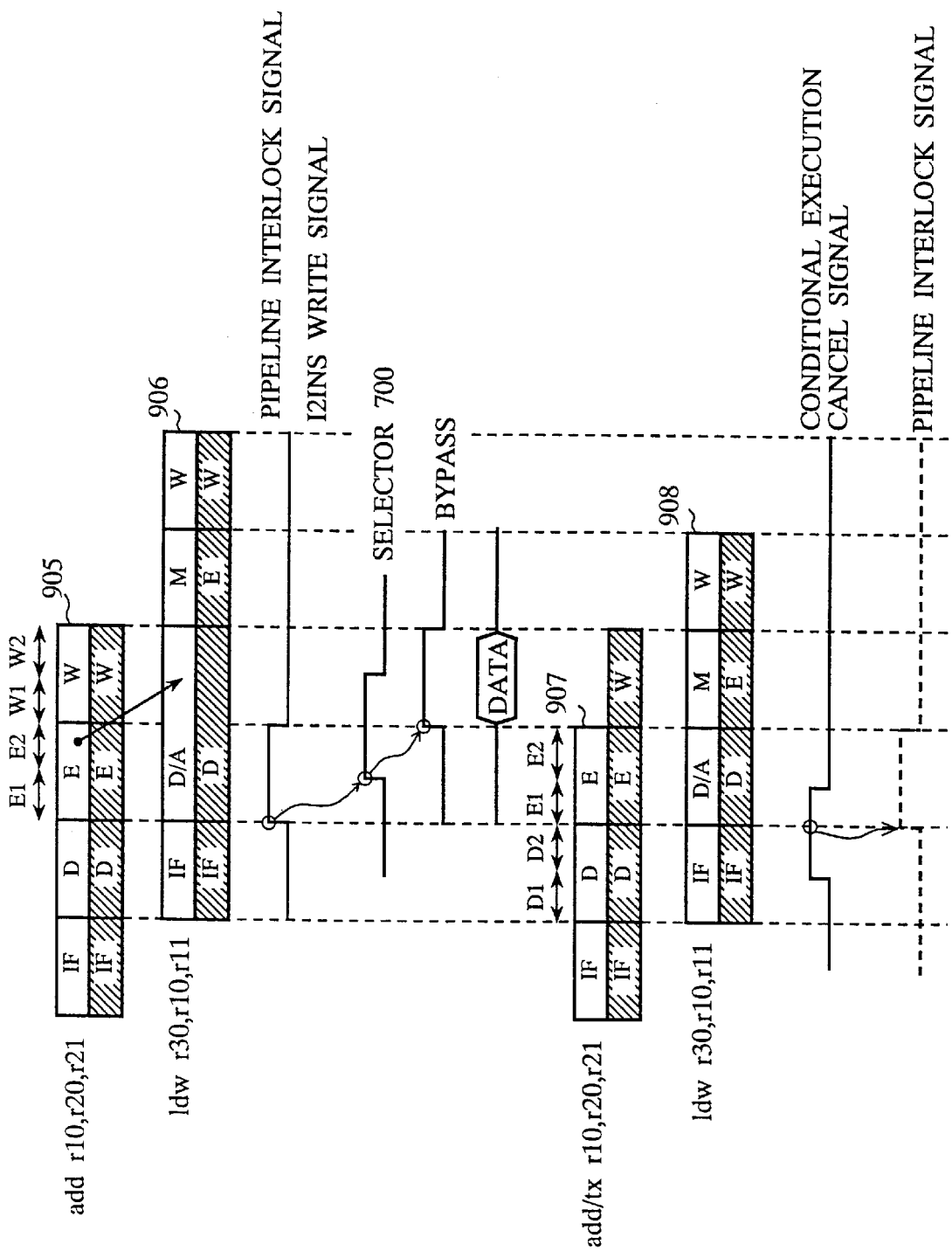

MICROPROCESSOR FOR CONTROLLING THE CONDITIONAL EXECUTION OF INSTRUCTIONS

BACKGROUND OF THE INVENTION

1. Field of the Invention

The present invention relates to a microprocessor having conditional execution instructions that is capable of controlling the execution of the instructions.

2. Description of the Prior Art

Recently, methods such as conditional executions and speculative instructions have been discussed in order to reduce branch penalty. A conventional ARM microprocessor capable of executing conditional executions uses dedicated flags such as a negative flag (N), a zero flag (Z), a carry flag (C), and an overflow flag (V) that are used for the decision of conditional execution.

Furthermore, in the past, there is a method in which one instruction is divided into a plurality of stages and the plurality of stages are executed in pipeline in order to increase the performance of a microprocessor.

FIG. 1 is a block diagram showing the configuration of a core of a conventional multimedia (MMA) microprocessor. In FIG. 1, the reference number 1900 designates a processor core of the conventional MMA microprocessor, 1901 denotes one execution unit incorporated in the MMA microprocessor, 1902 indicates another execution unit for executing instructions of the MMA microprocessor, and 1904 designates a data random access memory (a data RAM). Thus, the conventional MMA microprocessor is capable of executing two sub-instructions simultaneously included in a single instruction by using the execution units 1901 and 1902.

The execution unit 1901 comprises a multiplier 1910, an accumulator (ACC) 1911, a shifter 1912, and an arithmetic logic unit (ALU) 1913. The execution unit 1902 comprises an ALU 1914 and a load store unit 1915. The reference numbers 1920 and 1921 denote source data buses used for operation units such as the multiplier 1910, the accumulator 1911, the shifter 1912 and the ALU 1913 included in the execution unit 1901, through which data items to be used for the operation are read from the general purpose register file 1903 and then the data items are transferred. The reference numbers 1930 and 1931 designates source buses used for the arithmetic logic unit (ALU) 1914 and the load store unit 1915 included in the execution unit 1902, through which data items to be used for operation are read from the general purpose register file 1903.

The reference number 1925 designates a write-back bus through which the operation results of the multiplier 1910 and the ALU 1913 and so on incorporated in the execution unit 1901 are written into the general purpose register file 1903. The reference numbers 1932 and 1933 denote write-back buses through which the operation result in the execution unit 1902 is written into the general purpose register file 1903. The reference numbers 1922 and 1933 designate internal buses through which the operation result of the multiplier 1910 is transferred to the accumulator 1911 in order to accumulate it without penalty. The reference number 1940 designates bi-directional buses, through which the load/store unit 1915 and the data RAM 1904 are connected to each other, used for controlling load/store operation of operand data items.

FIG. 2 is a block diagram showing a pipeline of a part of the circuit of the execution unit 1901 incorporated in the conventional MMA microprocessor shown in FIG. 1. In FIG. 2, the reference number 1903 designates the general purpose register file, 1913 denotes the ALU, and 1910a and 1910b indicate parts used for multiplication operation, namely, tree circuit of Wallace and CPA, respectively.

In the execution unit 1901, it is possible to execute the multiplication operation within two stages in the pipeline. The reference number 1921 designates a source data bus through which source data items are read from the general purpose register file 1903. The reference number 1925 denotes a write-back bus through which the operation result is written into the general purpose register file 1903. The reference numbers 1970, 1971 and 1972 denote tri-state buffers for driving data to the source data bus 1921. The reference number 1980 designates a bypass for outputting the operation result of the ALU 1913 to the source data bus 1921, and 1981 indicates a bypass for outputting the multiplication result to the source data bus 1921.

As shown in FIG. 2, the execution of one instruction in the execution unit 1901 requires six stages of a pipeline, a Fetch (F) stage, a Decode (D) stage, a data Read (R) stage, an Execution (E) stage, a Memory access (M) stage, and a Write (W) back stage. Each of these six stages is executed in the pipeline. Thus, in order to execute one instruction in the six pipeline stages, data pass registers (DR) 1950, 1951, 1952, 1953, 1954, 1955, and 1956 shown in FIG. 2 are incorporated in the conventional MMA microprocessor core 1900. The reference number 1960 designates an instruction decoder. Control signals are generated in pipeline. Control pass registers (CR) 1961, 1962, 1963, and 1964 used for control passes are incorporated in the conventional MMA microprocessor core 1900.

The output signal from the control pass register 1962 is a write enable signal used for the data pass register 1950. The output signal from the control pass register 1963 is a write enable signal used for the tri-state buffers 1971 and 1972. The output signal from the control pass register 1964 is a write enable signal used for the tri-state buffer 1970.

FIG. 3 is a timing chart of the pipeline of the instruction to be executed in the conventional MMA microprocessor shown in FIG. 1. As shown in FIG. 3, one instruction is executed in six stages of the pipeline. The white sections designate the pipelines of sub-instructions executed by the execution unit 1901 and the black sections denote the pipelines of sub-instructions executed by the execution unit 1902. Specifically, the reference number 1000 designates the pipeline of the sub-instruction executed by the execution unit 1901. The reference number 1001 denotes the pipeline of the sub-instruction executed by the execution unit 1902. These pipelines 1000 and 1001 are executed simultaneously. The reference number 1002 denotes the pipeline of the sub-instruction of a following instruction executed by the execution unit 1901 only when no data hazard occurs between this pipeline 1002 and the pipelines 1000 and 1001. The reference number 1003 indicates the pipeline of the sub-instruction of a following instruction executed by the execution unit 1902 only when no data hazard is caused between this pipeline 1003 and the pipelines 1000 and 1001.

Because the conventional MMA microprocessor has the configuration described above, it is possible to execute a following instruction within the delay of one clock without causing any confusion of the pipeline stream only when there is no hazard between the preceding instruction and the following instruction.

The reference number 1005 designates the pipeline of the sub instruction executed by the execution unit 1902. The pipeline 1005 shows the data hazard between this sub instruction and the sub-instruction of the pipeline 1000. The reference number 1004 denotes the pipeline of the sub instruction executed by the execution unit 1901. Both the pipelines 1004 and 1005 are executed simultaneously.

As described above, when a data hazard occurs between the preceding instruction and the following instruction executed by the different execution units 1901 and 1902 and there is no bypass connected directly between the execution units 1901 and 1902 in the microprocessor. The execution of the following instruction must be delayed until the preceding instruction writes the operation result into the general purpose register file 1903.

In the conventional case described above, compared with the pipelines 1002 and 1003, the pipelines 1004 and 1005 causes a three clock penalty. Thus, the conventional microprocessors such as the MMA microprocessor executing a plurality of pipeline stages have the drawback in which the execution of the pipeline is halted temporarily and frequently in order to avoid occurrence of the data hazard.

In addition, previously, in order to increase the performance of a microprocessor, namely to increase the operation frequence of the microprocessor, there is a method in which operation results are transferred through a bypass when the microprocessor executes a plurality of pipelines. In this bypass method, for example, when the operation result of one instruction is written into the general purpose register file and a following instruction then reads the data in the general purpose register file, the following instruction can receive the operation result of the previous instruction through a dedicated bypass before the completion of the write process of the previous instruction to the general purpose register file. This method achieves to increase the performance of the microprocessor.

However, when the dedicated bypass is used and the previous instruction is a conditional execution instruction and when this previous conditional execution instruction becomes inactive based on the operation result of a conditional execution decision process, a wrong data item is transferred to the following instruction through the dedicated bypass. This causes an error in the operation of the microprocessor.

SUMMARY OF THE INVENTION

Accordingly, an object of the present invention is, with due consideration to the drawback of the conventional microprocessor that is capable of executing a plurality of pipelines, to provide a microprocessor having conditional execution instructions capable of canceling the halt operation of the pipeline in order to reduce the pipeline penalty when data hazard happens between the preceding instruction and the following instruction and when the execution of the pipeline is halted in order to avoid the data hazard and when the execution of the instruction that has halted the execution of the pipeline is canceled based on the execution result of a conditional execution decision process.

In addition, another object of the present invention is to provide a microprocessor having conditional execution instructions and having a bypass through which data items are transferred directly among operation units, capable of performing conditional execution instructions without causing wrong operations and with no penalty of a pipeline even if an instruction using the bypass is executed following the execution of the conditional execution instruction.

In accordance with one preferred embodiment of the present invention, there is provided a microprocessor having conditional execution instructions, comprising a memory section comprising an instruction RAM for storing instructions including the conditional execution instructions forming a program and a data RAM for storing data, an instruction decoder, connected to the memory section, for decoding the instructions, control registers for storing information to control execution of the instructions, a plurality of registers for storing the data, an operation unit for performing arithmetic operations, instruction execution units, connected to the instruction decoder, for performing the instructions according to output from the instruction decoder, an execution halt circuit for temporarily halting the execution of a current instruction, that is currently executed, according to a preceding instruction in the program, a conditional execution decision circuit for judging whether the current instruction is executed or not, and a conditional execution control circuit for canceling a starting signal indicating to initiate the execution of the preceding instruction when the conditional execution decision circuit decides to cancel the execution of the preceding instruction. It is thereby possible to eliminate the penalty of a pipeline.

In the microprocessor as another preferred embodiment of the present invention, the execution halt circuit halts the execution of the current instruction until a memory access completion signal indicating the completion of the memory accessing is transferred from the memory section when the preceding instruction accesses the memory section and it requires several clocks to transfer the memory access completion signal from the memory section, the operation of the conditional execution decision circuit is controlled according to the memory access completion signal transferred from the memory section, the conditional execution decision circuit decides whether the execution of the preceding instruction is permitted or not according to a value of conditional execution field in the current instruction and a value of a general purpose flag in the control registers, and the conditional execution control circuit cancels an access start signal to initiate the memory access operation of the preceding instruction when the conditional execution decision circuit decides to cancel the execution of the preceding instruction. Thus, when the execution of the load instruction as the preceding instruction is canceled based on the conditional execution decision process, the process including both the data RAM accessing process as well as the process to write loaded data to the general purpose registers is canceled. It is thereby possible to eliminate the penalty of a pipeline.

The microprocessor as another preferred embodiment of the present invention, further comprises a data interference decision circuit for judging whether a destination register designation field of the preceding instruction is equal to a source register designation field of the current instruction when the current instruction reads the operation result of the preceding instruction from a general purpose register in the memory section before the preceding instruction writes this operation result to the general purpose register, and a bypass through which the operation result of the preceding instruction is directly transferred to the instruction execution units to execute the current instruction without passing through the general purpose register, and wherein the execution halt circuit halts the execution of the current instruction until the operation result of the preceding instruction can be transferred through the bypass, and wherein the conditional execution decision circuit judges whether the execution of the preceding instruction can be performed or not according to the value of the execution conditional field in the preceding instruction and the value of the general purpose flag obtained from the control registers, and wherein the operation of the execution halt circuit and the bypass are controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit and cancels the control signal indicating to control the operation of the bypass for transferring the operation result of the preceding instruction to the instruction execution units to execute the current instruction. Thus, when the data interference occurs between the address calculation data of the current instruction and the operation result data obtained by the preceding instruction executed by the same instruction execution unit, and when the execution of the preceding instruction is canceled based on the decision result of the conditional execution decision process, the conditional execution cancel signal cancels both the pipeline interlock signal and the bypass selection signal. It is thereby possible to eliminate the penalty of a pipeline.

The microprocessor as another preferred embodiment of the present invention, further comprises a data interference decision circuit for judging whether a destination register designation field of the preceding instruction is equal to a source register designation field of the current instruction when the current instruction reads the operation result of the preceding instruction from a general purpose register in the memory section before the preceding instruction writes this operation result to the general purpose register, wherein the execution halt circuit halts the execution of the current instruction until the operation result of the preceding instruction is written into the general purpose register, and wherein the conditional execution decision circuit judges whether the execution of the preceding instruction can be performed or not according to the value of the execution conditional field in the preceding instruction and the value of the general purpose flag obtained from the control registers, and wherein the operation of the execution halt circuit is controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit. Thus, when the data interference occurs between the different instruction execution units and when the execution of the preceding instruction is canceled based on the decision result of the conditional execution decision process, the conditional execution cancel signal cancels the pipeline interlock signal. It is thereby possible to eliminate the penalty of a pipeline.

The microprocessor as another preferred embodiment of the present invention, further comprises a data interference decision circuit for judging whether a destination register designation field of the preceding instruction is equal to a source register designation field of the current instruction when the current instruction executed by a different instruction execution unit reads the operation result of the preceding instruction from a general purpose register in the memory section before the preceding instruction writes this operation result to the general purpose register, and a bypass through which the operation result of the preceding instruction is directly transferred to the different instruction execution unit to execute the current instruction without passing through the general purpose register, and wherein the execution halt circuit halts the execution of the current instruction until the operation result of the preceding instruction can be transferred through the bypass, and wherein the conditional execution decision circuit judges whether the execution of the preceding instruction can be performed or not according to the value of the execution conditional field in the preceding instruction and the value of the general purpose flag obtained from the control register, and wherein the operation of the execution halt circuit and the bypass is controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit, and also cancels the control signal indicating to control the operation of the bypass for transferring the operation result of the preceding instruction to the different instruction execution unit to execute the current instruction. Thus, when the data interference occurs between the load data of the load instruction executed by the memory access unit and source data of the multiply instruction executed by the integer operation unit, and when the execution of the preceding instruction is canceled based on the decision result of the conditional execution decision process, the conditional execution cancel signal cancels both the pipeline interlock signal and the bypass selection signal. It is thereby possible to eliminate the penalty of pipeline.

The microprocessor as another preferred embodiment of the present invention, further comprises a flag interference decision circuit for judging whether a destination flag designation field of the preceding instruction is equal to a source flag designation field of the current instruction when the current instruction reads the operation result of the preceding instruction from a general purpose flag in the control registers before the preceding instruction writes this operation result to the general purpose flag in the control registers, wherein the execution halt circuit halts the execution of the current instruction until the operation result of the preceding instruction is written into the general purpose flag in the control registers, and wherein the conditional execution decision circuit judges whether the execution of the preceding instruction can be performed or not according to the value of the execution conditional field in the preceding instruction and the value of the general purpose flag in the control registers, and wherein the operation of the execution halt circuit is controlled based on a control signal transferred from the flag interference decision circuit, and wherein when the conditional execution decision circuit judges to cancel the execution of the preceding instruction, the conditional execution control circuit cancels the control signal indicating to halt the execution of the current instruction transferred from the execution halt circuit. Thus, when the preceding instruction using a flag updates the value of the flag and the execution of the preceding instruction is canceled based on the decision result of the conditional execution decision process, the conditional execution cancel signal cancels the pipeline interlock signal. It is thereby possible to eliminate the penalty of a pipeline.

The microprocessor as another preferred embodiment of the present invention, further comprises a flag interference decision circuit for judging whether a destination flag designation field of the preceding instruction is equal to a source flag designation field of the current instruction when the current instruction performs a conditional execution decision by using a general purpose flag in the control registers before the preceding instruction writes this operation result to the general purpose flag in the control registers, wherein the execution halt circuit halts the execution of the current instruction until the operation result of the preceding instruction is written into the general purpose flag in the control registers, and wherein the conditional execution decision circuit judges whether the execution of the preceding instruction can be performed or not according to the value of the execution conditional field in the preceding instruction and the value of the general purpose flag in the control registers, and wherein the operation of the execution halt circuit is controlled based on a control signal transferred from the flag interference decision circuit, and wherein when the conditional execution decision circuit judges to cancel the execution of the preceding instruction, the conditional execution control circuit cancels the control signal indicating to halt the execution of the current instruction transferred from the execution halt circuit. Thus, when the preceding instruction as the conditional execution instruction updates the value of a conditional execution flag and the execution of the preceding instruction is canceled based on the decision result of the conditional execution decision process, the conditional execution cancel signal cancels the pipeline interlock signal. It is thereby possible to eliminate the penalty of a pipeline.

The microprocessor as another preferred embodiment of the present invention, further comprises a mode flag decision circuit for detecting whether the preceding instruction is an instruction to update the value of the mode flag in the control registers when the preceding instruction updates the mode flag in the control registers, wherein the execution halt circuit halts the execution of the current instruction until the preceding instruction updates the value of the mode flag in the control registers, and wherein the conditional execution decision circuit judges whether the execution of the preceding instruction can be performed or not according to the conditional execution field in the preceding instruction and the value of the general purpose flag obtained from the control registers, and wherein the operation of the execution halt circuit is controlled based on a control signal transferred from the conditional execution decision circuit, and wherein when the conditional execution decision circuit judges to cancel the execution of the preceding instruction, the conditional execution control circuit cancels the control signal indicating to halt the execution of the current instruction transferred from the execution halt circuit. Thus, when the execution of the instruction updating the mode flag is canceled based on the decision result of the conditional execution decision process, the conditional execution cancel signal cancels the pipeline interlock signal for the following instruction. It is thereby possible to eliminate the penalty of a pipeline.

The microprocessor as another preferred embodiment according to the present invention, further comprises a simultaneous use decision circuit for detecting whether or not sub-instructions in the preceding instruction use a data read/write pass simultaneously when the preceding instruction includes at least two sub-instructions and when the sub-instructions are executed by using the data read/write pass simultaneously between the operation unit and the general purpose registers, and a collision avoidance circuit for halting the execution of one of the sub-instructions in order to avoid the simultaneous use of the data read/write pass in the execution of the sub-instructions, and wherein the execution halt circuit for halting the execution of the current instruction during a time period equal to a time for the halting of the execution of the sub-instruction, and wherein the conditional execution decision circuit judges whether or not the execution of the preceding instruction can be performed according to the conditional execution field in the preceding instruction and the value of the general purpose flag in the control registers, and wherein the operation of the collision avoidance circuit and the execution halt circuit is controlled based on a control signal transferred from the conditional execution decision circuit, and wherein when the conditional execution decision circuit judges to cancel the execution of the preceding instruction, and when the simultaneous use of the data read/write pass is not used, the conditional execution control circuit cancels the control signal indicating the execution of the sub-instruction in the preceding instruction transferred from the collision avoidance circuit and the control signal indicating to halt the execution of the current instruction transferred from the execution halt circuit. Thus, when the pipeline interlock occurs by a resource conflict and when the execution of one of the bus-instructions causing the resource conflict is canceled based on the decision result of the conditional execution decision process, the conditional execution cancel signal cancels the pipeline stall signal. It is thereby possible to eliminate the penalty of a pipeline.

In accordance with one preferred embodiment of the present invention, there is provided a microprocessor having conditional execution instructions, comprising an instruction decoder for decoding instructions including the conditional execution instructions each having a conditional execution field and an operation field, registers comprising a general purpose flag to which an execution condition of the conditional execution instruction is set, an instruction execution section for executing the instruction according to output from the instruction decoder, a plurality of general purpose registers for storing execution results of the instruction executions; and a bypass incorporated in the instruction execution section for bypassing the operation result of the instruction, that has been executed previously, stored in the registers without passing through the plurality of general purpose registers. In this microprocessor, the instruction decoder comprises a conditional execution decision section for judging whether or not conditional data set in the general purpose register flag is equal to a condition set in the execution conditional field and a bypass control section for controlling use of the bypass according to a decision result of the conditional execution decision section. It is thereby possible to execute the instruction efficiently without causing any error operation or penalty of a pipeline, even if the instruction using the bypass is executed following the execution of the conditional execution instruction.

In the microprocessor as another preferred embodiment according to the present invention, the bypass control section comprises a bypass decision section for judging whether or not a data interference occurs in pipelines of the instruction executed by the instruction execution section, and a register output control section for controlling data transfer operation of the registers through the bypass according to the decision result of the bypass decision section, the conditional execution control section comprises a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section controls the operation of the registers and the plurality of general purpose registers and the bypass so that the data transfer through the registers and the bypass is halted and the data transfer through the general purpose registers is permitted according to the decision result transferred from the conditional execution decision section. It is thereby possible to execute the instruction efficiently without causing any error operation and the penalty of a pipeline, even if the instruction using the bypass is executed following the execution of the conditional execution instruction.

In accordance with another preferred embodiment according to the present invention, there is provided a microprocessor having conditional execution instructions, comprising an instruction decoder for decoding instructions including the conditional execution instructions each having a conditional execution field and an operation field, registers comprising a general purpose flag to which an execution condition of the conditional execution instruction is set, instruction execution sections for executing the instructions according to output from the instruction decoder, a plurality of general purpose registers for storing execution results of the instruction execution sections, a plurality of bypasses incorporated in the instruction execution sections for bypassing operation results of the instructions, that have been executed previously, stored in the registers, and a plurality of data passes for data transfer through the plurality of general purpose registers. In this microprocessor, the instruction decoder comprises a conditional execution decision section for judging whether or not a conditional data item set in the general purpose flag is equal to a condition set in the execution conditional field and a bypass control section for controlling data transfer through one of the plurality of bypasses and the plurality of data passes according to the decision of the conditional execution decision section. It is thereby possible to execute the instruction efficiently without causing any error operation or penalty of a pipeline, even if the instruction using the bypass is executed following the execution of the conditional execution instruction.

In the microprocessor as another preferred embodiment according to the present invention, the bypass control section comprises a bypass decision section for judging whether or not a data interference occurs in pipelines of the instructions executed by the instruction execution sections, and a register output control section for controlling data transfer operation of the registers through the bypasses according to the decision result of the bypass decision section, the conditional execution control section comprises a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section selects one of the plurality of bypasses and the data passes in order to perform the data transfer through the selected one according to the decision result transferred from the conditional execution decision section. It is thereby possible to execute the instruction efficiently without causing any error operation and the penalty of a pipeline, even if the instruction using the bypass is executed following the execution of the conditional execution instruction.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 6 is an explanation diagram showing a detailed configuration of an instruction format field (FM) in each of the instruction formats used in the microprocessor having conditional execution instructions according to the present invention shown in FIG. 4.

FIG. 7 is an explanation diagram showing a detailed configuration of the execution conditional field in each of the instruction formats, as shown in FIGS. 5A and 5B, used in the microprocessor of the present invention shown in FIG. 4.

FIG. 8 is an explanation diagram showing the configuration of operation fields such as 28 bit short type operation fields and 54 bit long type operation fields in the instruction formats shown in FIGS. 5A and 5B.

FIGS. 9A, 9B, and 9C are explanation diagrams showing the configuration of registers incorporated in the microprocessor having conditional execution instructions according to the present invention shown in FIG. 4.

FIG. 10 is an explanation diagram showing the configuration of registers incorporated in the microprocessor having conditional execution instructions according to the present invention shown in FIG. 4.

FIG. 19 is a timing chart showing a pipeline interlock cancel process for memory access executed in the microprocessor having conditional execution instructions as the first embodiment according to the present invention.

FIG. 20 is a timing chart showing a pipeline interlock cancel process for address calculation data executed in the microprocessor having conditional execution instructions as the second embodiment according to the present invention.

DESCRIPTION OF THE PREFERRED EMBODIMENTS

Other features of this invention will become apparent through the following description of preferred embodiments which are given for illustration of the invention and are not intended to be limiting thereof. Preferred embodiments of the microprocessor having conditional execution instructions according to the present invention will now be described with reference to the drawings.

Firstly, the basic configuration of the microprocessor having conditional execution instructions according to the present invention will be explained before the detailed explanation of the preferred embodiments of the microprocessor of the present invention.

Basic Configuration of the Microprocessor

Figure 1:
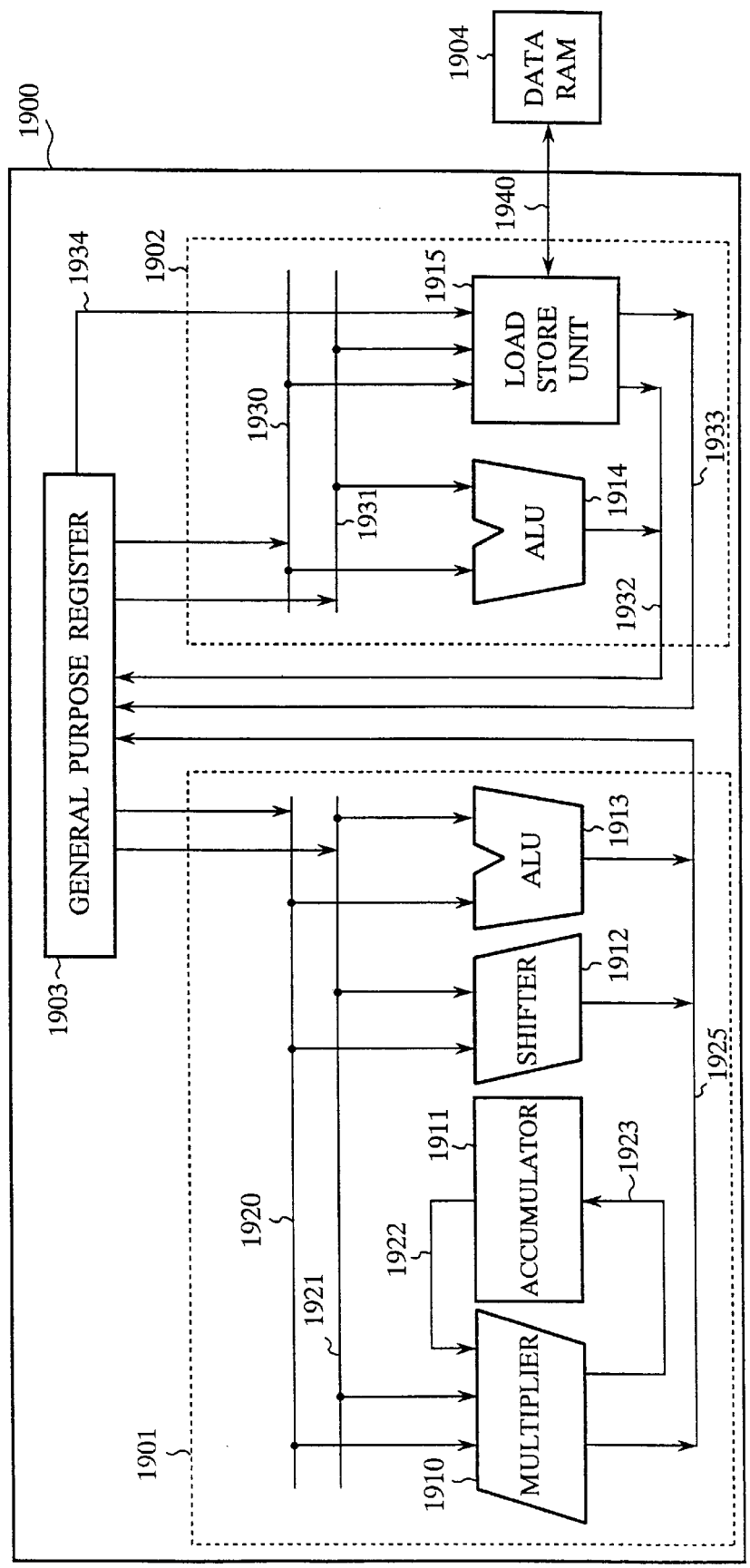
FIG. 1 is a block diagram showing the configuration of a core of a conventional MMA microprocessor.
Figure 2:
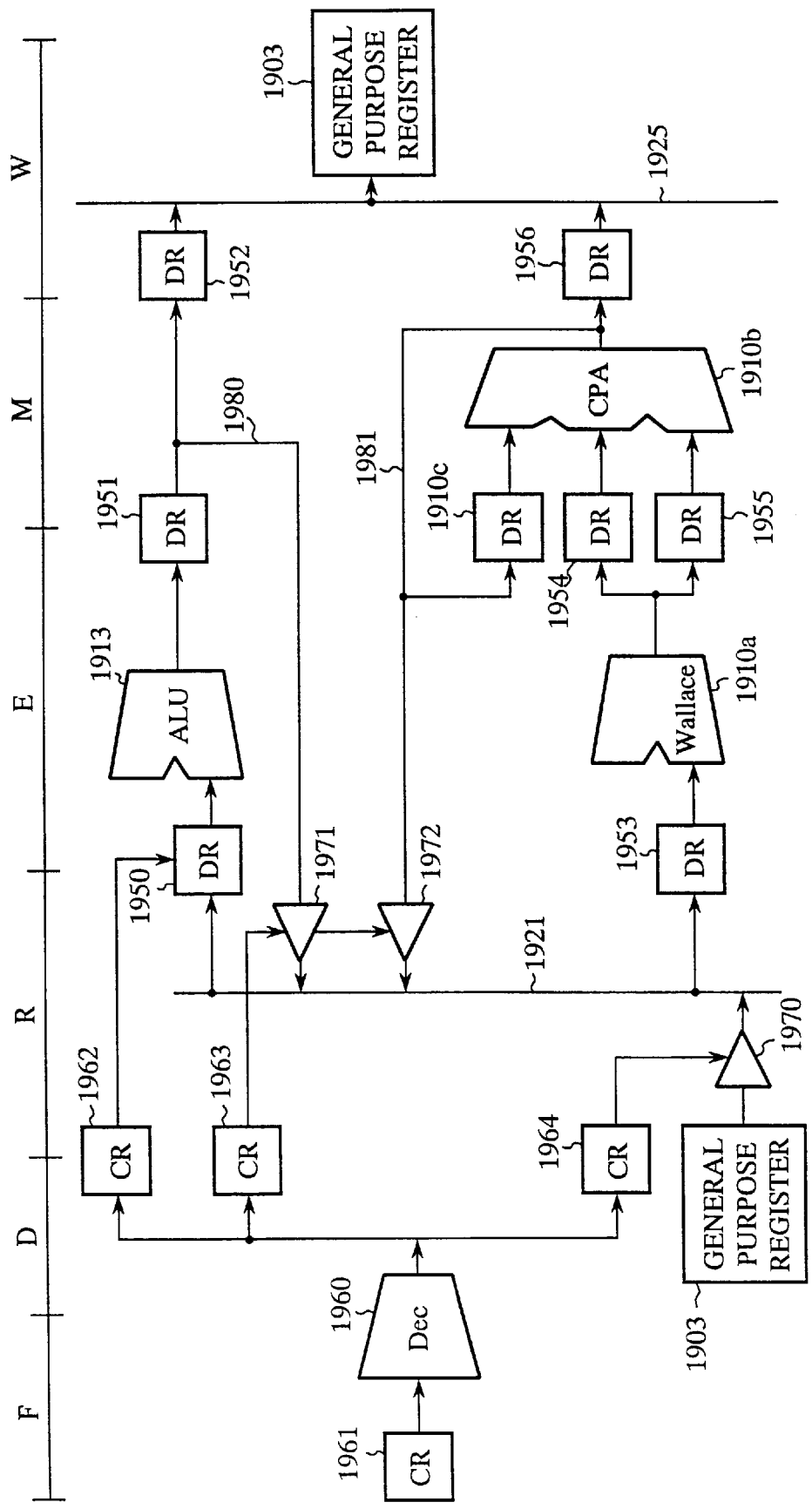
FIG. 2 is a block diagram showing a pipeline of a part of the circuit of the execution unit incorporated in the conventional MMA microprocessor shown in FIG. 1.
Figure 3:
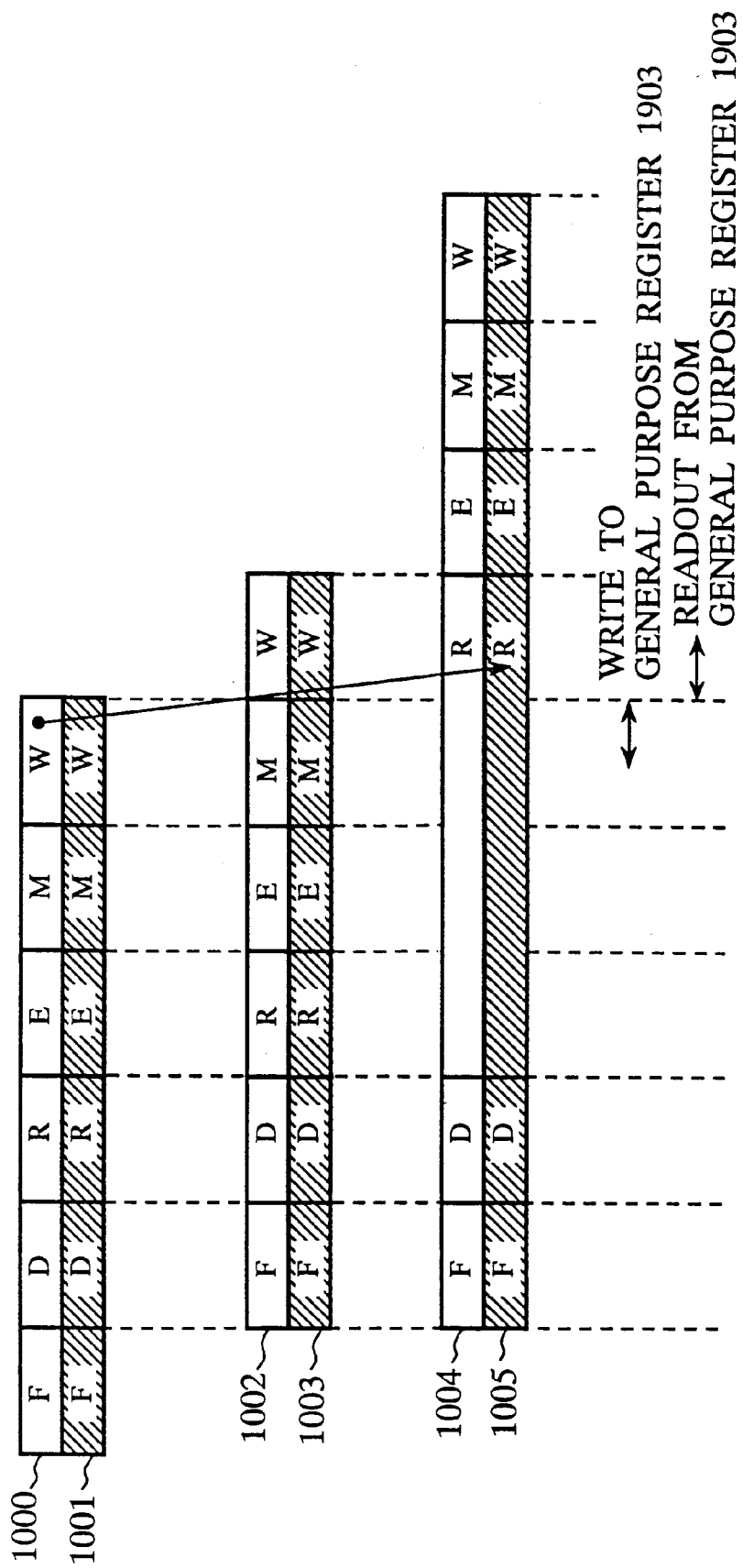
FIG. 3 is a timing chart of the pipeline of the instruction to be executed in the conventional MMA microprocessor shown in FIG. 1.
Figure 4:
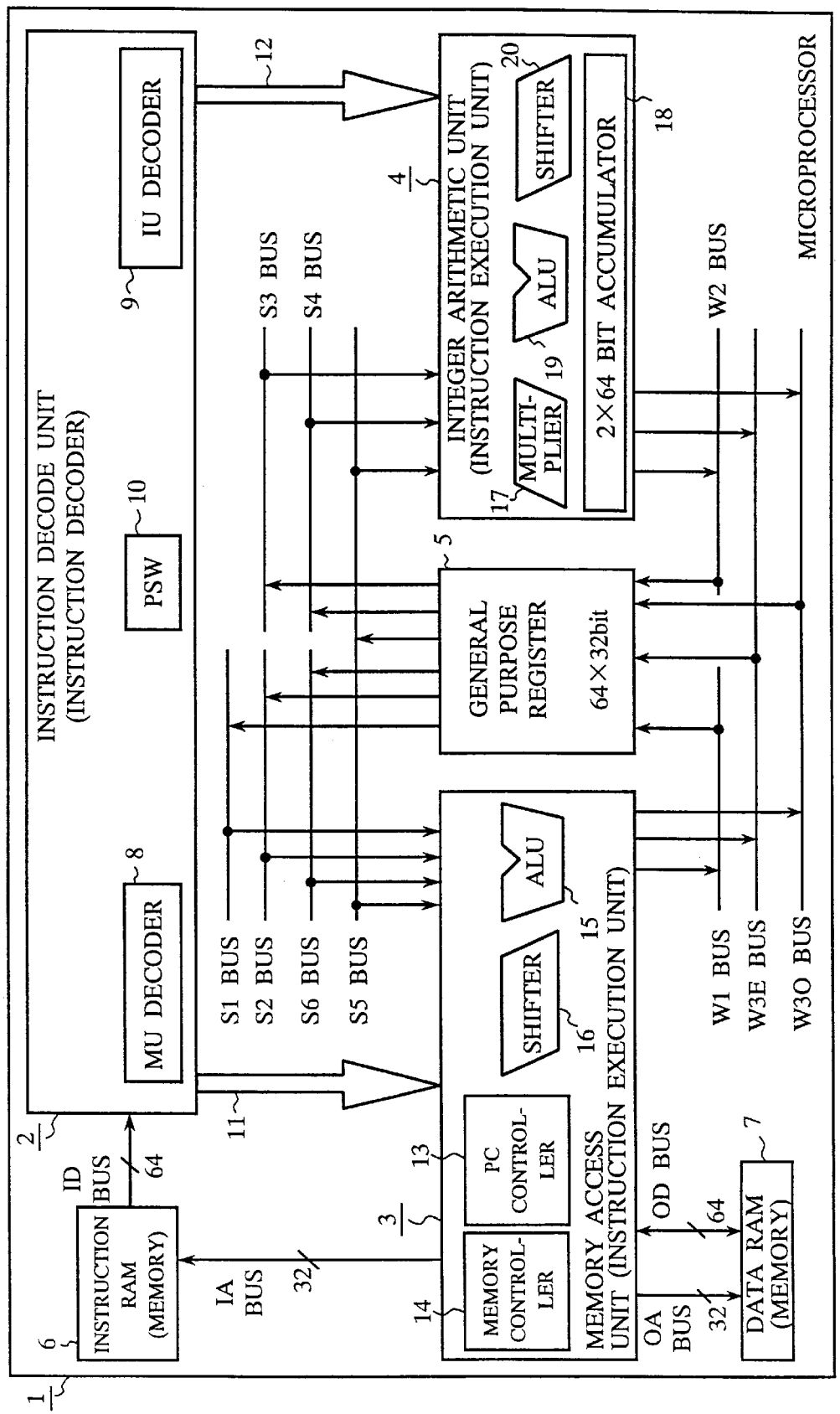
FIG. 4 is a block diagram showing the basic configuration of a microprocessor having conditional execution instructions according to the present invention.

FIG. 4 is a block diagram showing the basic configuration of a microprocessor having conditional execution instructions and 32 bit internal buses according to the present invention. In FIG. 4, the microprocessor core 1 comprises an instruction decode unit 2 as instruction decode means for decoding an instruction code received from an instruction RAM 6 through ID buses, a memory access unit 3 as instruction execution means, an integer operation unit 4 as instruction execution means for performing arithmetic operation and shift operation, a general purpose register file 5 comprising a plurality of register files of 32 bits×64 words, the instruction random access memory (RAM) 6 for performing address calculation, and a data RAM 7 for storing data.

The instruction decode unit 2 decodes instruction codes transferred from the instruction RAM 6 through a 64 bit wide ID bus by using the MU decoder 8 and the IU decoder 9 therein. The instruction decode unit 2 generates a control signal 11 to be transferred to the memory access unit 3 by using the decode result of the MU decoder 8 and the value stored in a processor status word (PSW) 10, and it also generates a control signal 12 to be transferred to the integer operation unit 4 based on the decode result of the IU decoder 9 and the value stored in the PSW 10.

The memory access unit 3 comprises a program counter (PC) control section 13, a memory control section 14, ALU 15, a shifter 16. The PC control section 13 calculates the PC value of a following instruction to be executed by adding or incrementing the PC value of the current instruction by eight 8 when the following instruction to be executed does not require a jump operation or is not a branch instruction. When the following instruction to be executed is a jump instruction or a branch instruction, the PC control section 13 adds the PC value of the current instruction to be executed by the value of a branch displacement or performs the calculation according to the addressing mode designated by the operation.

The memory control section 14 accesses the instruction RAM 6 based on the PC value calculated by the PC control section through the IA bus. In addition to this, the memory control section 14 accesses the data RAM 7 in order to get data required for executing instructions through the OA bus for transferring addresses of data in the data RAM 7 and the OD bus for transferring data stored in the data RAM 7. Then, the memory control section 14 transfers the accessed data items to the general purpose register file 5 through the OD bus.

The ALU 15 and the shifter 16 in the memory access unit 3 perform the arithmetic logical operation and the shift operation, respectively, by using data items of maximum 3 words transferred from the general purpose register file 5 through the 32-bit wide S1 bus, the 32 bit-wide S2 bus, the 32 bit-wide S6 bus. The operation results are transferred to the general purpose register file 5 through the W1 bus.

The 32 bit-wide data (maximum 4 words) read from the general purpose register file 5 is transferred to the memory access unit 3 through the S1 bus, S2 bus, S6 bus, and S5 bus as the maximum 4 word data. Thereby, it can execute a 2-word store instruction from the general purpose register file 5 to the data RAM 7.

In the execution of a two word data, a memory address is calculated by using two operands and then a two word data item is transferred to the data RAM 7. The memory access unit 3 transfers the operation result and the two word load data items transferred from the data RAM 7 to the general purpose register file 5.

The integer operation unit 4 comprises a multiplier 17, an accumulator 18, an ALU 19, and a shifter 20. Each of the multiplier 17, the ALU 19, and the shifter 20 performs the arithmetic logical operation and a shift operation by using a maximum 3 word data item transferred from the general purpose register file 5 through the 32-bit wide buses S3, S4, and S5. Then, the integer operation unit 4 transfers the operation result to the general purpose register file 5 through the W2 bus, W3E bus, and W3O bus.

The accumulator 18 accumulates or subtracts the result of the multiplication operation and stores the accumulated result. The maximum six kinds of register values read can be read simultaneously from the general purpose register file 5. Each of the data items read from the general purpose register file 5 is transferred to the S1 bus, S2 bus, S3 bus, S4 bus, S5 bus, and S6 bus, respectively. In addition to this, because the general purpose register 5 is connected to the W1 bus, W2 bus, W3E bus, and W3O bus, it is possible to write a maximum of four kinds of register values into the general purpose register file 5, through W1 bus, W2 bus, W3E bus, and W3O bus.

The instruction RAM 6 is connected to a 32-bit wide IA bus and a 64-bit wide ID bus. Thereby, an instruction data item of a 64-bit length corresponding to an address to be transferred through the IA bus is read from the instruction RAM 6. The data RAM 7 is connected to both a 32 bit-wide OA bus and a 64 bit-wide OD bus. The data item having a 64-bit length corresponding to an address transferred through the OA bus is written into the data RAM 7 and is also read from the data RAM 7.

Instruction Set and Registers

Figure 5A:
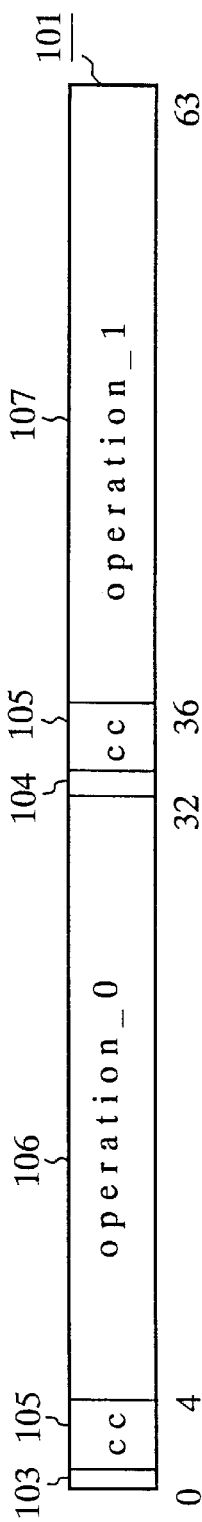
FIGS. 5A and 5B are explanation diagrams showing instruction formats used in the microprocessor having conditional execution instructions according to the present invention shown in FIG. 4.
Figure 5B:
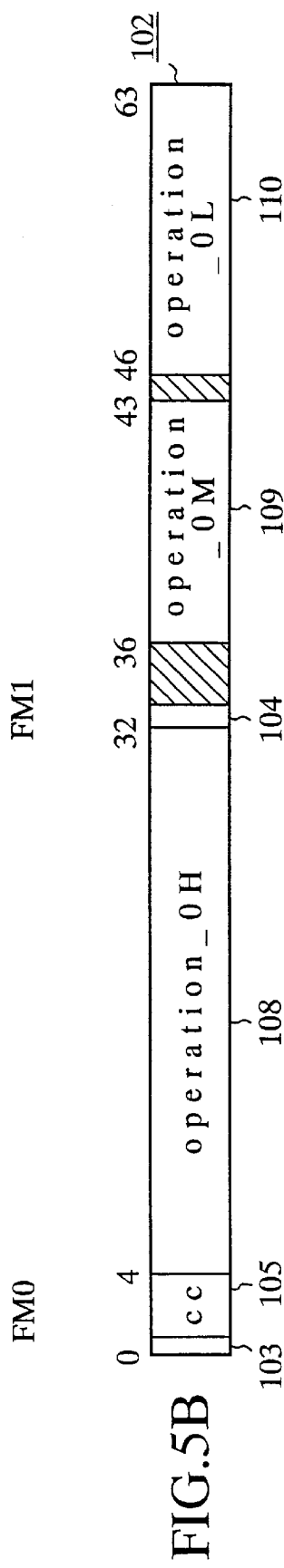

FIGS. 5A and 5B are explanation diagrams showing instruction formats used in the microprocessor 1 of the present invention shown in FIG. 4. As shown in FIGS. 5A and 5B, the microprocessor 1 according to the present invention has a two sub-instruction format 101 and a single instruction format 102, respectively. The two sub-instruction format 101 indicates two operations. The single instruction format 102 indicates one instruction.

The two sub-instruction format 101 includes a format field consisting of fields 103 and 104, two operation fields 106 and 107 and two 3-bit CC fields 105, namely execution conditional fields, related to the operation fields 106 and 107, respectively.

The single instruction format 102 has a format field consisting of fields 103 and 104, an operation field 108, an operation field 109, an operation field 110, and a 3-bit CC field 105, namely execution conditional fields related to the operation field 105.

FIG. 6 is an explanation diagram showing a detailed configuration of the format field (FM) that is made up of the fields 103 and 104 in each of the instruction format 101 and 102, as shown in FIGS. 5A and 5B. In FIG. 6, when FM=00, the instruction to be executed is a two-operation instruction. In this case, both operations, the operation_0 indicated by the operation field 106 and the operation_1 indicated by the operation field 107, are executed concurrently in the clock cycle immediately following the decoding operation. The operation_0 is executed in the memory unit 3 and the operation_1 is performed in the integer operation unit 4.

When FM=01, the instruction to be executed is a two-operation instruction. In this case, the operation_0 indicated by the operation field 106 is executed in the clock cycle immediately following the decoding operation and then operation_1 indicated by the operation field 107 is executed in a clock cycle which is delayed from the execution of the operation_0 by one cycle.

When FM=10, the instruction to be executed is a two operation instruction. In this case, the operation_1 indicated by the operation field 107 is executed in the clock cycle immediately following the decoding operation and then operation_0 indicated by the operation field 106 is executed in a clock cycle which is delayed from the execution cycle of the operation_1 by one cycle.

When FM=11, the instruction to be executed is a single operation instruction. In this case, the operation indicated by using the operation field consisting of the fields 108, 109, and 110 is executed in the clock cycle immediately following the decoding cycle.

FIG. 7 is an explanation diagram showing a detailed configuration of the execution conditional field (CC) 105 in each of the instruction formats 101 and 102, as shown in FIGS. 5A and 5B, used in the microprocessor 1 of the present invention shown in FIG. 4.

In FIG. 7, the 3-bit CC field 105, as the execution conditional field, determines whether the execution of the operation_0 in the operation fields 106 and 107, the execution of the operation_1 and the operations of the operation fields 108, 109, and 110 are active or inactive based on the status of the execution control flags, F0 and F1 flag bits in the VLIW microprocessor 1. These execution control flags F0 and F1 will be explained later in detail.

The operation results are written into the registers, the memories and the flags only when the execution control flags indicate an active operation. When an operation is inactive, its results are not written into the registers, the memories, and the flags, so that the operation results are the same as these of a NOP (No OPeration) instruction.

When the value CC of the execution conditional field 105 is zero (CC=000), the operation is always active regardless of values of the operation control flags F0 and F1.

When the conditional execution field CC=001, the operation is active only when the execution control flag F0=true. In this case, the state of the execution control flag F1 does not matter. When "/TX" is added in the instruction, it means CC=001.

When the conditional execution field CC=010, the operation is active only when F0=false. In this case, the status of the F1 flag does not matter. When "/TX" is added in the instruction, it means CC=010.

When the conditional execution field CC=011, the operation is active only when F1=true. In this case, the status of the F0 flag does not matter. When "/XT" is added in the instruction, it means CC=011.

When the conditional execution field CC=100, the operation is active only when F1=false. In this case, the status of the F0 flag does not matter. When "/XF" is added in the instruction, it means CC=100.

When the conditional execution field CC=101, the operation is active only when F0=true and F1=true. When "/TT" is added in the instruction, it means CC=101.

When the conditional execution field CC=110, the operation is active only when F0=true and F1=false. When "/TF" is added in the instruction, it means CC=110.

When the conditional execution field CC=111, the operation is undefined. The value CC=111 is not used in any instruction.

FIG. 8 is a diagram that gives a detailed explanation of the configuration of the operation fields such as the 28 bit short type operation fields 106, 107, and the 54 bit long type operation fields 108, 109, 110 in the instruction formats 101 and 102 shown in FIGS. 5A and 5B.

In FIG. 8, each of the short formats 111, 112, 113, 114, 115, 116, and 117 comprises the 28-bit short type operation field 106 or 107. Each of the formats 118 and 119 comprises the 54 bit long-length type operation fields 108, 109 and 110.

As shown in FIG. 8, Format 111 (Short M) consists of field 120 (a 8-bit opcode field) designating the type of operation, the two fields 121 and 122 (two 6-bit register specifier fields Ra and Rb) each designates a register number, field 123 (a 6-bit register specifier field) for specifying a register number or an immediate value, and field 124 (a 2-bit operand identifier X) for indicating the type of data stored in the field 123. The format 111 is used for load-store instructions such as memory access operations with register indirect addressing modes. As shown in FIG. 8, when the value X in the field 124 is "00", "01", or "11", the value of the field 123 indicates a register number. When "10", the value of the register 123 indicates an imediate value.

As shown in FIG. 8, Format 112 (Short_A) consists of field 120 (a 8-bit opcode field) designating the type of operation, the two fields 121 and 122 (two 6-bit register specifier fields Ra and Rb) each designates a register number, field 123 (a 6-bit register specifier field) for indicating a register number or an immediate value and field 125 (a 1-bit operand identifier Y) for indicating the type of data stored in the field 123. This format 112 is used for instructions such as arithmetic operations, logic operations, shift operations, bit operations and so on.

Format 113 (Short_B1) shown in FIG. 8 consists of field 120 (a 8-bit opcode field) designating the type of operation and field 126 (a 6-bit register specifier Rc field) for specifying a register number. This format 113 is used for jump instructions and branch instructions with an address specified in a register (Rc).

Format 114 (Short_B2) shown in FIG. 8 consists of field 120 (an 8-bit opcode field) designating the type of operation and field 127, an 18-bit displacement. This format 114 is used for jump instructions and branch instructions with an immediate 18-bit displacement.

Format 115 (Short_B3) Shown in FIG. 8 consists of field 120 (an 8-bit opcode field) for designating the type of operation, field 121 (a 6-bit register specifier Ra field) for designating a register number, field 128 for designating a register number or a 12-bit immediate value, field 129 for indicating whether the field 128 stores a register number or an immediate value, and field 130 for indicating whether a conditional jump operation or a conditional branch operation is performed based on the contents (zero decision) of the register specified in field 121. This format 115 is used for conditional jump instructions and conditional branch instructions.

Format 116 (Short_D1) shown in FIG. 8 consists of field 120 (an 8-bit opcode field) for designating the type of operation, field 121 (a 6-bit register specifier Ra field) for designating a register number, field 128 for designating a register number or a 12-bit immediate value and field 129 (a 1-bit operand identifier Y field) for specifying whether the content in field 128 is a register number or an immediate value. This format 116 is used for conditional jump instructions, conditional branch instructions, and repeat instructions.

Format 117 (Short_D2) shown in FIG. 8 consists of field 120 (an 8-bit opcode field) for designating the type of operation, field 128 for designating a register number or a 12-bit immediate value, field 129 (a 1-bit operand identifier Y field) for indicating whether the content in field 128 is a register number or an immediate value and field 131 (a 6-bit displacement field ct:6) used for delayed instructions. This format 117 is used for delayed jump instructions, and delayed branch instructions.

Format 118 (Long 1) consists of field 120 for designating the type of operation, the two fields 121 and 122 for designating register numbers and field 132 for designating a 32-bit immediate value. This format 118 is used for all instructions that take a 32-bit immediate operand such as complicated arithmetic operations, arithmetic operations using a large immediate value, memory access operation of register relative indirect addressing with a large displacement, branch instructions with a large displacement and jump instructions to absolute addresses.

Format 119 (Long 2) shown in FIG. 8 consists of field 120 (an 8-bit opcode field) for designating the type of operation, two fields 121 and 122 for designating register numbers, field 132 for designating a 32 bit immediate value, and field 133 for indicating either a conditional jump operation or a conditional branch operation is performed based on the content in fields 132 and 133 of a zero decision. This format 119 is used for conditional jump instructions and conditional branch instructions with a large branch displacement.

FIGS. 9A, 9B, and 9C are explanation diagrams showing the configuration of registers incorporated in the microprocessor 1 according to the present invention shown in FIG. 4.

The microprocessor 1 shown in FIG. 4 comprises the general purpose register file 5 including sixty-four 32-bit general purpose registers shown in FIG. 9A, twelve control registers 150 shown in FIG. 9B and two accumulators 18 shown in FIG. 9C. The value of the general purpose register (R0) 140 in the general purpose register file 5 is always zero. Therefore writing data into the register (R0) 140 has no effect.

The general purpose register (R63) is the stack pointer (SPU, SPI) operating, which serves as the user stack pointer (SPU) 141 or the interrupt stack pointer (SPI) 142 depending on the value of the SM field in the processor status word (PSW) 10.

The control registers 150 comprise a program counter 151, the PSW 10 and other dedicated registers.

In several operations that use format 112, the upper 16 bits and the lower 16 bits in each of the 64 general purpose registers 5 can be used independently.

FIG. 10 is a diagram showing detailed contents of the processor status word (PSW) 10 in the microprocessor 1 according to the present invention shown in FIG. 4.

As shown in FIG. 10, the upper 16 bits 170 in the PSW 10 includes the SM field 171 for switching the stack pointer, the EA field 172 for showing a detection of a software debugger trap (SDBT), the DB field 173 for enabling or disabling the SDBT, the IE field 174 for enabling or disabling interrupts, the RP field 175 for activating a repeat operation and the MD field 176 for enabling or disabling of modulo addressing.

The lower 16 bit field is a flag field 180. The flag field 180 includes 8 flags. The F0 flag field 181 and F1 flag 182 (execution control flags) are used in conjunction to the CC bits to decide whether each operation being executed by the CPU is active or inactive. The value of each flag is changed depending on results of comparison operations and flag logical operations, according to initialization operations for these flags, or by writing a register value into the flag field 180 in flag writing operations. Contents in the flag field 180 can be read out by flag-value readout operation.

Hereinafter, the instruction list used in the microprocessor 1 according to the present invention shown in FIG. 4 will be described.

A. Microprocessor Controlling Function Instructions

A-1. Load/Store Instructions

LDB: Load one byte to a register with sign extension
LDBU: Load one byte to a register with zero extension
LDH: Load one half-word to a register with sign extension
LDHH: Load one half-word to a register high
LDHU: Load one half-word to a register with zero extension
LDW: Load one word to a register
LD2W: Load two words to registers
LD4BH: Load four bytes to four half-words in two registers with sign extension
LD4BHU: Load four bytes to four half-words in two registers with zero extension
LD2H: Load two half-words to two words in two registers with sign extension
STB: Store one byte from a register
STH: Store one half-word from a register
STHH: Store one half-word from a register high
STW: Store one word from a register
ST2W: Store two words from two registers
ST4HB: Store four bytes from four half-words from two registers
ST2H: Store two half-words from two registers
MODDEC: Decrement a register value by a 5-bit immediate value
MODINC: Increment a register value by a 5-bit immediate value

A-2. Transfer Instructions

MVFSYS: Move a control register to a general purpose register
MVTSYS: Move a general purpose register to a control register
MVFACC: Move a word from an accumulator
MVTACC: Move two general purpose registers to an accumulator

A-3. Compare Instructions

CMPcc: Compare
    cc=EQ(equal), NE (not equal), GT(greater than), GE(greater than or equal), LT(less than), LE(less than or equal), PS(both positive), NG(both negative)
CMPcc: Compare unsigned
    cc=GT, GE, LT, LE

A-4. Maximum/Minimum Instructions reserved

A-5. Arithmetic Operation Instructions

ABS: Absolute
ADD: Add
ADDC: Add with carry
ADDHppp: Add half-word
    ppp=LLL(register lower, register lower, register lower), LLH(register lower, register lower, register higher), LHL, LHH, HLL, HLH, HHL, HHH
ADDS: Add register Rb with the sign of the third operand
ADDS2H: Add sign to two half-words
ADD2H: Add two pairs of half-words
AVG: Average with rounding towards positive infinity
AVG2H: Average two pairs of half-words with rounding towards positive infinity
JOINpp: Join two half-words
    pp=LL, LH, HL, HH
SUB: Subtract
SUBB: Subtract with borrow
SUBHppp: Subtract half-word
    ppp=LLL, LLH, LHL, LHH, HLL, HLH, HHL, HHH
SUB2H: Subtract two pairs of half-words

A-6. Logical Operation Instructions

AND: bitwise logical AND
OR: bitwise logical OR
NOT: bitwise logical NOT
XOR: bitwise logical exclusive OR
ANDFG: logical AND flags
ORFG: logical OR flags
NOTFG: logical NOT a flag
XORFG: logical exclusive OR flags

A-7. Shift Operation Instructions

SRA: Shift right arithmetic
SRA2H: Shift right arithmetic two half-words
SRC: Shift right concatenated registers
SRL: Shift right logical
SRL2H: Shift right logical two half-words
ROT: Rotate right
ROT2H: Rotate right two half-words

A-8. Bit Operation Instructions

BCLR: Clear a bit
BNOT: Invert a bit
BSET: Set a bit
BTST: Test a bit

A-9. Branch Instructions

BRA: Branch
BRATZR: Branch if zero
BRATNZ: Branch if not zero
BSR: Branch to subroutine
BSRTZR: Branch to subroutine if zero
BSRTNZ: Branch to subroutine if not zero
JMP: Jump
JMPTZR: Jump if zero
JMPTNZ: Jump if not zero
JSR: Jump to subroutine
JSRTZR: Jump to subroutine if zero
JSRTNZ: Jump to subroutine if not zero
NOP: No Operation

A-10. OS-related Instructions

TRAP: Trap
REIT: Return from exception, interrupts and traps

B. DSP Function Instructions

B-1. Arithmetic Operation Instructions

MUL: Multiply
MULX: Multiply with extended precision
MULXS: Multiply and shift to the right by one with extended precision
MULX2H: Multiply two pairs of half-words with extended precision
MULHXpp: Multiply two half-words with extended precision
    pp=LL, LH, HL, HH
MUL2H: Multiply two pairs of half-words
MACa: Multiply and add a (designates which accumulator to use)=0,1
MACSa: Multiply, shift to the right by one and add a=0,1
MSUBa: Multiply and subtract a=0,1
MSUBSa: Multiply, shift to the right by one and subtract a=0,1

B-2. Repeat Instructions

REPEAT: Repeat a block of instructions
REPEATI: Repeat a block of instructions with immediate repeat count Pipeline Operation of the Microprocessor 1

Figure 11:
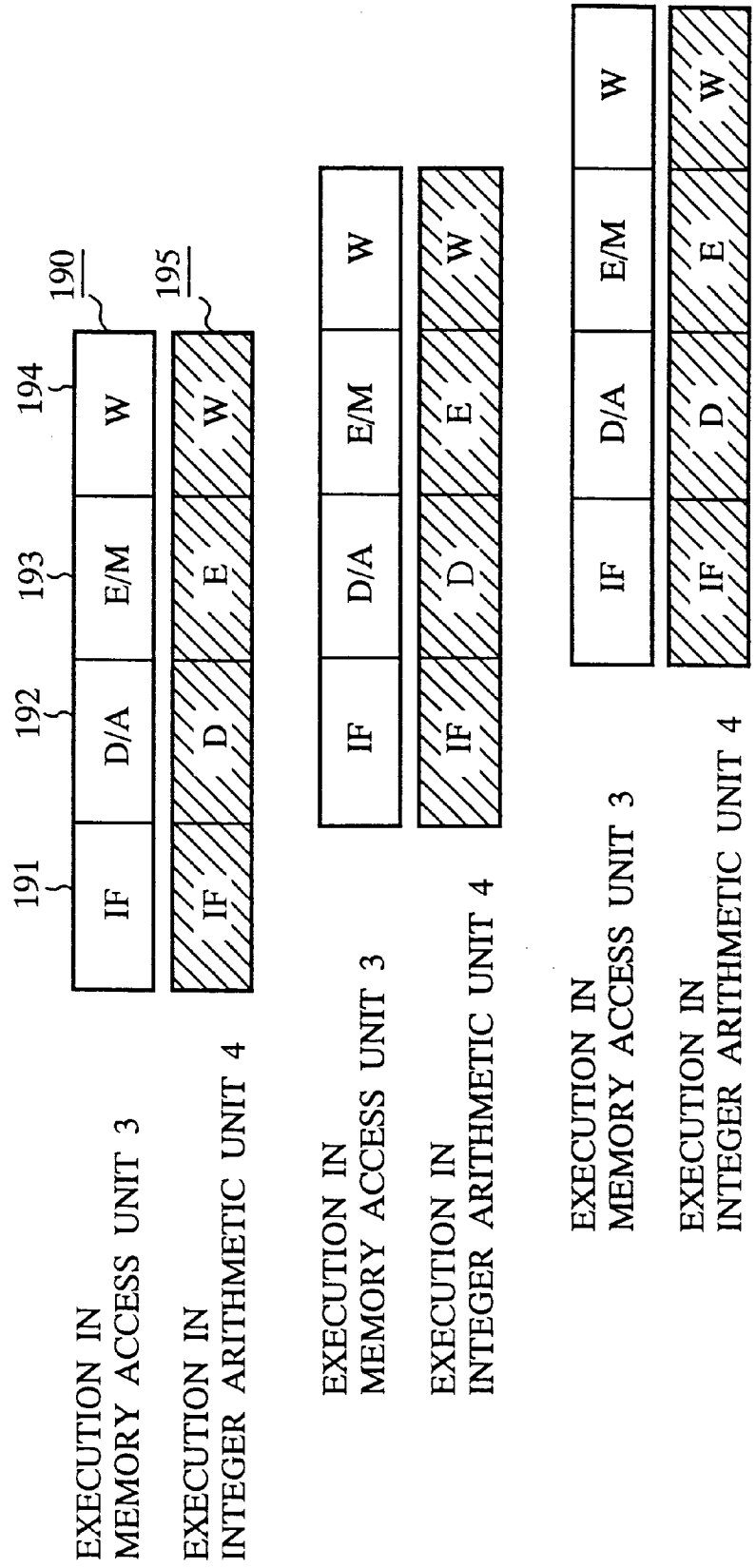
FIG. 11 is an explanation diagram showing a pipeline operation of the microprocessor having conditional execution instructions according to the present invention shown in FIG. 4.

FIG. 11 is an explanation diagram showing a pipeline operation of the microprocessor 1 having conditional execution instructions according to the present invention shown in FIG. 4. FIG. 11 shows a pipeline operation of execution (FM=00) of two instruction executed in parallel in the microprocessor 1. The pipeline comprises an instruction fetch (F) stage 191, a decode/address operation (D/A) stage 192, an execution memory access (E/M) stage 193, and a write back (W) stage 194.

When the two instructions are executed in parallel, both the pipeline 190 executed by the memory access unit 3 and the pipeline 195, indicated by the oblique line shown in FIG. 11, executed by the integer operation unit 4 are executed simultaneously in parallel.

Figure 12:
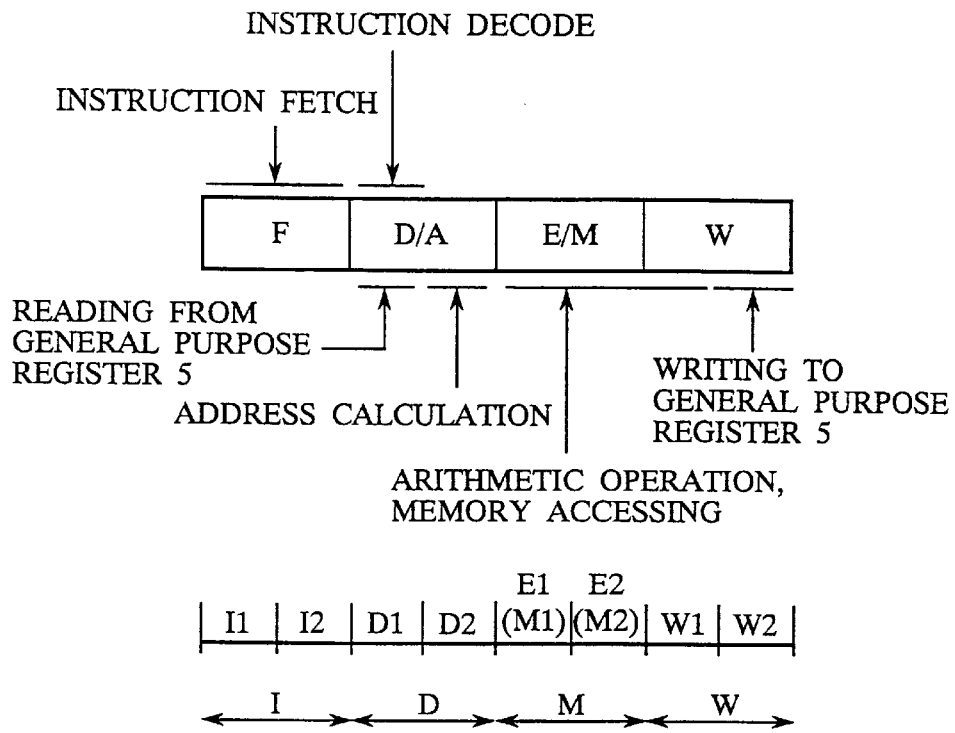
FIG. 12 is an explanation diagram showing a pipeline operation of the microprocessor having conditional execution instructions according to the present invention shown in FIG. 4.

FIG. 12 is an explanation diagram showing a pipeline operation of the microprocessor 1 having conditional execution instructions according to the present invention shown in FIG. 4. FIG. 12 shows a four stage pipeline operation in which processes required for one instruction execution are performed in four pipeline stages in the microprocessor 1.

First, an instruction fetch operation is executed at F stage, and then a decode operation of the fetched instruction is performed at D/A stage. A readout operation to the general purpose register file 5 is executed at the first half of D/A stage, an address calculation operation is executed at the latter half of D/A stage. In E/M stage, an arithmetic operation and a memory access operation are performed. Then, a write back operation to the general purpose register file 5 is executed at the latter half of W stage. In general, the pipeline of one instruction requires these operations described show. As shown in the lower part of each stage in the pipeline shown in FIG. 12, the processing at the first half (I1, D1, E1, and W1) and at the latter half (I2, D2, E2, and W2) of each of the four stages, F stage, D/A stage, E/M stage, and W stage are executed in synchronization with the high level part and the low level part of a clock signal, respectively. The first half and the latter half of the F stage are called to as I1 period processing and I2 period processing, respectively. The first half and the latter half of the D stage are called to as D1 period processing and D2 period processing, respectively. The first half and the latter half of the E stage are called to as E1 period processing and E2 period processing, respectively. The first half and the latter half of the W stage are called to as W1 period processing and W2 period processing, respectively.

Detailed Block Diagram of the VLIW Microprocessor of the Present Invention

Next, the detailed configuration of the microprocessor 1 of the present invention will be explained.

FIGS. 13A, 13B, 13C, and 13D are diagrams mainly showing the detailed configuration of the memory access unit 3 and the integer operation unit 4 in the microprocessor 1 of the present invention shown in FIG. 4. In FIGS. 13A, 13B, 13C, and 13D, the same reference numbers are also used for the same components incorporated in the microprocessor 1 of the present invention, as shown in FIG. 4.

The memory access unit 3 comprises the ALU 15 and the shifter 16 in the microprocessor 1 shown in FIG. 4. The reference number 220 designates a register for storing the value on the D2 synchronous bus group and for transferring the stored data item to the shifter 16. The reference number 221 denotes the register for storing the value on the value on the D2 synchronous bus group and for transferring the stored data item to the ALU 15. In addition, the memory access unit 3 further comprises other operation units such as various operation units and registers for performing memory control operation, program counter (PC) control operation, operation control and the like.

The reference number 29 designates the instruction address register for storing an address used for accessing the instruction RAM 6 when instruction fetch operation is performed. The reference number 30 denotes a control section for arranging the stored data item used when the memory store operation is executed, 33 indicates an incrementer for performing a post-increment/decrement addressing when a load instruction or a store instruction is executed. The reference number 32 designates an adder for calculating an address calculation when a load/store instruction and a branch instruction is executed. The reference number 50 designates a register for storing the result of the operation of the ALU 15, and the shifter 16.

The reference characters CR0–CR11 designate the control register 150 shown in FIGS. 9A, 9B, 9C and 9D, 34 denotes an incrementer for incrementing the content of the program counter (PC) CR0 in the control register 150, 35 indicates an adder for calculating the value of the repeat count register CR6 and the value of the repeat end-address register CR8.

The reference number 36 designates a decrementer for decrementing the value of the repeat count register CR6, 37 indicates an incrementer for incrementing the value of the instruction address register 29, and 40 designates a 32-bit comparator for comparing the value of the instruction break address register CR11 with the value of the program counter CR0 and for outputting an agreement signal when both values are the same.

The reference number 41 designates a 32-bit comparator for outputting an effective signal indicating the effective state when the value of the repeat count register CR6 is not less than zero. The reference number 42 designates a 32-bit comparator for comparing the value of the repeat end-address register CR8 with the value of the instruction address register 29 and for outputting the agreement signal when both values are the same.

The reference number 43 designates a 32-bit comparator for comparing the value of the modulo end-address register CR10 with the value of the incrementer 31 and for outputting the agreement signal when both values are the same. The reference number 44 denotes a 32-bit comparator for outputting an effective signal indicating the effective state when the value on the D1S6BUS is zero.

The integer operation unit 4 has the units 17a to 17d forming the multiplier 17 shown in FIG. 4, the ALU 19, the shifter 20, and an operation unit 21 for a saturation operation which is not shown in FIG. 4. The reference number 222 designates the register for storing the value on the D2 synchronous bus group and for transferring the stored value to the ALU 20. The reference number 223 denotes the register for storing the value on the D2 synchronous bus group and for transferring the stored value to the shifter 19 and the ALU 20. The reference number 224 designates the register for storing the value on the D2 synchronous bus group and for transferring the stored value to the ALU 17.

The reference characters A0 and A1 designate the accumulator, as the component element 18 shown in FIG. 4, for accumulating the sum of product operation and the like. The reference number 55 indicates a register for storing the results of the ALU 20, the shifter 19, and a saturation operation unit.

The S1 bus, S2 bus, S3 bus, S4 bus, S5 bus, and S6 bus shown in FIG. 4 correspond to the D1S1BUS, D1S2BUS, D1S3BSU, D1S4BUS, D1S5BUS, AND D1S6BUS, respectively. The reference character D1 in D1S1BUS shows that the bus is driven during the D1 period in D stage shown in FIG. 12. Buses having the head character "D1" in the reference character of each bus are referenced to as "D1 synchronous bus group". Further, W1 bus, W2 bus, W3E bus, and W3O buses shown in FIG. 4 correspond to W1W1BUS, W1W2BUS, W1W3EBUS, W1W3OBUS shown in FIGS. 13A to 13D. The reference character W1 in W1W1BUS shows that the bus is driven during the W1 period in W stage shown in FIG. 12. Buses having the head character "W1" in the reference character of each bus are referenced to as "W1 synchronous bus group".

In addition, the D2S1BUS, D2S2BUS, D2S3BUS, D2S4BUS, D2S5MBUS, D2S5IBUS, and D2S6BUS delay in timing the data in the D1 synchronous bus group by a half clock and drive the delayed data during D2 period. The latches 40a and 40b change this timing.

Furthermore, the reference characters 41a, 41b, and 41c designate immediate values outputted from the instruction decode section. These values are provided to the D1 and D2 synchronous bus group through the bus drivers 41a, 42b, 42c, and 42d. The register value for storing the value of the control register and the value of the operation unit is outputted during the E2 period through each of the E2D1BUS, E2D3BUS, and E2D4BUS.

The reference number 51 designates a write back register for outputting the data on the E2D1BUS to the W1W1BUS. The reference number 53 denotes a register for outputting the value of the load data item to the W1W3EBUS and W1W3OBUS.

The reference number 54 designates a write back register for outputting the value of the operation result storing register 55 to W1W2BUS. The reference number 60 designates a pass through which the value of the PSW register in the instruction decode unit is read out to the E2D1BUS. The reference number 61 denotes a pass through which the value of E1CRBUS is written into the PSW register in the instruction decode unit 2. The reference number 62 indicates a flag propagation pass to be outputted to the instruction decode unit 2 from the ALU 15. The reference number 63 indicates a flag propagation pass to be outputted to the instruction decode unit from the ALU 15 in the memory access unit 3. The reference number 64 indicates a flag propagation pass to be outputted to the instruction decode unit 2 from the ALU 19. The reference number 65 indicates a flag propagation pass through which a carry flag is transferred from the saturation operation unit 21 to the instruction decode unit 2.

The reference numbers 200 to 211 denote circuits and bypass for performing bypass operation. That is, the reference number 200 designates a control section for controlling the sign expansion of the value on the load data bus M2ODBUS. The reference number 201 designates a register for storing values on the buses W1W3EBUS and W1W3OBUS transferred from the write back register 56. The reference number 202 designates a pass through which data in the register 50 is transferred to the D2 synchronous bus group in the memory access unit 3. The reference number 203 designates a pass through which data in the write back register 51 is transferred to the D1 synchronous bus group in the memory access unit 3. The reference number 204 denotes a pass through which the value stored in the register 57 is transferred to the D1 synchronous bus group. The reference number 205 indicates a pass through which the value stored in the register 201 is transferred to the D2 synchronous bus group in the memory access unit 3. The reference number 206 designates a pass through which the value stored in the sign expansion section 33 is transferred to the memory synchronous bus group in the memory access unit 3. The reference number 207 designates a pass through which the value stored in the register 53 is transferred to the D2 synchronous bus group in the memory access unit 3. The reference number 208 denotes a pass through which the value stored in the sign expansion section 200 is transferred to the D2 synchronous bus group in the integer operation section 3. The reference number 209 indicates a pass through which the value stored in the write back register 54 is transferred to the D1 synchronous bus group.

The reference number 210 designates a pass through which the value stored in the register 55 is transferred to the D2 synchronous bus group in the integer operation unit 4. The reference number 211 denotes a path through which the value stored in the write back register 56 is transferred to the D1 synchronous bus group in the integer operation unit 4.

Assurance Process for Data Consistency when Data Hazard Occurs

As has already been explained by using the pipeline shown in FIG. 12, the data readout from the general purpose file 5 is performed during the D1 period. The data write to the general purpose file 5 is performed during the W2 period. Accordingly, it must be required to assure the data consistency by using a bypass operation or a pipeline interlock operation when a following instruction wants to read data stored in a destination register to which a preceding instruction writes the data. The data relationship requiring this processing is called a Data hazard.

Figure 14:
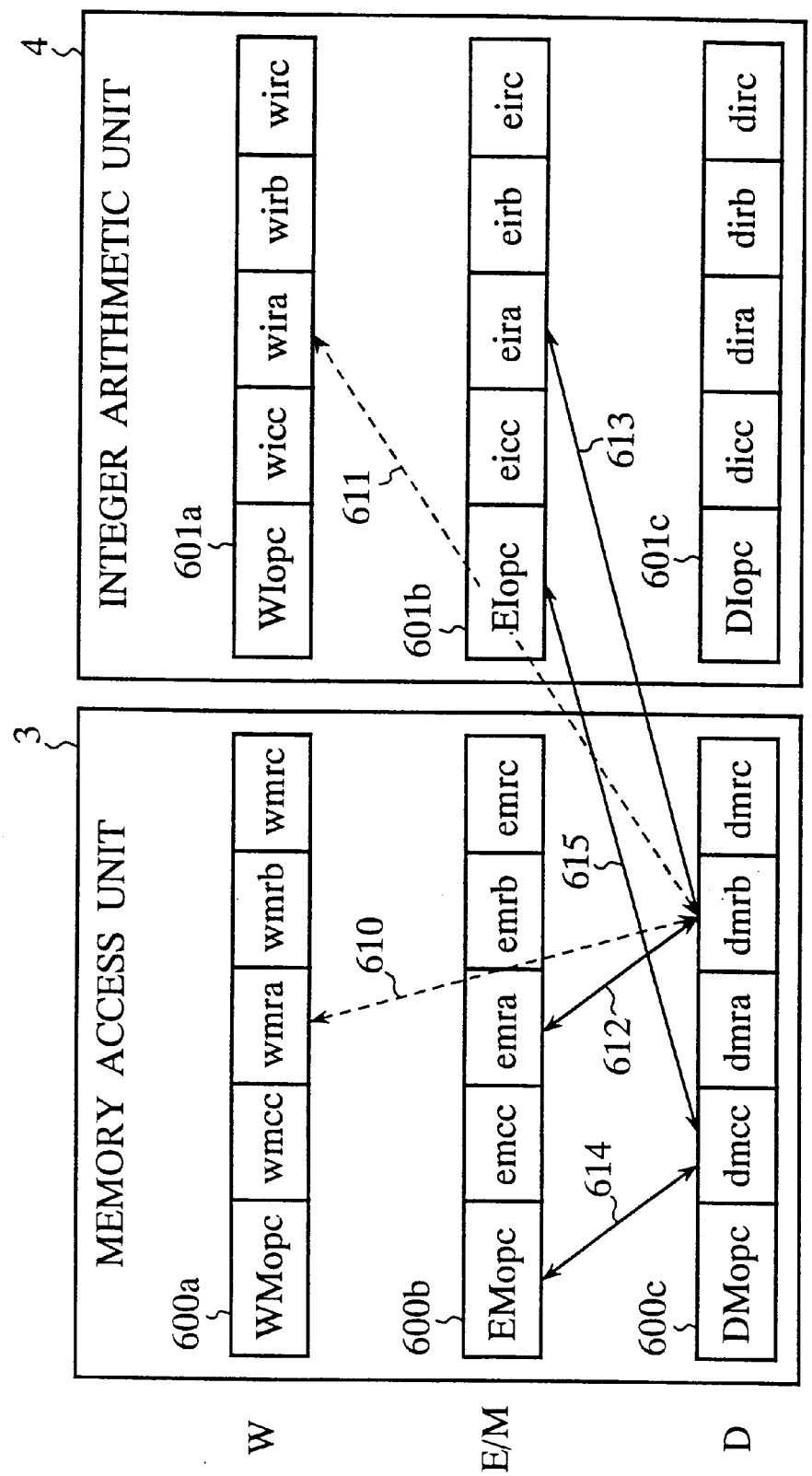
FIG. 14 is an explanation diagram showing data hazard between the pipelines of the instruction codes.

FIG. 14 is an explanation diagram showing the data hazard caused between the pipelines of instruction codes. In FIG. 14, the reference number 600a, 600b, and 600c designate sub-instruction codes executed in W stage, E/M stage, and D stage in the memory access unit 3, respectively. The reference number 601a, 601b, and 601c denote sub-instruction codes executed in W stage, E/M stage, and D stage in the integer operation unit 4, respectively.

The five fields in each sub instruction shows the opcode, the conditional execution field, the destination register designation field, and the two source register designation fields that are seen from the head field, in order. The first two characters in each field show the name of the stage and the name of the operation unit by which this field is executed. For example, the field "WMopc" in the sub instruction code 600a means that it will be executed in W stage by the Memory access unit 3.

The dotted arrows 610 and 611 in each pipeline shown in FIG. 14 shows an example of the data assurance process for data consistency in data hazard by using the bypass process. In general, the bypass can be easily incorporated in order to avoid the data hazard that occurs in the same operation unit, as shown by the dotted arrow 610 in FIG. 14. Thereby, the data assurance process of the data consistency when a data hazard occurs can be kept by the bypass processing. When the performance of the data processing of the microprocessor 1 is reduced, the dedicated bypass is formed in order to assure the data consistency even if the data hazard occurs between the different operation units such as the memory access unit 3 and the integer operation unit 4.

In addition, as shown by the dotted arrow 611, it is possible to execute processing without penalty and without halting the execution of the pipeline when the data consistency is assured by using the bypass. Conversely, when the data consistency is assured by using the bypass, it is not required to halt the pipeline operation, and it is possible to perform the pipeline without any penalty. Conversely, the data consistency in the data hazards in the examples, as shown by the solid lines 612, 613, 614, and 615, can be assured by the pipeline interlock process.

As shown in the case indicated by the arrow of the solid line 612, the pipeline interlock process must be required until a required data item is generated even if this required data item is transferred in the same memory access unit 3.

Further, as shown in the case indicated by the arrow of the solid line 613, it is difficult to perform the bypass processing between the different operation units 3 and 4. Therefore it is required to perform the pipeline interlock process until the data is written into the general purpose register file 5.

Moreover, in the cases shown by the arrows 614 and 615 that the sub instructions codes 600b and 601b in E stages are the instructions to update the value of the conditional execution flags, and the conditional execution field in the sub instruction code in the following D stage requires the conditional execution decision operation, it must be required to interlock the execution between the pipelines until the value of the flag is updated.

Thus, in the pipeline interlock processing, it must be required to halt the execution of one pipeline, namely, to interlock the execution between the pipelines, in order to assure the data consistency. This causes to generate the penalty.

The microprocessor according to the present invention has the function to eliminate the penalty caused by the pipeline interlock processing only under special conditions. Hereinafter, this function of the microprocessor 1 of the present invention is called to as the pipeline interlock cancel process.

Figure 15:
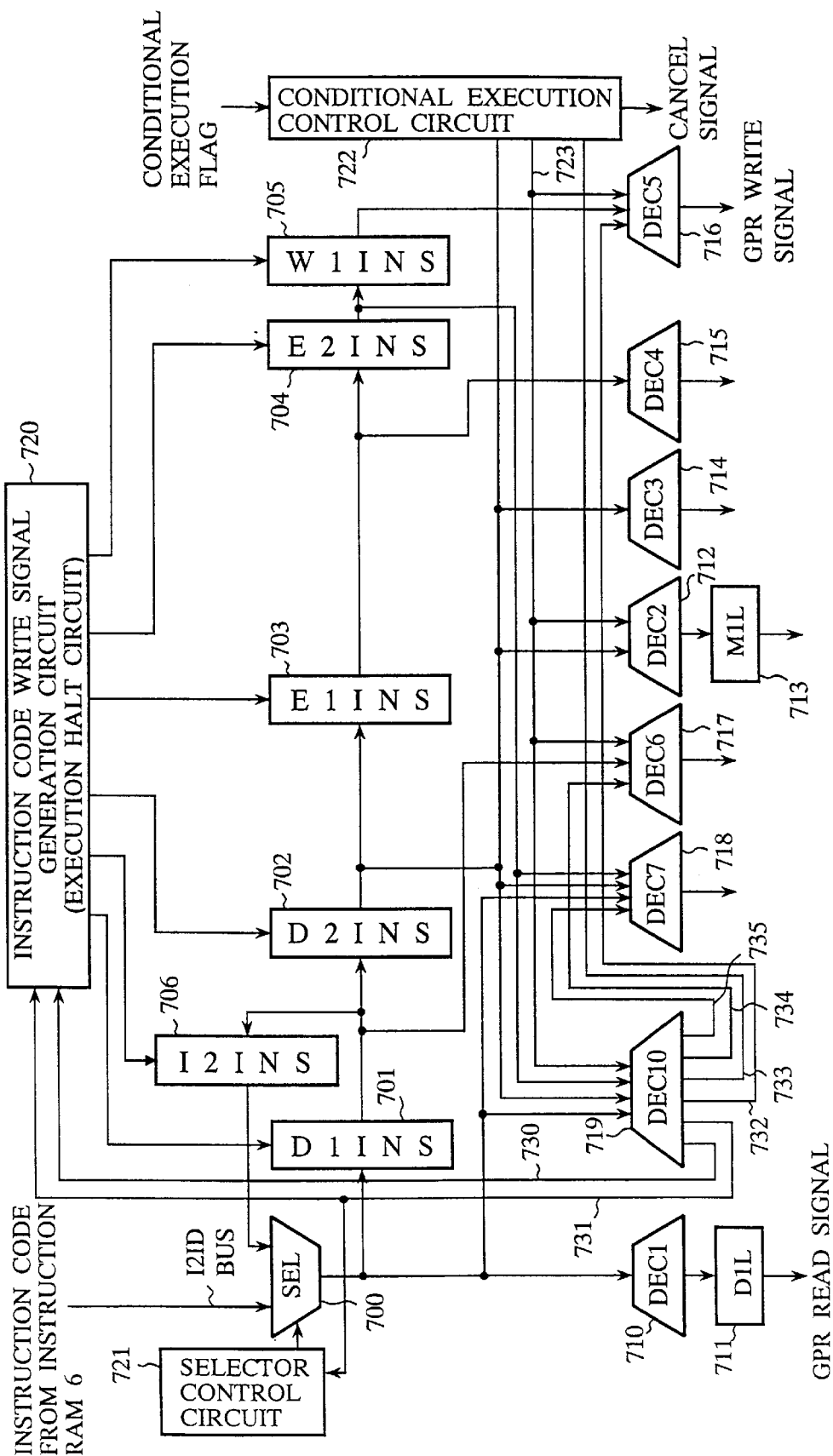
FIG. 15 is a block diagram showing a control circuit for controlling a pipeline interlock cancel process whose function is incorporated in the instruction decode unit.

FIG. 15 is a block diagram showing a control circuit incorporated in the integer operation unit 4 for controlling the pipeline interlock cancel process. This control circuit shown in FIG. 15 is omitted from FIG. 4 and FIGS. 13A to 13D for brevity.

In FIG. 15, the reference number 700 designates a selector for selecting one of the instruction codes transferred from the instruction RAM 6 through the instruction data bus I2IDBUS and transferred from a feed back pass. The operation of the selector 700 is controlled by the selector control circuit 721. The output from the selector 700 is output to the pre-decode circuit 710 as the instruction code for a pre decoding during the I2 period in I stage of the pipeline.

The reference numbers 701 to 706 designate registers for storing instruction codes. The registers 701 and 702 are the registers for storing the instruction codes in D stage. The registers 703 and 704 are the registers for storing the instruction codes in E stage. The register 705 is the register for storing the instruction code in W stage. The register 706 is the register used for the feed back pass, and stores the data value in the register 701 and outputs the stored data value to the selector 700. The operation of these registers 701 to 706 are controlled by the write enable signal transferred from the instruction code write signal generation circuit (or the execution halt circuit). In addition, the output from the registers 701 to 705 are transferred to the various decoders 710, 712, 714 to 719.

The reference number 710 designates a decoder circuit for decoding the instruction code of a pre-decode and for generating a general purpose register read signal (GPR read signal), 711 denotes a latch of a D1 synchronous for latching the decode result of the decoder 710. That is, the readout from the general purpose register file 5 is initiated at the D1 period. The reference number 712 indicates a decoder circuit for decoding the output from the register 702 and for generating an access control signal for the data RAM 7. The reference number 713 designates a latch M1L of a M1 synchronous for storing the result of the decoder 712. That is, the latch M1L starts the accessing to the data RAM 7 at the M1 period.

The reference number 717 designates a decoder circuit for decoding the output from the register 701 and for generating a data bus control signal for the data bus of D1 synchronous. The reference number 714 indicates a decoder circuit for decoding the output from the register 702 and for generating a data bus control signal of D2 synchronous. The reference number 715 indicates a decoder circuit for decoding the output from the register 703 and for generating a data bus control signal of E1 synchronous. The reference number 716 indicates a decoder circuit for decoding the output from the register 705 and for generating a write signal for the general purpose register file 5. The writing operation to the general purpose register file 5 is initiated during the W2 period based on the write signal of W1 synchronous.

The reference number 718 designates a decoder (collision avoidance circuit) for executing the bypass operation. The reference number 719 denotes a decoder circuit (data hazard decide circuit) for executing the pipeline interlock operation. The reference number 722 indicates a conditional execution control circuit for controlling the conditional execution based on the values of the conditional execution flag from PSW and conditional execution field in the register 702. Various cancel signals are transferred from the conditional execution control circuit 722 to the various decoder circuits in order to control the execution of the conditional execution operation.

Figure 16:
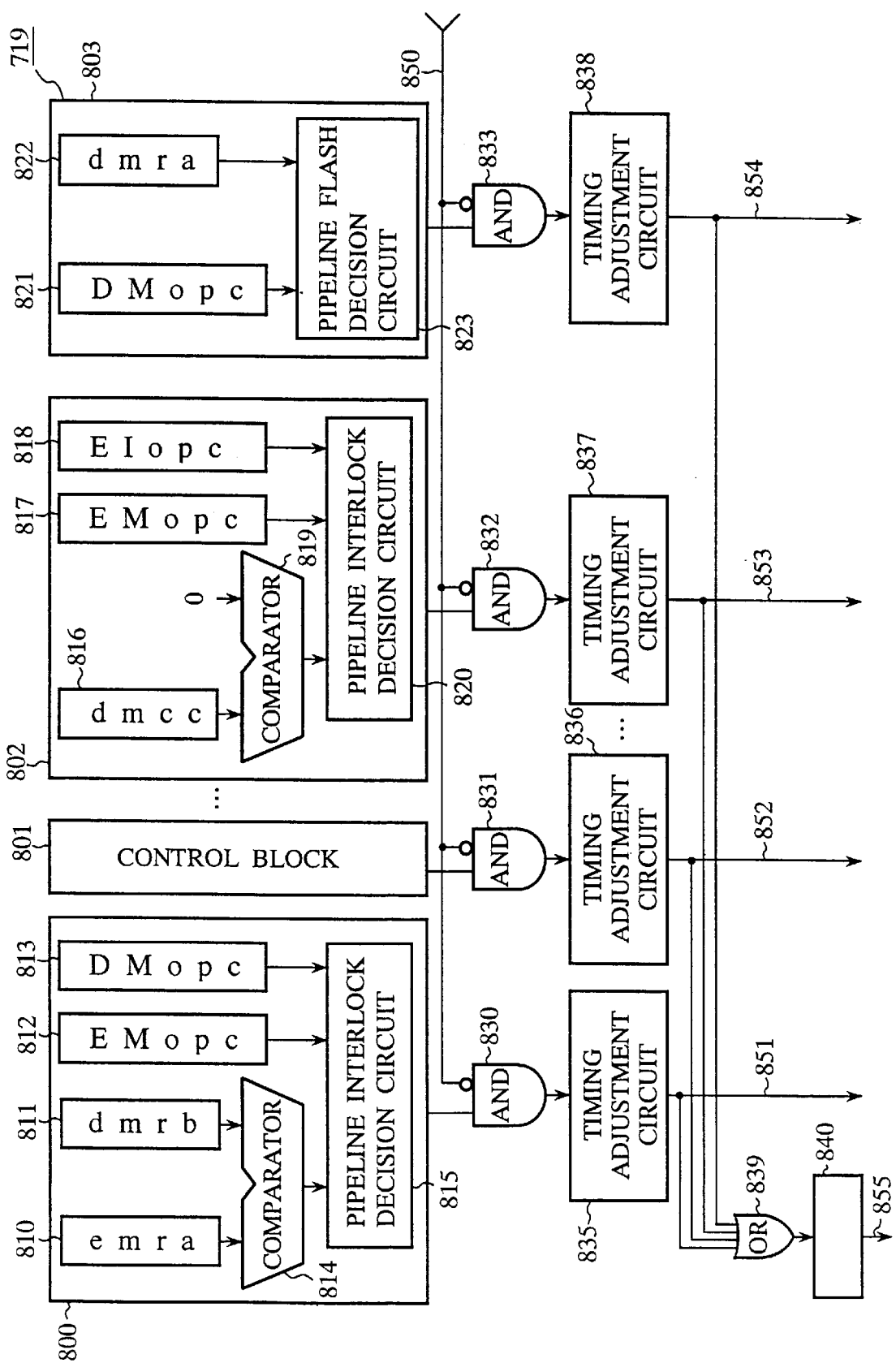
FIG. 16 is a block diagram showing pipeline interlock control circuits.

FIG. 16 is a block diagram showing pipeline interlock control circuits, each corresponds to the decoder 719 shown in FIG. 15. In FIG. 16, the reference numbers 800 to 803 designate control blocks for detecting the necessity of the pipeline interlock process. This control block 800 comprises a comparator 814 and a decision circuit 815. The comparator 814 compares the destination register designation field 810 in D stage with the source register designation 811 field of D stage. The decision circuit 815 checks the necessity of the pipeline interlock process based on the comparison result of the comparator 814 and the values of opcodes 812 and 813.

The reference number 802 designates a decision circuit 802 for comparing the conditional execution field 816 in D stage of the pipeline of the memory access unit 3 with zero, and for judging the necessity of the pipeline interlock process according to the comparison result and the values of the opcodes 817 and 818.

The reference number 803 comprises a decision circuit 823 for judging the necessity of a pipeline flash based on the opcode in D stage of the pipeline of the memory access unit 3 and the value of the destination register designation field 822.

The reference number 801 indicates a control block having the same configuration of the circuits 800, 801, and 802 for receiving different instruction codes. The output signals from the control blocks 800 to 803 are transferred to the AND circuits 830 to 833, respectively and canceled when the value of the control signal 850 becomes a high level. The outputs from the AND circuits 830 to 833 are transferred to the timing adjustment circuits 835 to 838 in order to generate the timing signals 851 to 854 for controlling the pipeline interlock process. The pipeline interlock control signals 851 to 854 are transferred to the OR circuit 839 and then output as the signal 855 through the latch circuit.

Figure 17:
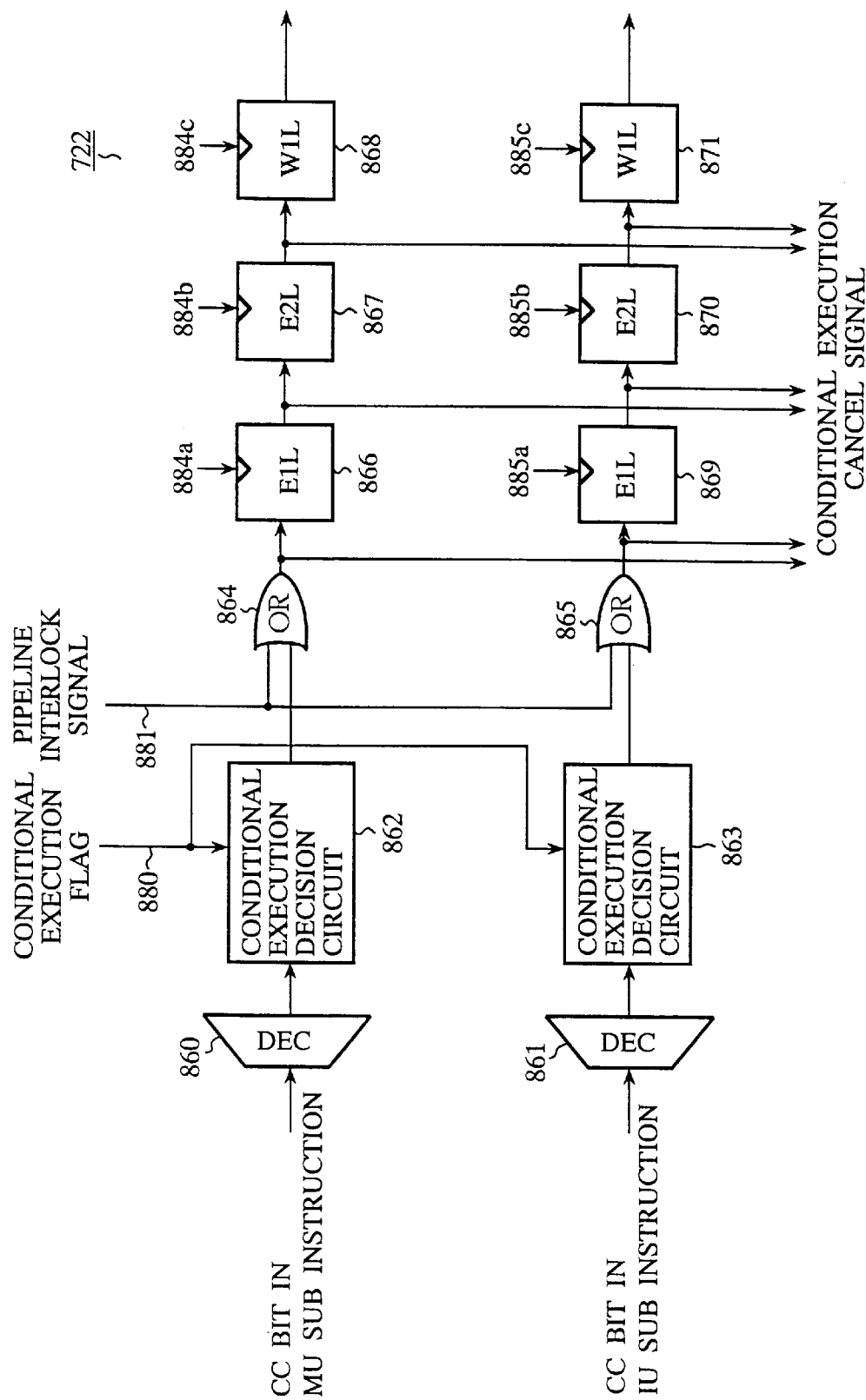
FIG. 17 is a block diagram showing conditional execution control circuits shown in FIG. 15.

FIG. 17 is a block diagram showing the configuration of the conditional execution control circuits 722 shown in FIG. 15. In FIG. 17, the reference numbers 860 and 861 designate decode circuits for decoding the conditional execution field of 3 bits in each of the memory access unit 3 and the integer operation unit 4. The reference numbers 862 and 863 denote the conditional execution decision circuits for judging whether the conditional execution instruction will be executed based on the conditional execution flag 880 obtained by the processor status word (PSW) and the decode result of the decoders 860 and 861.

The outputs of the conditional execution circuits 862 and 863 are transferred to the OR circuits 864 and 865, respectively. The OR circuits 864 and 865 perform OR operation between these outputs and the pipeline interlock signal 881. The result of the OR operation by the OR circuits 864 and 865 is output. This output signals from the OR circuits 864 and 865 are processed by the latch circuit of each E1, E2, and W1 synchronous so that these output signal have desired timings, and then output as cancel signals.

The reference characters 884a, 884b, 884c, 885a, 885b, and 885c designate write enable signals for controlling the update process of the latches 886 to 871.

Figure 18:
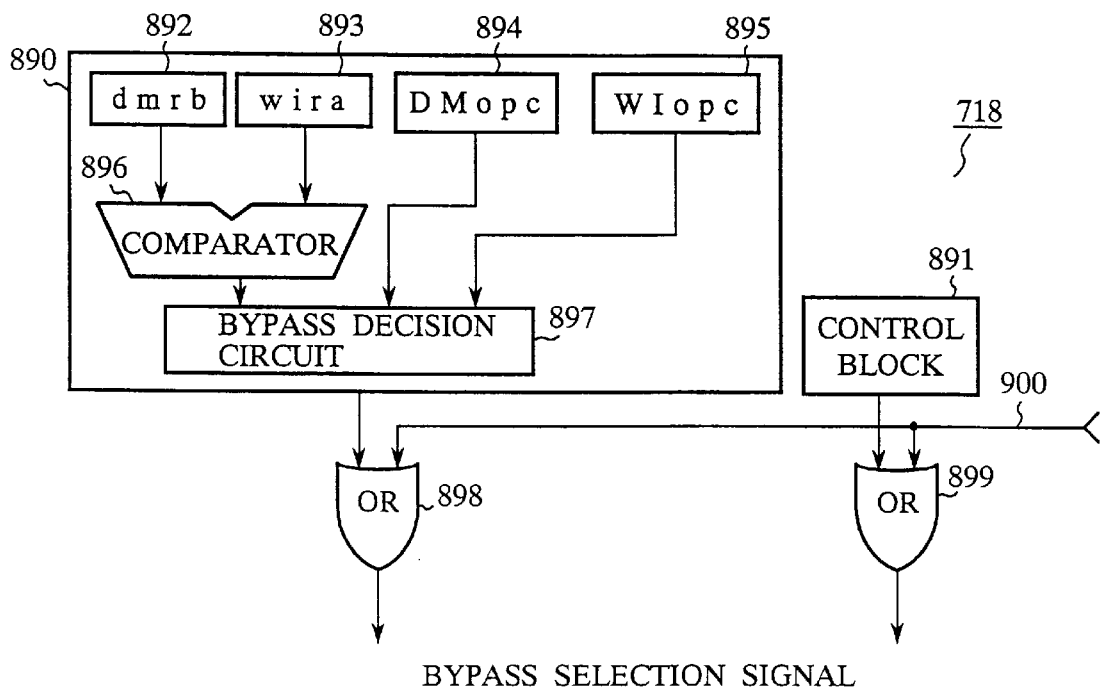
FIG. 18 is a block diagram showing a bypass control circuit.
Figure 13A:
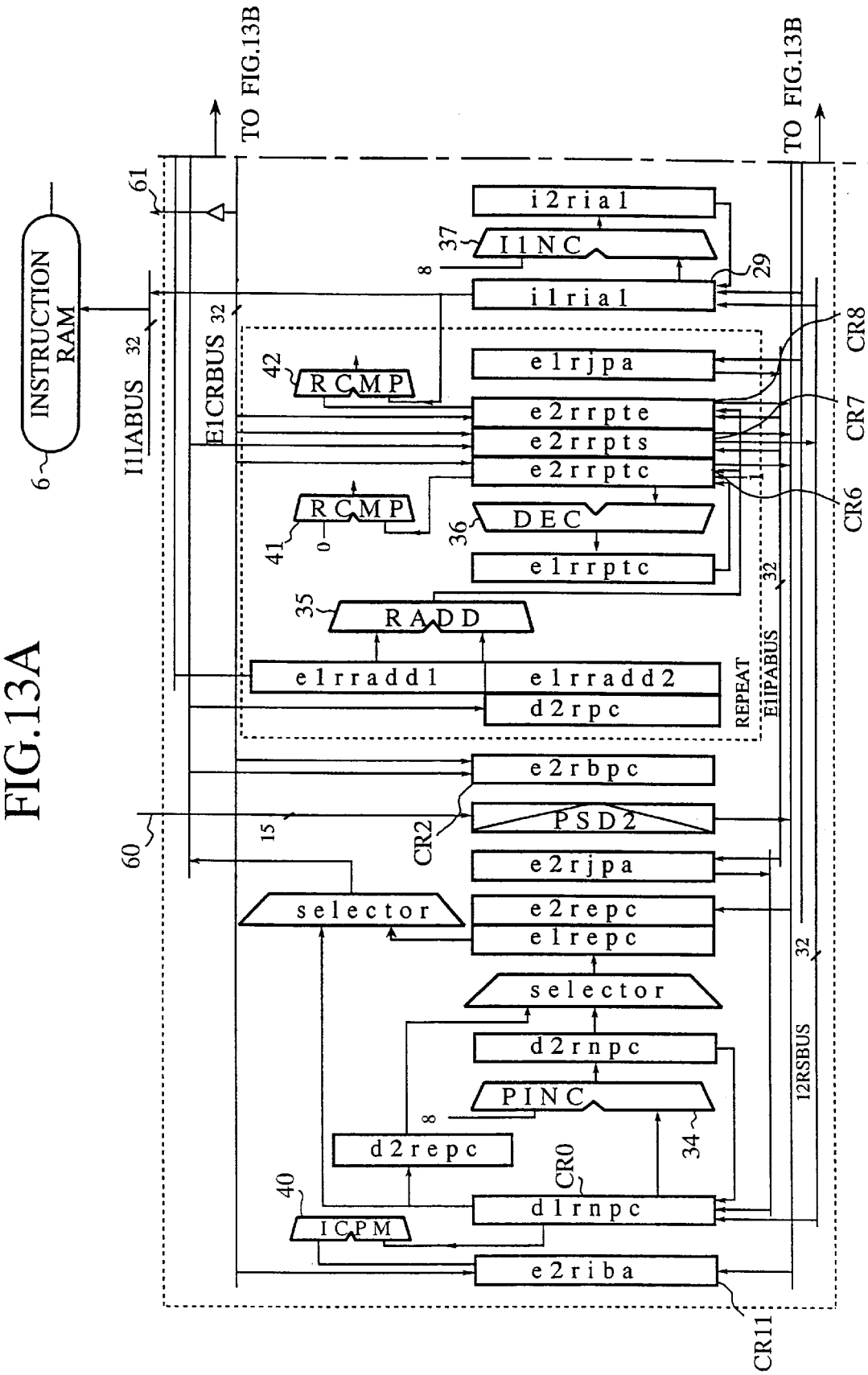
FIGS. 13A, 13B, 13C, and 13D are block diagrams mainly showing a detailed configuration of execution units in the microprocessor having conditional execution instructions according to the present invention shown in FIG. 4.
Figure 13B:
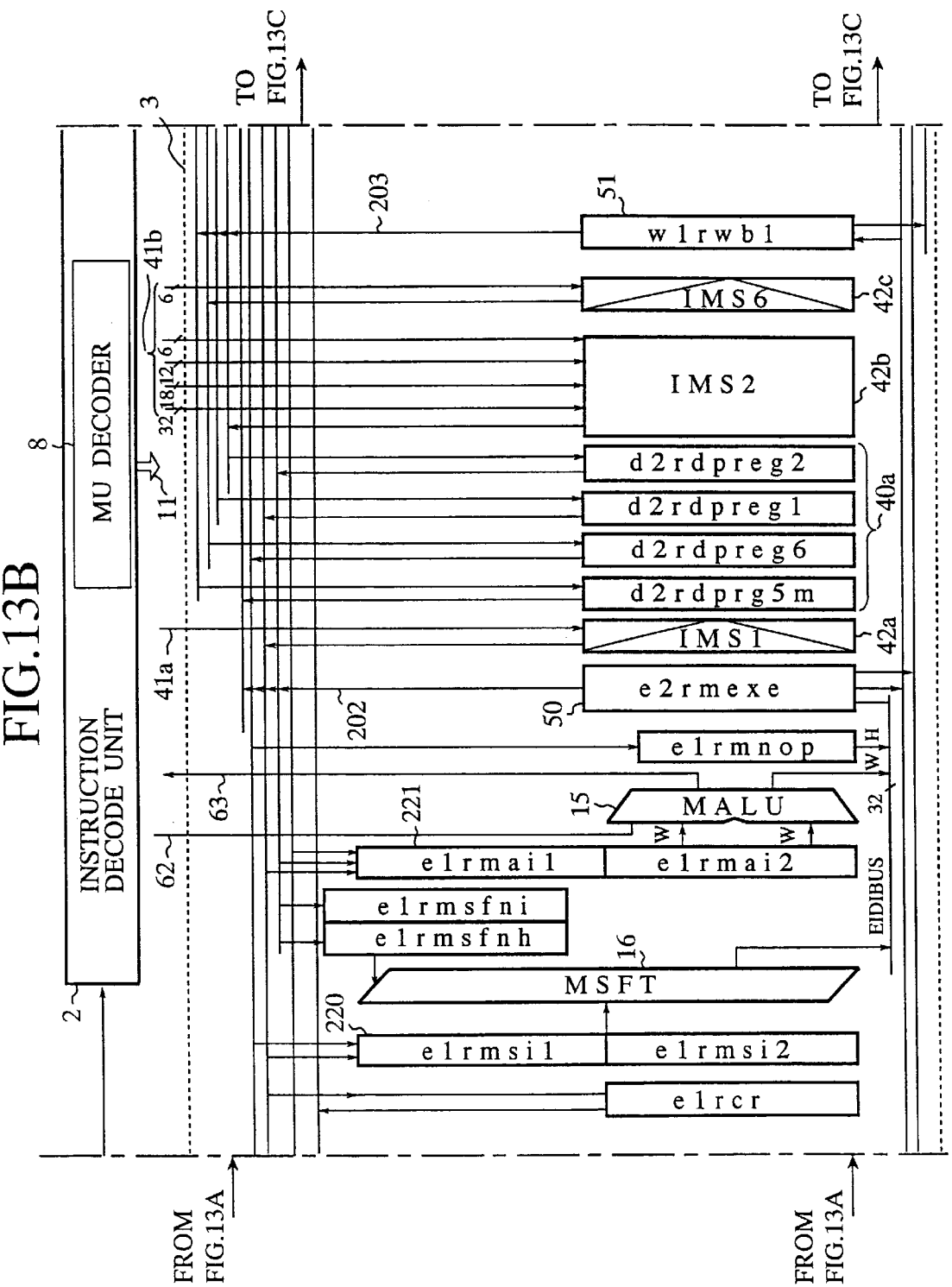
Figure 13C:
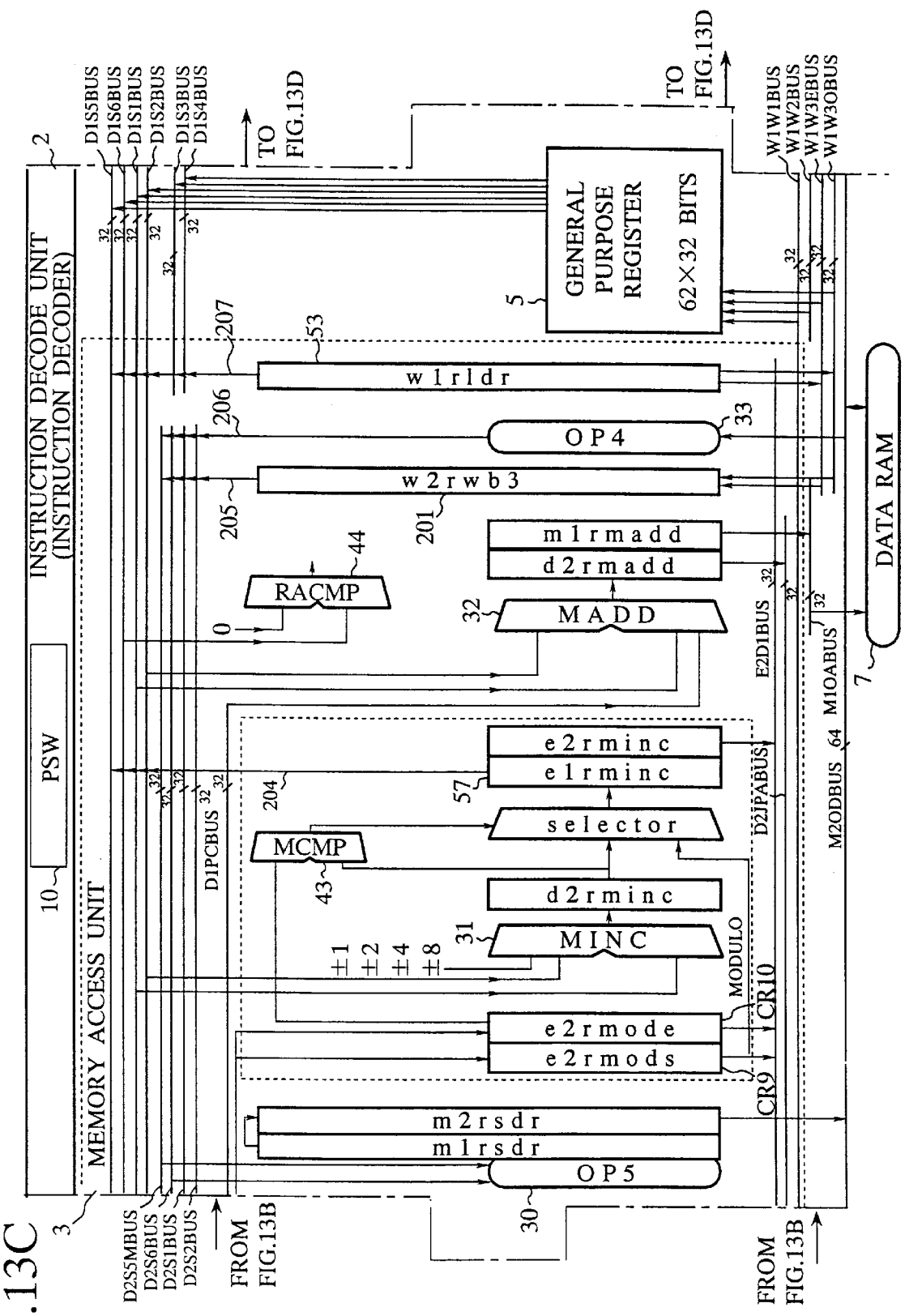
Figure 13D:
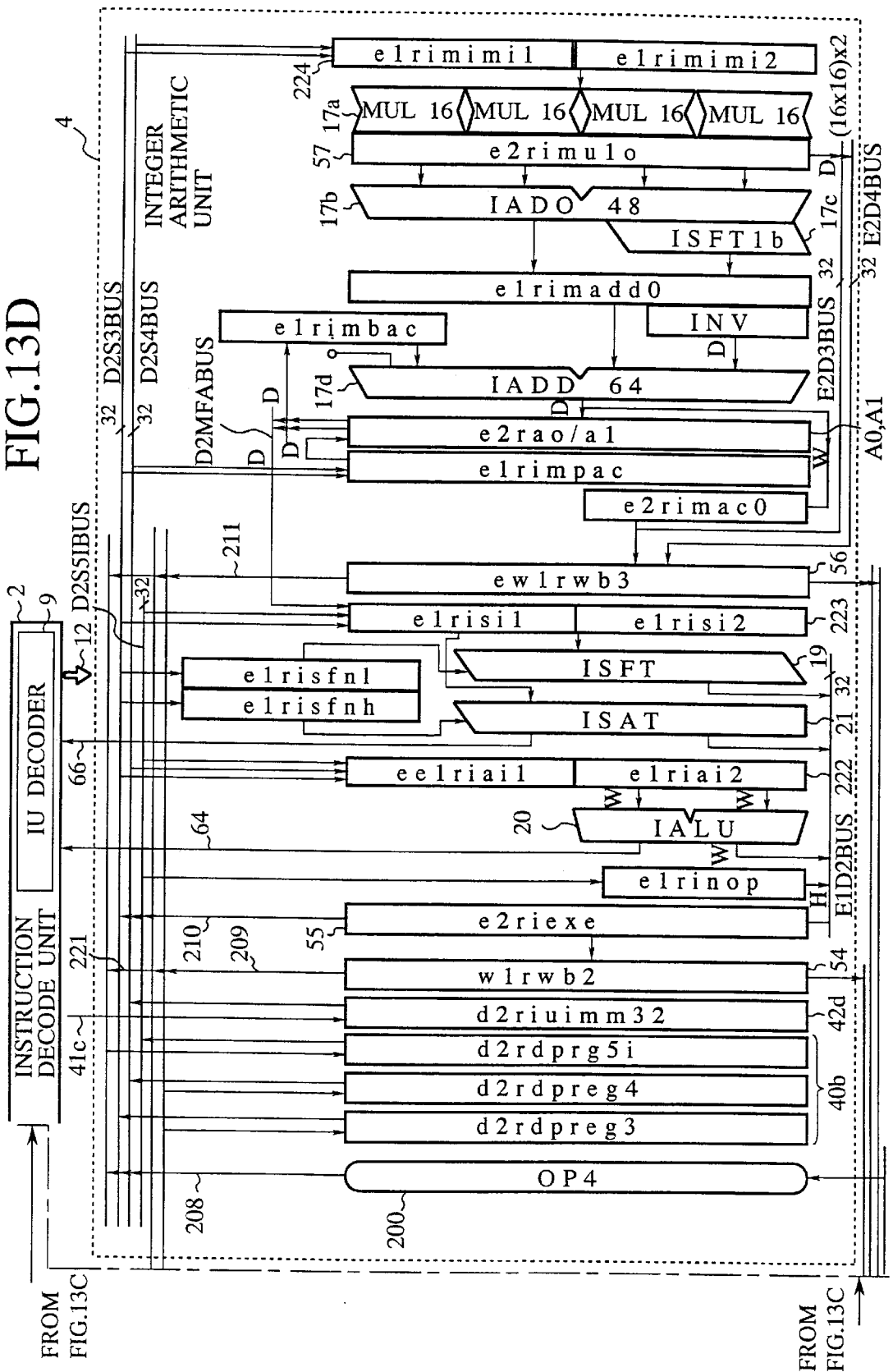

FIG. 18 is a block diagram showing the bypass control circuit. This bypass control circuit corresponds to the decode circuit 718. In FIG. 18, the reference numbers 890 and 891 designate control blocks for detecting whether the bypass process is necessary. The control block 890 comprises a comparator 896 and a bypass decision circuit 897. The comparator 896 in the control block 890 compares the source register designation field 892 in D stage of the memory access unit 3 with the destination register designation field 893 in W stage of the integer operation unit 4. The bypass decision circuit 897 decides whether or not the bypass process is necessary based on this comparison result and the values of the opcodes 894 and 895. The reference number 891 designates a control block having the same configuration of the control block 890 to input a different instruction code. There are many control blocks of this type in the bypass control circuit section. The outputs from the control blocks 890 and 891 are transferred to the OR circuits 898 and 899, respectively. The OR operation of these outputs and control signal 900 is performed by each of the OR circuits 898 and 899. The OR circuits 898 and 899 outputs the bypass selection signals.

Pipeline Interlock Cancel Process.

Next, the pipeline interlock cancel process of preferred embodiments of the microprocessor according to the present invention will be explained.

In the pipeline interlock cancel process in the microprocessor, when the result of the conditional execution decision process indicates to halt the execution of the instruction code that has generate a pipeline interlock, the pipeline interlock process is canceled to reduce the pipeline penalty.

First Embodiment

FIG. 19 is a timing chart showing the pipeline interlock cancel process for memory accessing executed in the microprocessor as the first embodiment according to the present invention. In FIG. 19, the white sections designate the pipelines of sub-instructions executed by the memory access unit 3 and the black sections denote the pipelines of sub-instructions executed by the integer operation unit 4.

The reference number 901 designates the pipeline of a load instruction to be executed by the memory access unit 3, 902 denotes the following pipeline of the pipeline 901. The reference number 903 designates the pipeline of a load instruction that will be executed based on the decision of the conditional execution. The reference number 904 denotes the following pipeline to be executed after the pipeline 903.

In the pipeline 901 of the load instruction in the microprocessor of the first embodiment, the data readout operation from the general purpose register file 5 is initiated in the D1 period of D stage and the address calculation is performed in the D2 period of D stage by using the readout data. Then, a data RAM request signal is transferred in M stage. When the data readout operation based on the data RAM request signal is executed after two clocks, the M stage of the pipeline 901 is interlocked during this two clocks. That is, the operation of M state in the pipeline 901 is waited during the period of two clocks. Further, the penalty occurs because the execution of D stage in the following pipeline 902 is halted.

In the pipeline 903 of the load instruction, the conditional execution decision is performed in D stage and the conditional execution cancel signal is output in the D2 period in D stage. By using the conditional execution cancel signal, the request signal to the data RAM 7 is canceled and following pipelines after the M stage are also canceled (that is, the execution of the load instruction is canceled). Accordingly, because no pipeline interlock in M stage occurs in the microprocessor of the first embodiment, it is possible to execute the following pipeline 904 without penalty.

Next, a description will now be given of the operation of the microprocessor as the first embodiment.

Hereinafter, the pipeline interlock cancel process during the memory accessing will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process during the memory accessing shown in FIG. 19.

At first, the load instruction of the pipeline shown in FIG. 19 is read out from the instruction RAM 6 through the bus I2IDBUS and the instruction that has been already transferred to each of the control circuits through the selector 700 shown in FIG. 15. The adder (MADD) 32 shown in FIG. 13C adds the source data items readout on the buses D1S1BUS, D1S2BUS to perform the address calculation. The generated address is output to the operand address bus M1OABUS.

Based on the data RAM request signal, the decode circuit 712 decodes the instruction code in the register 702 shown in FIG. 15 and the decoded data item is output through the latch 713 in M stage. The data readout from the data RAM 7 is transferred to and stored into the load data register 53 through the operand data bus M2ODBUS and the sign expansion section 33. The value stored in the register 53 is written into the general purpose register file 5 through the write back buses W1W3EBUS and W1W3OBUS.

The GPR write signal that is the write signal indicating to write data to the general purpose register file 5 is generated by decoding the value stored in the register 705 shown in FIG. 5 by the decoder 716. When the pipeline interlock occurs during the data RAM accessing, the instruction code write signal generation circuit (execution halt circuit) 720 shown in FIG. 15 generates the control signal for controlling the update of the instruction code. Then, based on this control signal, the update operation for the contents of the registers 701 to 705 is halted during the interlock operation. When the conditional execution decision decides to cancel the execution of this load instruction, the conditional execution cancel signal 723 is transferred from the conditional execution control circuit 722 to both the decoders 712 and 716, so that the data RAM request signal and the general purpose register write signal may be canceled.

As described in detail, according to the microprocessor of the first embodiment, when the execution of this load instruction becomes canceled based on the conditional execution decision, not only is the write operation of the loaded data to the general purpose register file 5 is canceled, but also the entire operation of the data RAM accessing is canceled. It is thereby possible to reduce the occurrence of pipeline penalty because the pipeline operation is canceled when the data hazard (or data interference) occurs between pipelines of the preceding instruction and the following instruction.

Second Embodiment

FIG. 20 is a timing chart showing a pipeline interlock cancel process for address calculation data executed in the microprocessor having conditional execution instructions as the second embodiment according to the present invention. In FIG. 20, the white sections designate the pipelines of sub-instructions executed by the memory access unit 3 and the black sections denote the pipelines of sub-instructions executed by the integer operation unit 4.

The reference number 905 designates the pipeline of an add instruction to be executed by the memory access unit 3, 906 denotes the pipeline of an add instruction whose execution is canceled by the decision result of the conditional execution decision. The reference number 908 denotes the pipeline of a load instruction to be executed following the pipeline 907.

In the microprocessor of the second embodiment, when it occurs that the data for address calculation of the load instruction in the pipeline 906 is read from the write register r10 for the add instruction in the pipeline 905, this data hazard (or data interference) is detected during D stage in the pipeline 906 and the pipeline interlock signal is generated based on the result of this detection process. When the pipeline interlock signal is generated, the selector signal to halt the execution of D/A stage in the pipeline 906 during one clock is generated. Then, the control signal in order to bypass the data added in E stage in the pipeline 905 is generated and the bypass processing is then executed. Thus, when the data hazard of the address calculation operation occurs, the penalty for the pipeline interlock also occurs.

In the pipeline 907 of the add instruction whose execution will be canceled later, the conditional execution decision is performed in D stage, the conditional execution cancel signal is output from the D2 period. Based on this cancel signal, the pipeline interlock signal detected in D/A stage of the pipeline 908 is canceled. Thereby, the microprocessor of the second embodiment, because no pipeline interlock for address calculation data occurs, the following pipeline 908 can be executed without penalty.

Next, a description will now be given of the operation of the microprocessor of the second embodiment.

Hereinafter, the pipeline interlock cancel process for address calculation data will be explained by using the detailed block diagram of the microprocessor 1 shown in FIGS. 13A to 13D, the block diagram of the control circuit incorporated in the instruction decode unit 2 shown in FIG. 15, and the timing chart of the pipeline interlock cancel process for the address calculation data shown in FIG. 20.

When the load instruction of the pipeline 906 is read from the instruction RAM 6 shown in FIGS. 13A to 13D through the bus I2IDBUS, and the load instruction is transferred to each control circuit such as the decoder circuits and the like through the selector 700. The decoder circuit (data interference decision circuit) 719 compares the instruction code of the load instruction transferred from the selector 700 with the output from the register 701 for storing the instruction code in D stage and detects the occurrence of the pipeline interlock. Then, the decoder circuit 719 generates the pipeline interlock signals 731 and 735 and outputs them to the selector control circuit 721 and the instruction code write signal generation circuit 720 and the decoder circuit 718.

The instruction code write signal generation circuit 720 outputs the write signal and receives the value of the register 701. The selector control circuit 721 controls the selector 700 so that the selector 700 selects the value of the feedback register 706. Thereby, the selector 700 outputs the load instruction code to each control circuit such as the decoder circuits and the like. By this processing, D/A stage of the pipeline 906 shown in FIG. 20 is interlocked by one clock.

The decoder circuit 718 receives the pipeline interlock signal 735 output from the decoder circuit 719 and generates the bypass selection signal. By this bypass selection signal, the value in the write back register 51 is output to the D1 synchronous bus group through the bypass 203.

Next, in the execution of the load instruction of the pipeline 906 shown in FIG. 20, the adder 32 calculates the address for accessing of the data RAM by using the bypass data obtained through the bypass 203. Then, the following stages are executed.

Like the add instruction of the pipeline 907 shown in FIG. 20, when the conditional execution decision indicates to halt the execution of the load instruction, the conditional execution control circuit 722 shown in FIG. 15 outputs the conditional execution cancel signal 723 to the decoder circuit 719 to cancel the pipeline interlock signal.

As described above in detail, according to the microprocessor of the second embodiment, when the data hazard occurs between data to be used for the address calculation of the load instruction and the resultant data of the preceding instruction, and when the conditional execution decision indicates to halt the preceding instruction, the conditional execution cancel signal cancels the pipeline interlock signal and the bypass selection signal, so that it is possible to reduce the penalty of the pipeline.

Third Embodiment

Figure 21:
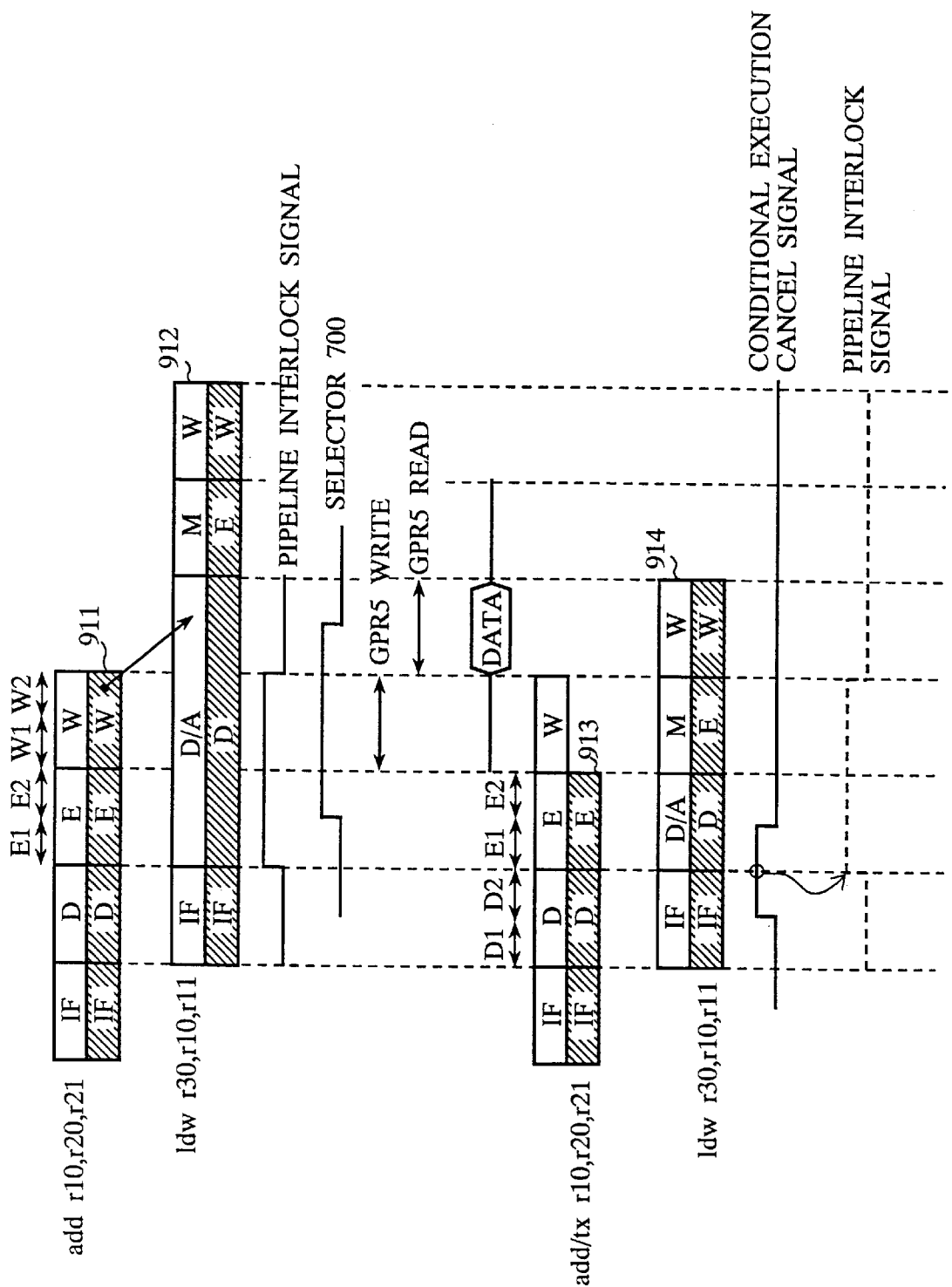
FIG. 21 is a timing chart showing a pipeline interlock cancel process between different execution units in the microprocessor having conditional execution instructions as the third embodiment according to the present invention.
Figure 22:
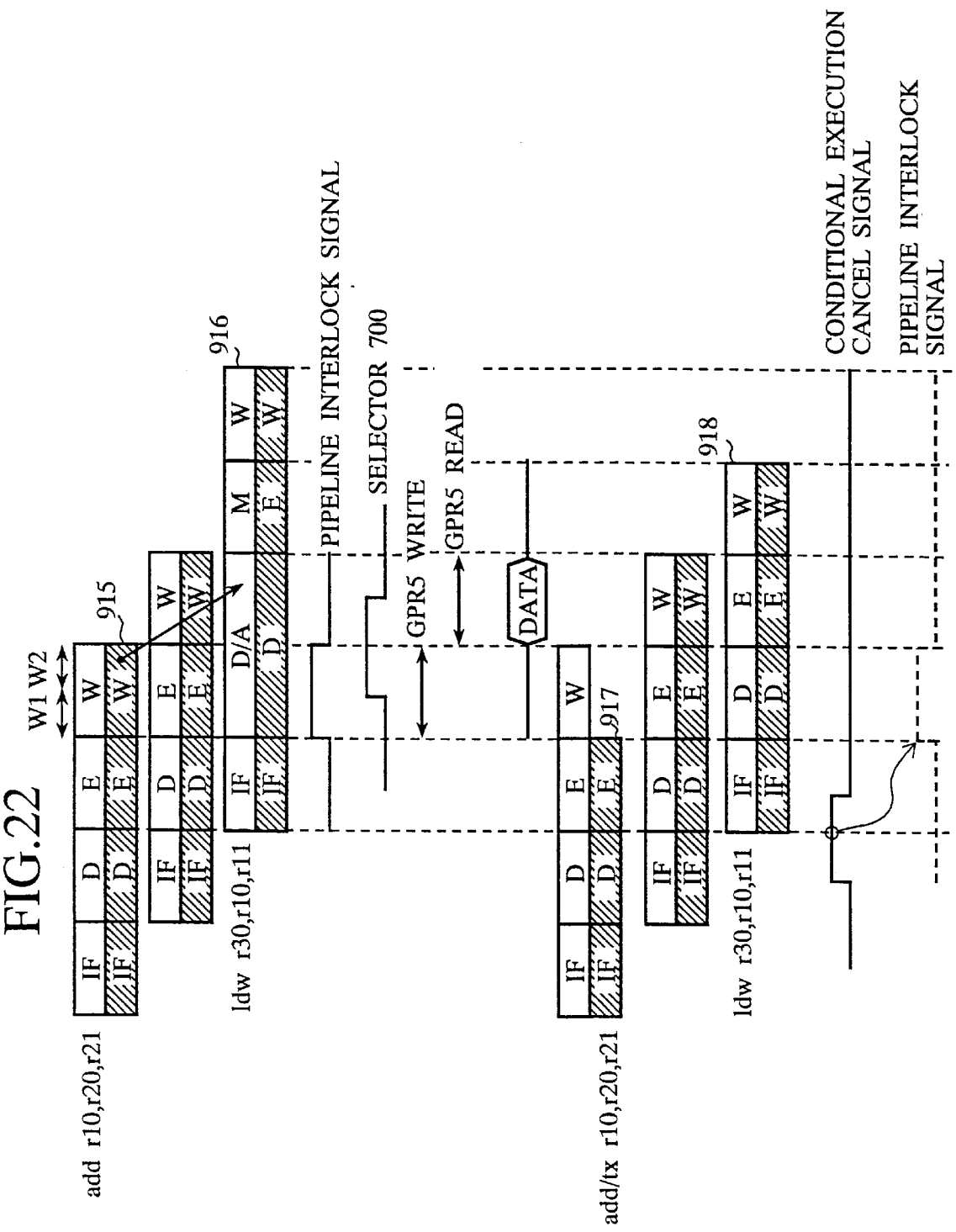
FIG. 22 is a timing chart showing another pipeline interlock cancel process between different execution units in the microprocessor having conditional execution instructions as the third embodiment according to the present invention.

FIGS. 21 and 22 are timing charts showing a pipeline interlock cancel process between different execution units in the microprocessor having conditional execution instructions as the third embodiment according to the present invention. In FIGS. 21 and 22, the white sections designate the pipelines of sub-instructions executed by the memory access unit 3 and the black sections denote the pipelines of sub-instructions executed by the integer operation unit 4. In the explanation of this third embodiment, first, the example of the pipeline interlock cancel process between the execution units 3 and 4 shown in FIG. 21 will be explained and then the example of that shown in FIG. 22 will be explained.

In FIG. 21, the reference number 911 designates the pipeline of the add instruction to be executed by the integer operation unit 4. The reference number 912 denotes the pipeline of the load instruction to be executed following the pipeline 911 by the integer operation unit 4. The reference number 913 indicates the pipeline of the add instruction to be executed by the integer operation unit 4 and the conditional execution decision indicates to halt the execution of this pipeline 913. The reference number 914 designates the pipeline to be executed following the pipeline 913 by the memory access unit 3.

In the microprocessor of the third embodiment, when the address calculation of the load instruction in the pipeline 912 requires the data stored in the write-in register r10 for the add instruction of the pipeline 911, a data hazard (or a data interference) occurs between the pipelines 911 and 912. The occurrence of this data hazard is detected during D stage in the pipeline 912 and then the pipeline interlock signal is generated. This pipeline interlock signal is generated for two clocks from the time that the data item r10 is written into the general purpose register file 5 to the time that the data readout from the general purpose register file 5 in D/A stage in the pipeline 912 can be performed.

This pipeline interlock signal generates the selection signal for halting the execution of D/A stage in the pipeline 912 by two clocks. Thus, when this type of the data hazard about address calculation data occurs, the penalty of two clock for the pipeline interlock is generated.

In the pipeline 913 of the add instruction whose execution is canceled, the conditional execution decision is performed in D stage and the conditional execution cancel signal is output during the D2 period. The conditional execution cancel signal cancels the pipeline interlock signal that is detected during D stage in the pipeline 914. Thereby, in the microprocessor of the third embodiment, because no pipeline interlock for address calculation data used in the pipeline 914 occurs, the following pipeline 914 can be executed without any penalty.

Next, a description will now be given of the operation of the microprocessor of the third embodiment.

Hereinafter, the pipeline interlock cancel process between different operation units will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process performed between the different operation units such as the memory access unit 3 and the integer operation unit 4 shown in FIG. 21.

When the load instruction of the pipeline 912 shown in FIG. 21 is read from the instruction RAM 6 through the bus I2IDBUS, this readout load instruction is transferred to each control circuit such as the decoder circuits and the like through the selector 700 shown in FIG. 15.

The decoder circuit 719 (data interference decision circuit) compares the instruction code of the load instruction obtained from the selector 700 with the output from the register 702 for storing the instruction code in D stage, so that the decoder circuit 719 detects the occurrence of the pipeline interlock and then generates the pipeline interlock signal and outputs it to both the selection control circuit 721 and the instruction code write signal generation circuit 720. The instruction code write generation circuit 720 outputs the write signal, receives the value stored in the register 701, and stores the value into the feed back register 706.

The selection control circuit 721 controls the operation of the selector 700 so that the selector 700 will select the value in the feed back register 706. By this process, the period of two clocks in D/A stage in the pipeline 912 is interlocked.

After the resultant data item of the addition operation of the pipeline 911, shown in FIG. 21, that has been executed by the adder 20 incorporated in the microprocessor FIGS. 13A to 13D is written into the general purpose register file 5 through the write back register 54 during the W2 period in W stage, the pipeline 912 initiates the read operation of the load instruction from the general purpose register file 5 and then generates the address for a RAM accessing to be executed by the adder 32.

As described above, according to the microprocessor for executing the pipeline interlock cancel process between the different operation units shown in FIG. 21, when the conditional execution decision indicates to cancel the execution of one instruction, like the add instruction of the pipeline 913, the conditional execution control circuit 722 shown in FIG. 15 outputs the conditional execution cancel signal 723 to the decoder circuit 719 in order to cancel the pipeline interlock signal.

Next, another example of the pipeline interlock cancel process between the different operation units in the microprocessor as the third embodiment, as shown in FIG. 21, will be explained with reference to the timing chart of the pipeline interlock cancel process to be executed between the different operation units shown in FIG. 22, the block diagrams of the microprocessor of the present invention shown in FIGS. 13A to 13D, and the block diagram showing the control circuit incorporated in the instruction decode unit 2 shown in FIG. 15.

In FIG. 22, the reference number 915 designates the pipeline of the add instruction to be executed by the integer operation unit 4, 916 denotes the pipeline of the load instruction to be executed by the memory access unit 3 after one clock following the pipeline 915. The reference number 918 indicates the pipeline of the load instruction to be executed by the memory access unit 3 after one clock following the pipeline 917.

The microprocessor of the third embodiment has the following function in addition to the function of the preceding example described above. That is, in the microprocessor of the third embodiment, when the date read is performed from the write-in register r10, that is used for the add instruction of the pipeline 915, for the address calculation for the load instruction of the pipeline 916, the data hazard between both the pipelines 915 and 916 is detected in D stage of the pipeline 916 and then the pipeline interlock signal is also generated by the decoder 719. This pipeline interlock signal for one clock is generated, namely one clock is the time period counted from the time that the data in the register r10 is written into the general purpose file 5 after W stage in the pipeline 915 is completed to the time that the data read from this general purpose register file 5 can be performed in D/A stage in the pipeline 916.

By the pipeline interlock signal, the selector signal is generated in order to halt the execution of D/A stage in the pipeline by one clock. Thus, when this data hazard for the address calculation data occurs, the penalty of one clock is generated for the pipeline interlock.

In the pipeline 917 of the add instruction whose execution will be canceled, the conditional execution decision is performed in D stage, the conditional execution cancel signal is output during the D2 period in D stage. By this conditional execution cancel signal, the pipeline interlock signal detected in D stage is canceled. Thereby, in the microprocessor of the third embodiment, because no pipeline interlock for the address calculation data of the pipeline 918 occurs, the following pipeline 918 can be executed without penalty.

Next, a description will now be given of the other example of the operation of the microprocessor as the third embodiment.

Hereinafter, the other example of the pipeline interlock cancel process among the different operation units will be explained.

When the load instruction of the pipeline 916 shown in FIG. 22 is read out from the instruction RAM 6 shown in FIGS. 13A to 13D through the bus I2IDBUS, this load instruction is transferred to each of the control circuits through the selector 700 shown in FIG. 15.

The decoder circuit 719 shown in FIG. 15 compares the instruction code of the load instruction transferred from the selector 700 with the output of the register 704 in which the instruction code of E stage is stored, then detects the occurrence of the pipeline interlock. The decode circuit 719 then generates the pipeline interlock signal 731 and outputs it to the selector control circuit 721 and the instruction code write signal generation circuit 720.

The instruction code write signal generation circuit 720 outputs the write signal and receives the value stored in the register 701 in order to store it to the feedback register 706. The selector control circuit 721 controls the operation of the selector 700 so that the selector 700 selects the value of the feedback register 706. The selector 700 outputs this value to each of the control circuits. Thereby, D/A stage in the pipeline 916 shown in FIG. 22 is interlocked by one clock.

After the resultant data of the addition of the pipeline 915 obtained by the adder 20 in the integer operation unit 4 shown in FIGS. 13A to 13D is written into the general purpose register file 5 through the register 55 and the write back register 54 during the W2 period, the load instruction of the pipeline 916 shown in FIG. 22 starts the read operation of data from the general purpose register file 5, and generates the address for the data RAM accessing by the address adder 32.

Like the add instruction of the pipeline 917 shown in FIG. 22, when the conditional execution decision decides to cancel the instruction, the conditional execution control circuit 722 shown in FIG. 15 outputs the cancel signal 723 to the decoder circuit 719 in order to cancel the pipeline interlock signal.

As described above, according to the microprocessor of the third embodiment, when the data hazard between the different operation units occurs and when the conditional execution decision indicates to cancel the execution of the preceding instruction, the pipeline interlock signal is canceled by using the conditional execution cancel signal. It is thereby possible to eliminate the penalty of the pipeline.

Fourth Embodiment

Figure 23:
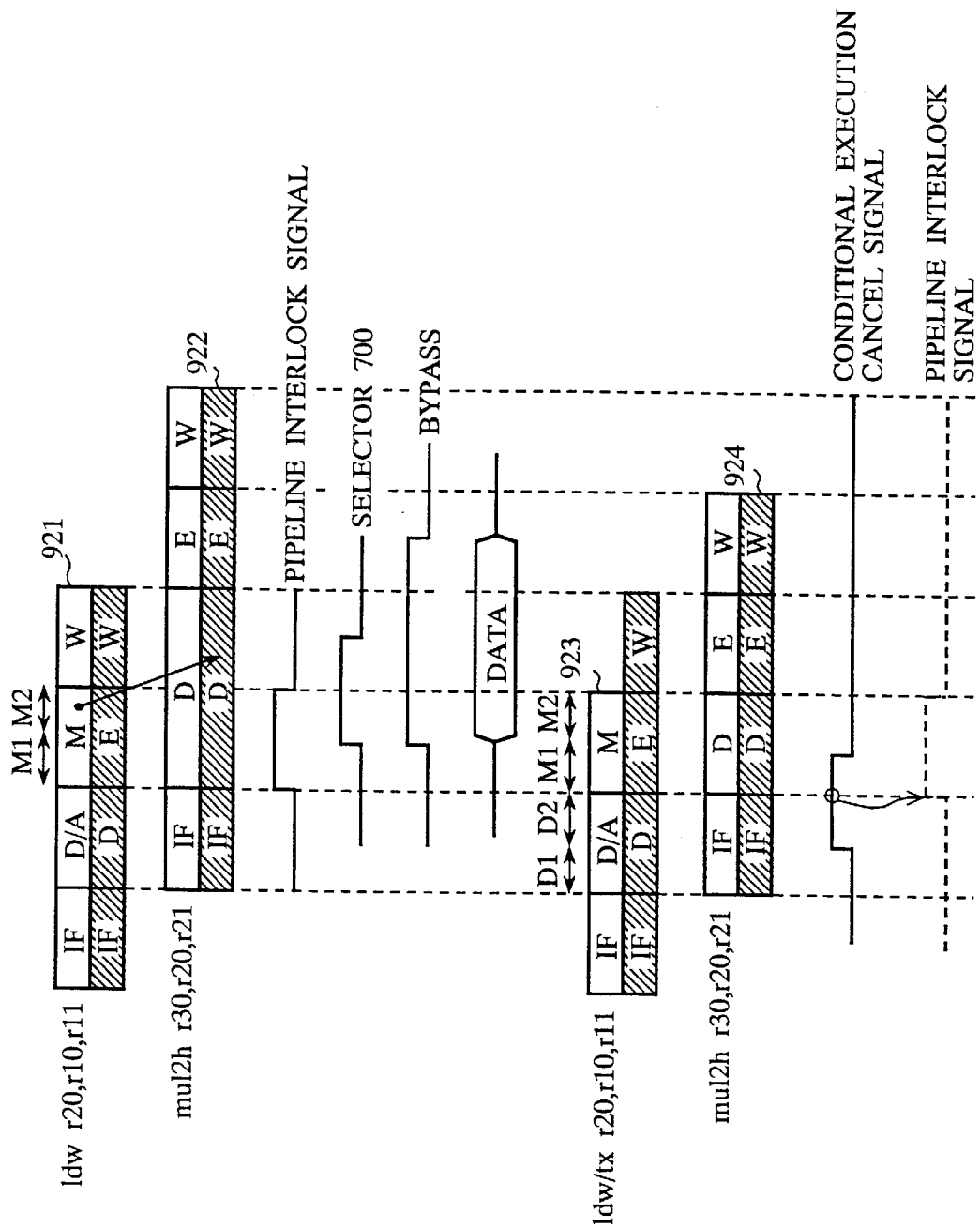
FIG. 23 is a timing chart showing a pipeline interlock cancel process for multiplication data executed in the microprocessor having conditional execution instructions as the fourth embodiment according to the present invention.

FIG. 23 is a timing chart showing a pipeline interlock cancel process for multiplication data executed in the microprocessor having conditional execution instructions as the fourth embodiment according to the present invention.

In FIG. 23, the white sections designate the pipelines executed by the memory access unit 3 and the black sections denote the pipelines executed by the integer operation unit 4. In FIG. 23, the reference number 921 designates the pipeline of the load instruction to be executed by the memory access unit 3.

The reference number 922 designates the pipeline of the multiple instruction to be executed by the integer operation unit following the pipeline 921. The reference number 923 denotes the pipeline of the load instruction to be executed by the memory access unit 3 whose operation is canceled by the decision of the conditional execution decision. The reference number 923 indicates the pipeline of the multiple instruction to be executed by the integer operation unit 4 following the pipeline 923.

In the microprocessor of the fourth embodiment, when the pipeline of the multiple instruction 922 reads the source data from the write-in register r10 to which the pipeline 921 of the load instruction outputs the data, this data hazard is detected in D stage in the pipeline 922 and the pipeline interlock signal is generated. When the pipeline interlock signal is generated by the decoder 719, the selector signal in order to halt the execution of D stage of the pipeline 922 by one clock is generated. In order to transfer the data loaded during M stage in the pipeline 921 to the pipeline 922 through the bypass, the control signal is generated and then the bypass processing is performed based on this control signal.

As described above, when the data hazard of the multiplication data occurs, the penalty of one clock is generated for the pipeline interlock. In the pipeline 923 of the add instruction whose execution will be canceled, the conditional execution decision is performed during D stage, and the conditional execution cancel signal is generated and output during the D2 period in D stage. The pipeline interlock signal detected at D stage of the pipeline 924 is canceled. Thereby, according to the microprocessor of the fourth embodiment, because no pipeline interlock for the multiplication data in the pipeline 924 is generated, the following pipeline 924 can be executed without penalty.

Next, a description will now be given of the operation of the microprocessor of the fourth embodiment.

Hereinafter, the pipeline interlock cancel process of multiplication data will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process for the multiplication data shown in FIG. 23.

When the multiple instruction as the pipeline 922 is read from the instruction RAM 6 through the bus I2IDBUS shown in FIGS. 13A to 13D, this readout multiple instruction is transferred to each control circuit such as the decoder circuits and the like through the selector 700 shown in FIG. 15. The decoder circuit 719 (data interference decision circuit) shown in FIG. 15 compares the instruction code of the multiple instruction obtained from the selector 700 with the output from the register 702 for storing the instruction code in D stage, so that the decoder circuit 719 detects the occurrence of the pipeline interlock and then generates the pipeline interlock signals 731 and 735 and outputs them to both the selection control circuit 721 and the instruction code write signal generation circuit 720. The instruction code write generation circuit 720 outputs the write signal, receives the value stored in the register 701, and stores the value into the feed back register 706.

The selection control circuit 721 controls the operation of the selector 700 so that the selector 700 will select the value in the feed back register 706. By this process, D stage in the pipeline 912 is interlocked by one clock.

The decoder circuit 781 shown in FIG. 15 receives the pipeline interlock signal 735 from the decoder circuit 719 and further generates the bypass selection signal of one clock, and outputs the value obtained by the sign expansion section 200 that processes the value on the operand data bus M2ODBUS to the D2 synchronous bus group in the integer operation unit 4. The multiple instruction of the pipeline 922 receives this bypass data and writes it into the input latch 224 to execute the multiplication process and then the following stages are executed.

Like the pipeline 923 of the load instruction shown in FIG. 23, when the conditional execution decision decides to cancel the execution of the pipeline of the multiple instruction, the conditional execution control circuit 722 shown in FIG. 15 outputs the conditional execution cancel signal 723 to the decoder circuit 719 and the pipeline interlock signal is canceled by this conditional execution cancel signal 723.

As described above, according to the microprocessor of the fourth embodiment, when the data hazard as the data interference occurs between the load data of the load instruction to be executed by the memory access unit 3 and the source data of the multiple instruction to be executed by the integer operation unit 4, and when the conditional execution decision decides to cancel the execution of the load instruction as the preceding instruction, both the pipeline interlock signal and the bypass selection signal are canceled by using the conditional execution cancel signal. It is thereby possible to eliminate the penalty of the pipeline.

Fifth Embodiment

Figure 24:
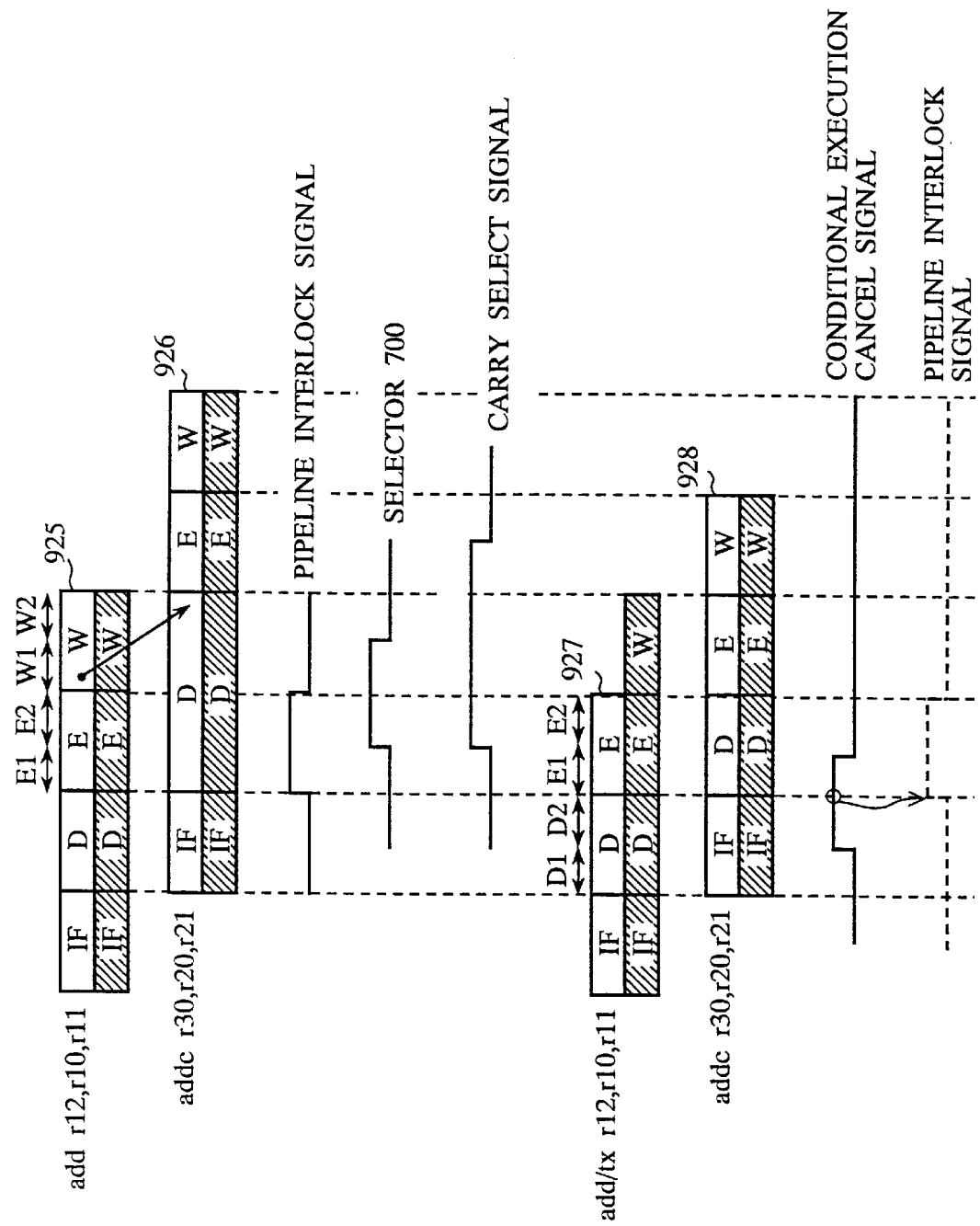
FIG. 24 is a timing chart showing a pipeline interlock cancel process for carry flags executed in the microprocessor having conditional execution instructions as the fifth embodiment according to the present invention.

FIG. 24 is a timing chart showing a pipeline interlock cancel process for carry flags executed in the microprocessor having conditional execution instructions as the fifth embodiment according to the present invention. In FIG. 24, the white sections designate the pipelines executed by the memory access unit 3 and the black sections denote the pipelines executed by the integer operation unit 4.

In FIG. 24, the reference number 925 designates the pipeline of the add instruction to be executed by the memory access unit 3. The reference number 926 designates the pipeline of the add instruction using a carry flag to be executed following the pipeline 925.

The reference number 927 designates the pipeline of the add instruction to be executed by the memory access unit 3 and whose execution will be canceled based on the result of the conditional execution decision. The reference number 928 denotes the pipeline of the add instruction using a carry flag to be executed following the pipeline 927.

In the microprocessor of the fifth embodiment, the add instruction of the pipeline 925 updates the carry flag, and the instruction of the pipeline 926 uses the updated carry flag. The data hazard of this carry flag is detected during D stage in the pipeline 926, so that the pipeline interlock signal is generated. When the pipeline interlock signal is generated, the selector signal to halt the execution of D stage of the pipeline 926 during one clock is generated. The carry select signal is then generated and the updated carry flag in the W1 period of the pipeline 925 is transferred to the pipeline 926.

When this interference of the carry flag (or the data hazard of the carry flag) occurs, the penalty of the pipeline interlock of one clock is generated. In the pipeline 927 of the add instruction whose execution is canceled by the result of the conditional execution decision, the conditional execution decision performs in D stage, the conditional execution cancel signal is generated in the D2 period in D stage. This conditional execution cancel signal cancels the pipeline interlock signal detected in D stage of the pipeline 928. Thereby, the microprocessor of the sixth embodiment can execute the following pipeline without the penalty of the pipeline interlock because the pipeline interlock of the carry flag in the pipeline 928 does not occur.

Next, a description will now be given of the operation of the microprocessor of the fifth embodiment.

Hereinafter, the pipeline interlock cancel process of the carry flag will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process for the carry flag shown in FIG. 23.

When the add instruction using the carry flag of the pipeline 926 is read from the instruction RAM 6 through the bus I2IDBUS shown in FIGS. 13A to 13D, this readout add instruction is transferred to each control circuit such as the decoder circuits and the like through the selector 700 shown in FIG. 15. The decoder circuit 719 (data interference decision circuit) shown in FIG. 15 compares the instruction code of the add instruction obtained from the selector 700 with the output from the register 702 for storing the instruction code in D stage, so that the decoder circuit 719 detects the occurrence of the pipeline interlock and then generates the pipeline interlock signal 731 and outputs it to both the selection control circuit 721 and the instruction code write signal generation circuit 720. The instruction code write generation circuit 720 outputs the write signal, receives the value stored in the register 701, and stores the value into the feed back register 706.

The selection control circuit 721 controls the operation of the selector 700 so that the selector 700 selects the value in the feed back register 706 in order to output the add instruction code to each control circuit such as the decoder circuits and the like. By this process, D stage in the pipeline 926 is interlocked by one clock.

The decoder circuit 714 shown in FIG. 15 decodes the value in the register 702 storing the add instruction code using the carry flag and generates the carry select signal of two clocks. Based on this carry select signal, the updated carry flag is inputted into the ALU 15 through the flag path 62 and the add instruction using the value of the carry flag is then executed.

Like the pipeline 927 of the add instruction shown in FIG. 24, when the conditional execution decision decides to cancel the execution of the pipeline of the add instruction, the conditional execution control circuit 722 shown in FIG. 15 outputs the conditional execution cancel signal 723 to the decoder circuit 719 and the pipeline interlock signal is canceled by this the conditional execution cancel signal 723.

As described above, according to the microprocessor of the fifth embodiment, because the conditional execution cancel signal cancels the pipeline interlock signal when the preceding instruction using a flag updates the value of the flag and the conditional execution decision decides to cancel the execution of the preceding instruction, it is thereby possible to eliminate the penalty of the pipeline.

Sixth Embodiment

Figure 25:
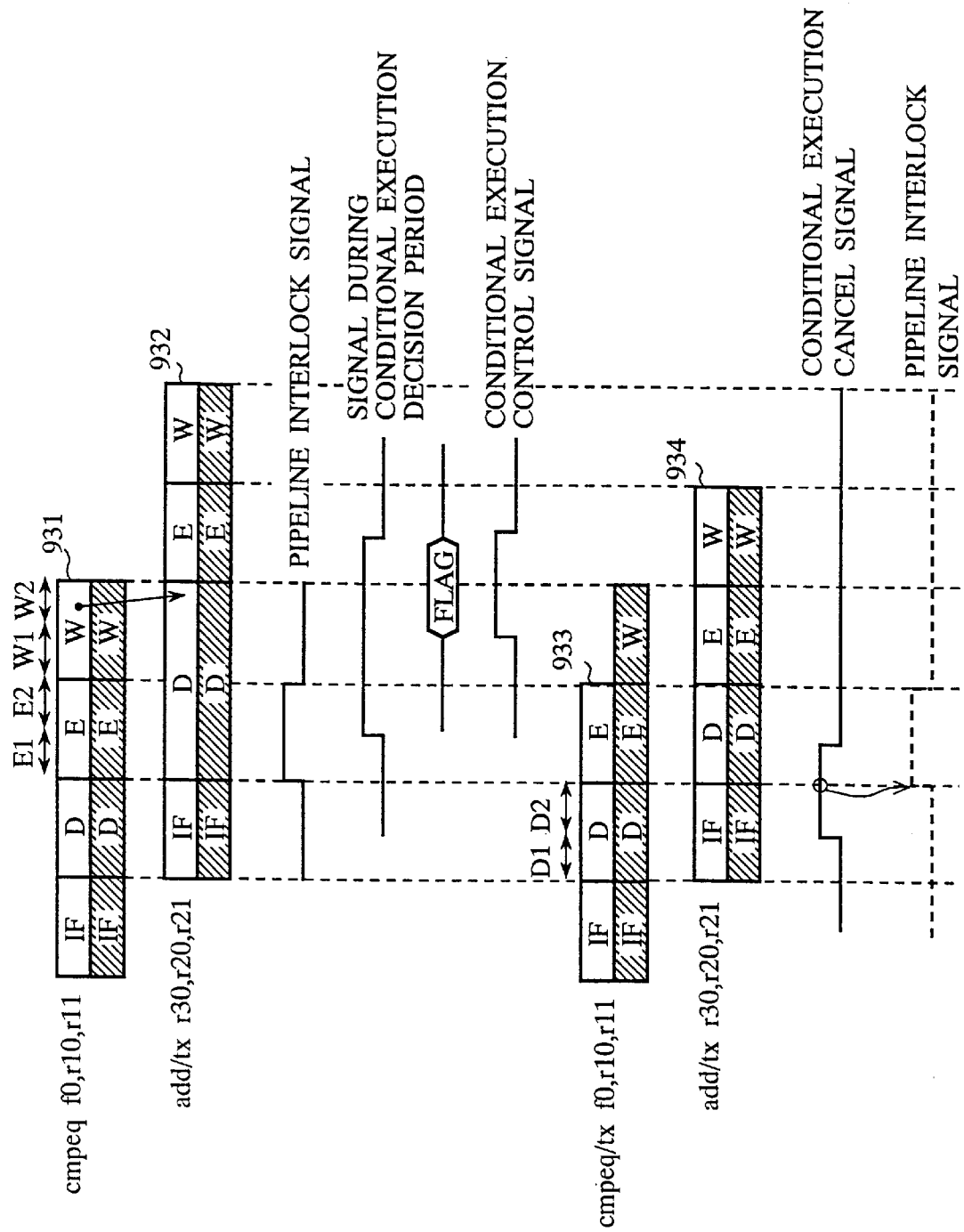
FIG. 25 is a timing chart showing a pipeline interlock cancel process for conditional execution flags executed in the microprocessor having conditional execution instructions as the sixth embodiment according to the present invention.

FIG. 25 is a timing chart showing a pipeline interlock cancel process for conditional execution flags executed in the microprocessor having conditional execution instructions as the sixth embodiment according to the present invention. In FIG. 25, the white sections designate the pipelines executed by the memory access unit 3 and the black sections denote the pipelines executed by the integer operation unit 4.

In FIG. 25, the reference number 931 designates the pipeline of the compare instruction to be executed by the memory access unit 3. The reference number 932 designates the pipeline of the add instruction performing the conditional execution decision executed following the pipeline 931. The reference number 933 designates the pipeline of the compare instruction to be executed by the memory access unit 3. The reference number 934 denotes the pipeline of the add instruction performing the conditional execution decision executed following the pipeline 933.

In the microprocessor of the sixth embodiment, when the compare instruction of the pipeline 931 updates the conditional execution flag, and the instruction of the pipeline 932 performs the conditional execution decision by using this updated execution flag, the interference of the conditional execution flag or the data hazard of the conditional execution flag is detected in D stage in the pipeline 932 and the pipeline interlock signal is generated. When the pipeline interlock signal is generated, the selector signal to halt the execution of D stage in the pipeline 932 during one clock is generated. The conditional execution decision process in the pipeline 932 uses the conditional execution flag updated in the W1 period in W stage of the pipeline 931. When this interference of the conditional execution flag (or the data hazard of the conditional execution flag) occurs, the penalty of the pipeline interlock of one clock is generated.

In the pipeline 933 of the compare instruction whose execution is canceled by the result of the conditional execution decision, the conditional execution decision process is executed in D stage, the conditional execution cancel signal is generated in the D2 period in D stage. This conditional execution cancel signal cancels the pipeline interlock signal detected in D stage in the pipeline 934. Thereby, the microprocessor of the sixth embodiment can execute the following pipeline without the penalty of the pipeline interlock because the pipeline interlock of the conditional execution flag in the pipeline 934 does not occur.

Next, a description will now be given of the operation of the microprocessor of the sixth embodiment.

Hereinafter, the pipeline interlock cancel process of the carry flag will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process for the carry flag shown in FIG. 25.

When the add instruction performing the conditional execution decision of the pipeline 932 is read from the instruction RAM 6 through the bus I2IDBUS shown in FIGS. 13A to 13D, this readout add instruction is transferred to each control circuit such as the decoder circuits and the like through the selector 700 shown in FIG. 15. The decoder circuit 719 (data interference decision circuit) shown in FIG. 15 compares the instruction code of the add instruction obtained from the selector 700 with the output from the register 702 for storing the instruction code in D stage, so that the decoder circuit 719 detects the occurrence of the pipeline interlock and then generates the pipeline interlock signal 731 and outputs it to both the selection control circuit 721 and the instruction code write signal generation circuit 720. The instruction code write generation circuit 720 outputs the write signal, receives the value stored in the register 701, and stores the value into the feed back register 706.

The selection control circuit 721 controls the operation of the selector 700 so that the selector 700 selects the value in the feed back register 706 in order to output the add instruction code to each control circuit such as the decoder circuits and the like. By this process, D stage in the pipeline 932 shown in FIG. 25 is interlocked by one clock.

Like the pipeline 933 of the compare instruction shown in FIG. 25, when the conditional execution decision process decides to cancel the execution of the pipeline of the compare instruction, the conditional execution control circuit 722 shown in FIG. 15 outputs the conditional execution cancel signal 723 to the decoder circuit 719 and the pipeline interlock signal is canceled by this conditional execution cancel signal 723.

As described above, according to the microprocessor of the sixth embodiment, because the conditional execution cancel signal cancels the pipeline interlock signal when the preceding instruction performing the conditional execution decision process updates the value of the conditional execution flag and the conditional execution decision decides to cancel the execution of the preceding instruction, it is thereby possible to eliminate the penalty of the pipeline.

Seventh Embodiment

Figure 26:
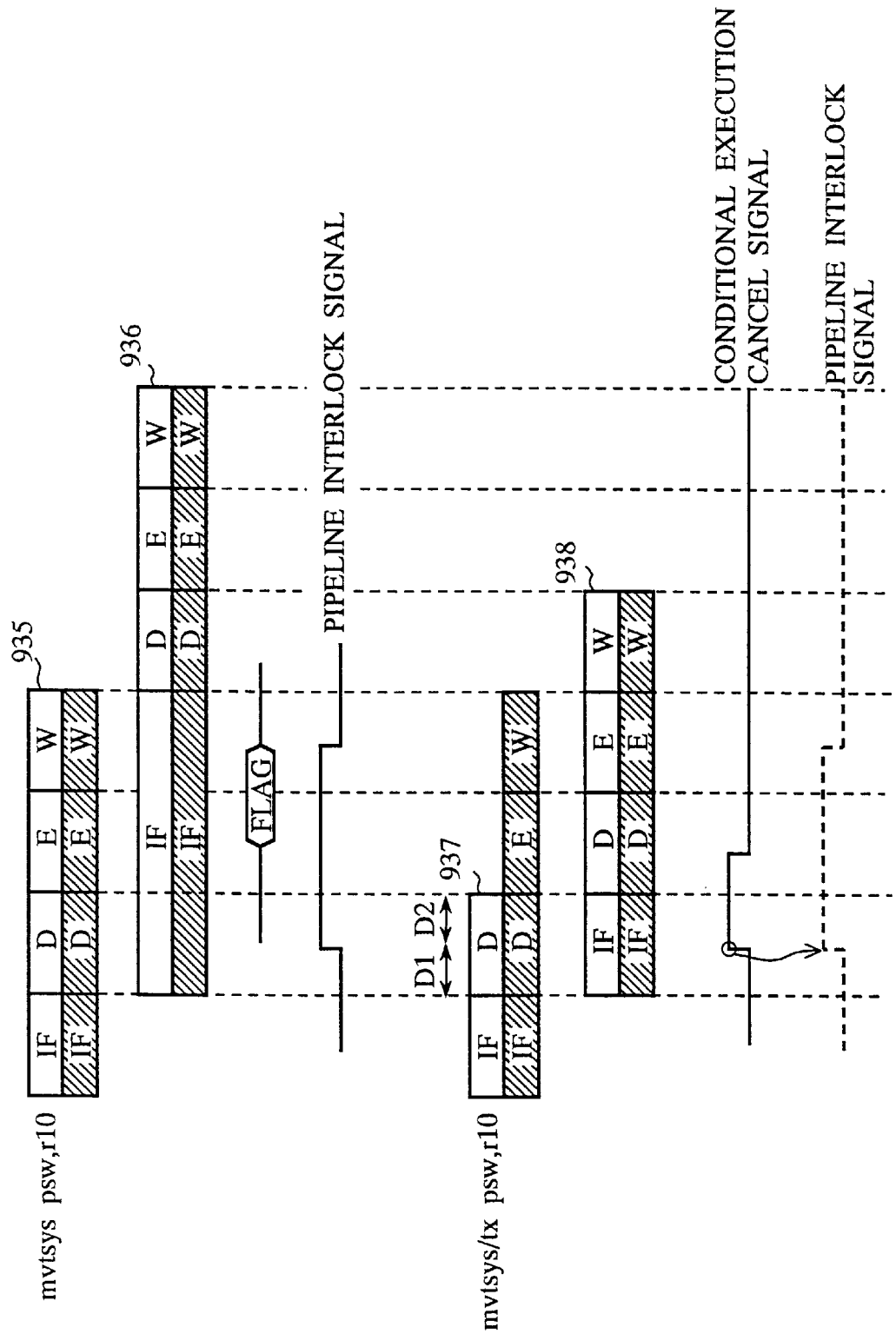
FIG. 26 is a timing chart showing a pipeline interlock cancel process when a mode flag is updated by the microprocessor having conditional execution instructions as the seventh embodiment according to the present invention.

FIG. 26 is a timing chart showing a pipeline interlock cancel process when a mode flag is updated by the microprocessor having conditional execution instructions as the seventh embodiment according to the present invention. In FIG. 26, the white sections designate the pipelines executed by the memory access unit 3 and the black sections denote the pipelines executed by the integer operation unit 4.

In FIG. 26, the reference number 935 designates the pipeline of the control register data transfer instruction to be executed by the memory access unit 3. The reference number 936 designates the pipeline of the instruction to be executed following the pipeline 935. The reference number 937 designates the pipeline of the control register data transfer instruction to be executed by the memory access unit 3 whose execution is canceled by the conditional execution decision. The reference number 938 denotes the pipeline of the instruction to be executed following the pipeline 937.

In the microprocessor of the seventh embodiment, when the control register data transfer instruction of the pipeline 935 updates the value of the mode flag, the updated mode flag is detected during D stage in the pipeline 935 and the pipeline interlock signal is generated. When the pipeline interlock signal is generated, the execution of the following instruction is halted during two clocks until the following instruction can be executed by using the mode flag updated in the E2 period in E stage in the pipeline 935. When the mode flag is updated, the penalty of the pipeline interlock of two clocks occurs.

In the pipeline 937 of the control register data transfer instruction whose execution will be canceled by the result of the conditional execution decision process, the conditional execution decision process is executed during D stage, the conditional execution cancel signal is generated in the D2 period in D stage. This conditional execution cancel signal cancels the pipeline interlock signal detected in D stage of the pipeline 937. Thereby, the microprocessor of the seventh embodiment can execute the following pipeline 938 without the penalty.

Next, a description will now be given of the operation of the microprocessor of the seventh embodiment.

Hereinafter, the pipeline interlock cancel process when the value of the mode flag is updated will be explained by using the block diagram of the microprocessor 1 shown in FIGS. 13A to 13D, the block diagram of the control circuit incorporated in the instruction decode unit 2 shown in FIG. 15, and the timing chart of the pipeline interlock cancel process when the mode flag is updated shown in FIG. 26.

When the control register data transfer instruction of the pipeline 935 shown in FIG. 26 is read from the instruction RAM 6 through the bus I2IDBUS shown in FIGS. 13A to 13D, this readout control register data transfer instruction is transferred to each control circuit such as the decoder circuits and the like through the selector 700 shown in FIG. 15. The decoder circuit 719 (mode flag decision circuit) shown in FIG. 15 then compares the instruction code of the control register data transfer instruction obtained from the selector 700 with the output from the register 702 for storing the instruction code in D stage, so that the decoder circuit 719 detects the occurrence of the pipeline interlock and then generates the pipeline interlock signal 734 and outputs it to the decoder circuit 717. The decoder circuit 717 generates the control signal to update the value of the instruction address register 29 shown in FIGS. 13A to 13D. The update control signal is canceled by the pipeline interlock cancel signal, so that it is thereby possible to halt the execution of IF stage in the pipeline 936 to be executed following the pipeline 935.

Like the pipeline 937 of the control register data transfer instruction shown in FIG. 26, when the conditional execution decision decides to cancel the execution of the pipeline of this control register data transfer instruction, the pipeline interlock signal is canceled by this conditional execution cancel signal 723 transferred from the conditional execution control circuit 722 to the decoder 719.

As described above, according to the microprocessor of the seventh embodiment, because the conditional execution cancel signal cancels the pipeline interlock signal for the instruction to be executed following the preceding instruction when the conditional execution decision decides to cancel the execution of the preceding instruction that updates the value of the mode flag, it is thereby possible to eliminate the penalty of the pipeline.

Eighth Embodiment

Figure 27:
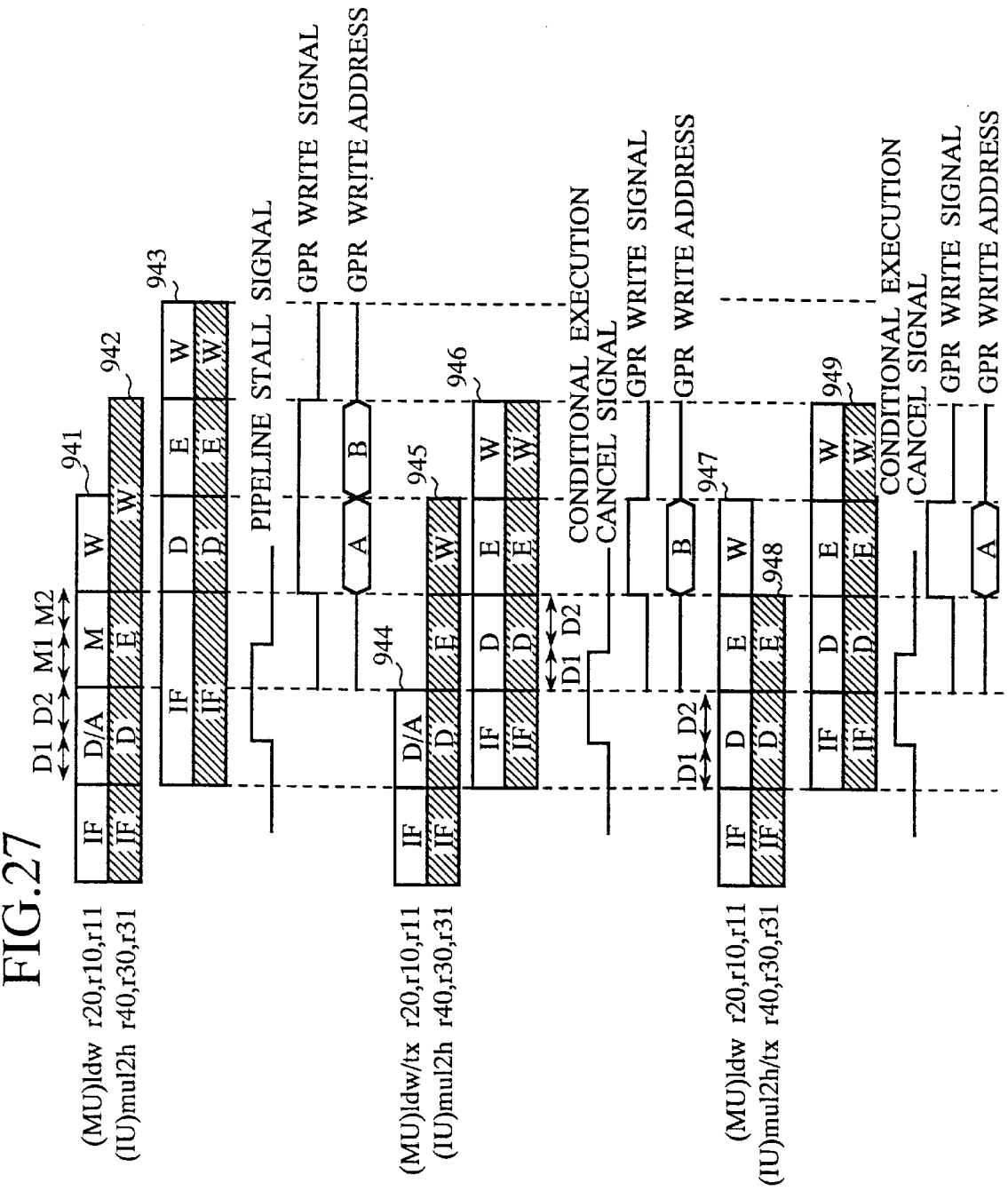
FIG. 27 is a timing chart showing a pipeline interlock cancel process when a resource conflict happens in the microprocessor having conditional execution instructions as the eighth embodiment according to the present invention.

FIG. 27 is a timing chart showing a pipeline interlock cancel process when a resource conflict happens in the microprocessor having conditional execution instructions as the eighth embodiment according to the present invention. In FIG. 27, the white sections designate the pipelines executed by the memory access unit 3 and the black sections denote the pipelines executed by the integer operation unit 4.

In FIG. 27, the reference number 941 designates the pipeline of the load instruction to be executed by the memory access unit 3. The reference number 942 designates the pipeline of the multiply instruction to be executed by the integer operation unit 4. Both the pipelines 941 and 942 are executed simultaneously. The reference number 943 designates the pipeline to be executed following both the pipelines 941 and 942. The reference number 944 denotes the pipeline of the load instruction to be executed by the memory access unit 3 whose execution will be canceled based on the result of the conditional execution decision process. The reference number 945 designates the pipeline of the multiply instruction to be executed by the integer operation unit 4. Both the pipelines 944 and 945 are executed simultaneously. The reference number 946 designates the pipeline to be executed following both the pipelines 944 and 945. The reference number 948 denotes the pipeline of the multiply instruction to be executed by the integer operation unit 4 whose execution will be canceled based on the result of the conditional execution decision process. The reference number 947 designates the pipeline of the load instruction to be executed by the memory access unit 3. Both the pipelines 947 and 948 are executed simultaneously. The reference number 949 designates the pipeline of the instruction to be executed following both the pipelines 947 and 948.

In the microprocessor of the eighth embodiment, like the pipelines 941 and 942 shown in FIG. 27, when both the load instruction and the multiply instruction are executed simultaneously by the memory access unit 3 and the integer operation unit 4, respectively, the data write process to the general purpose register file 5 in W stage causes the resource conflict (a resource collision).

In order to avoid the resource conflict, the execution of W stage in the pipeline 942 is stalled based on a pipeline stall signal shown in FIG. 27 by one clock. The result of the pipeline 942 is written into the general purpose register file 5 after one clock counted from the write operation of the result of the pipeline 941 to the general purpose register file 5.

This pipeline stall signal is generated during D stage in the pipelines 941 and 942 in order to stall IF stage in the pipeline 943 as the following instruction. Then, the general purpose register file (GRP) write signal of two clocks is generated and both the addresses A and B to which the results of the pipeline 941 and 942 are generated, respectively. Thus, when the resource conflict occurs, the penalty of the pipeline interlock of one clock is generated.

In the pipeline 944 of the load instruction whose execution is canceled by the decision result of the conditional execution decision process, the conditional execution decision performs in D stage, the conditional execution cancel signal is generated in the D2 period in D stage. This conditional execution cancel signal cancels the pipeline stall signal. Both the GRP write signal and the address B by which the result of the pipeline 945 is written into the general purpose register file 5 are generated simultaneously. Thereby, the microprocessor of the eighth embodiment can execute the pipeline 946 following the pipeline 945 without penalty.

In the pipeline 948 of the multiply instruction whose execution is canceled by the result of the conditional execution decision, the conditional execution decision performs in D stage, the conditional execution cancel signal is generated in the D2 period in D stage. This conditional execution cancel signal cancels the pipeline stall signal. Both the GRP write signal and the address A by which the result of the pipeline 947 is written into the general purpose register file 5 are generated simultaneously. Thereby, the microprocessor of the eighth embodiment can execute the pipeline 949 following the pipeline 947 without the penalty.

Next, a description will now be given of the operation of the microprocessor of the eighth embodiment.

Hereinafter, the pipeline interlock cancel process when the resource conflict occurs with reference to the block diagram of the microprocessor 1 shown in FIGS. 13A to 13D, the block diagram of the control circuit incorporated in the instruction decode unit 2 shown in FIG. 15, and the timing chart of the pipeline interlock cancel process when the resource conflict occurs as shown in FIG. 27.

When the load instruction and the multiply instruction of the pipelines 941 and 942 shown in FIG. 27 are read from the instruction RAM 6 through the bus I2IDBUS shown in FIGS. 13A to 13D, this readout instructions are transferred to each control circuit such as the decoder circuits and the like through the selector 700 shown in FIG. 15.

The decoder circuit 719 (simultaneous use decision circuit) shown in FIG. 15 detects the occurrence of the pipeline interlock caused by the resource conflict based on the instruction code obtained from the selector 700. Then, the decoder circuit 719 generates the pipeline interlock signals 730, 732, and 735 and outputs them to the instruction code write generation circuit 720, and the decoder circuits 716 and 718 (collision avoidance circuits). The update operation for the value of the register 705 is controlled by using the write signal to be transferred from the instruction code write signal generation circuit 720 to the register 705 and then the instruction code in W stage is kept during two clocks. The decoder circuit 716 decodes the instruction code in W stage, outputs the GRP write signal to be transferred to the memory access unit 3 at first, and then outputs the GRP write signal to the integer operation unit 4.

The decoder circuit 717 processes the updated control signal for the instruction address register 29 shown in FIGS. 13A to 13D so that the value of the instruction address register 29 is not updated. Thereby, the execution of IF stage in the pipeline 943 can be stalled and the execution of the following stages are continued.

Like the pipeline 944 of the load instruction shown in FIG. 27, when the conditional execution decision decides to cancel the execution of the pipeline of this load instruction, the pipeline stall signal is canceled by this conditional execution cancel signal 723 transferred from the conditional execution control circuit 722 to the decoder 719. In the decoder circuit (collision avoidance circuit) 716 outputs the GRP write signal used for writing the operation result of the integer operation unit 4. In addition, like the pipeline 948 of the multiply instruction shown in FIG. 27, when the conditional execution decision decides to cancel the execution of the pipeline of this multiply instruction, the pipeline stall signal is canceled by this conditional execution cancel signal 723 transferred from the conditional execution control circuit 722 to the decoder 719. In the decoder circuit (collision avoidance circuit) 716 outputs the GRP write signal used for writing the operation result of the memory access unit 3.

As described above, according to the microprocessor of the eighth embodiment, because the conditional execution cancel signal cancels the pipeline stall signal when the pipeline interlock occurs based on a resource conflict and the conditional execution decision decides to cancel the execution of one of the sub instructions causing this resource conflict. It is thereby possible to eliminate the penalty of the pipeline.

Ninth Embodiment

Figure 28:
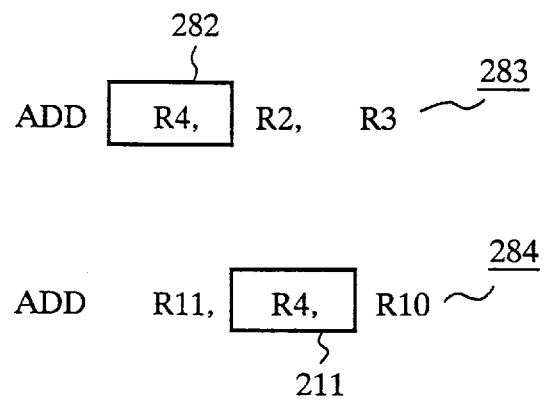
FIG. 28 is a diagram showing an example of a program in a data hazard occurs in the microprocessor of the ninth embodiment according to the present invention.

FIG. 28 is a diagram showing an example of a program in which a data hazard occurs in the microprocessor of the ninth embodiment according to the present invention. The data interference will be explained later.

In FIG. 28, the ADD instruction is the instruction that adds the values stored in registers in the general purpose register file 5 addressed by the second operand and the third operand and writes the operation result into a register in the general purpose register file 5 addressed by the first operand.

In the ADD instruction 283, the values stored in both the general purpose registers R2 and R3 are added, and the operation result is written into the general purpose register R4.

In the ADD instruction 284, the values stored in both the general purpose registers R10 and R4 are added, and the operation result is written into the general purpose register R4. In the ADD instruction 284, the value of the general purpose register R4 is equal to the addition result of the ADD instruction 283.

In the ADD instruction 283, because the write operation to the general purpose register R4 is performed during the W2 period and the write operation to the general purpose register R4 is not completed during the D2 period in the ADD instruction 284, the value in the general purpose register R4 that is read during the D1 period in the ADD instruction 284 can not be used for operation. This situation is called data interference. In the situation causing the data interference, the addition result of the ADD instruction 283 is transferred directly during the D2 period in the pipeline of the ADD instruction 284 through a dedicated data transfer bypass.

Figure 29:
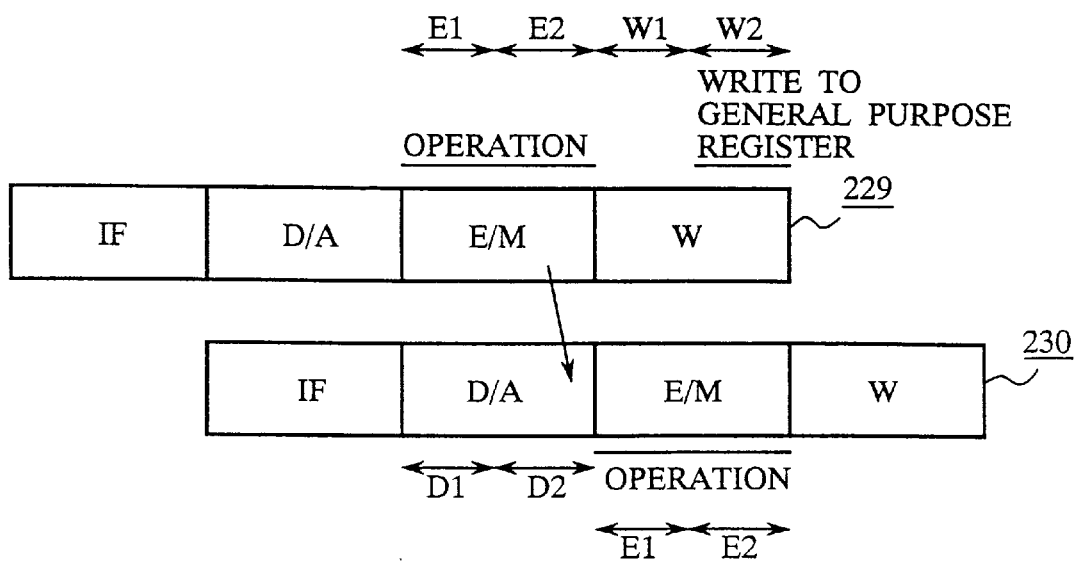
FIG. 29 is a diagram showing the operation of the pipeline when the program shown in FIG. 28 is executed.

FIG. 29 is a diagram showing the operation of the pipeline when the program shown in FIG. 28 is executed. In FIG. 29, the reference number 229 designates the pipeline corresponding to the instruction 283, 230 denotes the pipeline corresponding to the instruction 284. It is noted that the stages between both the pipelines 229 and 230 designated in a same column are executed simultaneously. As shown by the arrow in FIG. 29, the addition result is transferred during the E2 period in the pipeline 229 and the D2 period in the pipeline 230 through the bypass, so that the instruction can be executed without confusing the pipeline.

Figure 30:
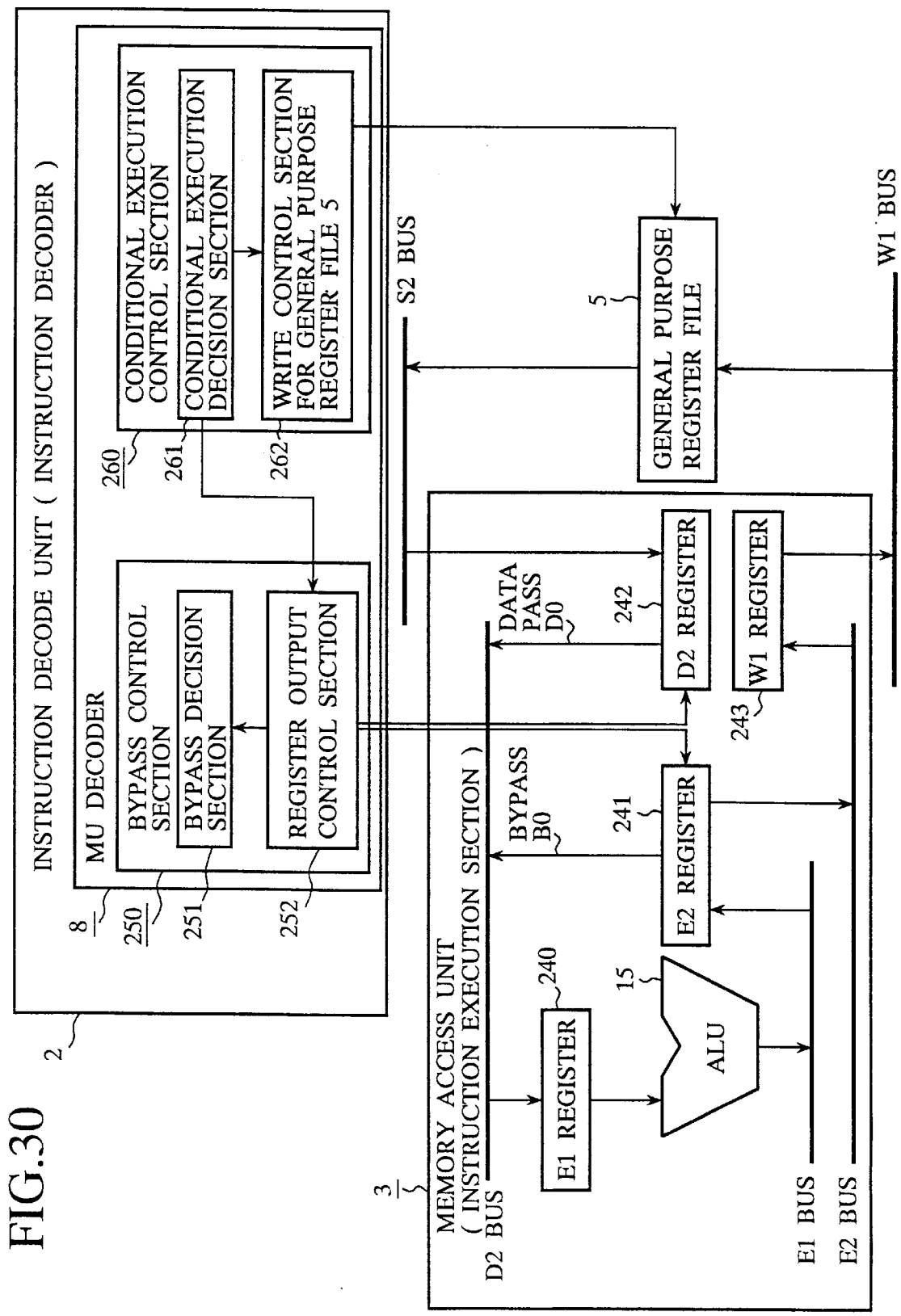
FIG. 30 is a block diagram showing the microprocessor of the ninth embodiment when the program shown in FIG. 28 is executed.

FIG. 30 is a block diagram showing the microprocessor of the ninth embodiment when the program shown in FIG. 28 is executed. The microprocessor of the ninth embodiment comprises the ALU 15, the general purpose register file 5, the memory access unit 3, the MU decoder 8 whose reference numbers are the same as those of the microprocessor of the first embodiment shown in FIG. 4.

In the memory access unit 3, the reference number 240 designates the E1 register for receiving and storing data output on the D2 bus during the E1 period, and for outputting the received data to the ALU 15. The reference number 241 denotes the E2 register for receiving and storing data output from the ALU 15 through the E1 bus during the E2 period, and for outputting the received data to the E2 bus, and for further outputting the received data to the D2 bus through the bypass B0 according to the control signal output from the register output control section 252. The reference number 242 denotes the D2 register for receiving and storing data output from the general purpose register file 5 through the S2 bus during the D2 period, and for outputting the received data to the D2 bus through the data pass D0 according to the output from the register output control section 252. The reference number 243 indicates the W1 register for receiving the output from the E2 register 242 through the E2 bus during the W1 period, and for outputting the received data to the W1 bus.

In the MU decoder 8, the reference number 250 indicates the bypass control section for performing the bypass control, and 260 denotes the conditional execution control section for controlling the execution of the conditional execution instruction.

In the bypass control section 250, the reference number 251 designates the bypass decision section for judging whether the data interference occurs or not. The reference number 252 indicates the register output control section for outputting the control signal by which the output operation of the E2 register 241 and the D2 register 242 to the D2 bus is controlled.

In the conditional execution control section 260, the reference number 261 designates the conditional execution decision section for judging whether the conditional execution instruction is valid or invalid, 262 indicates the general purpose register write control section for controlling the write operation to the general purpose register file 5 according to the decision result of the conditional execution decision section 261.

Figure 31:
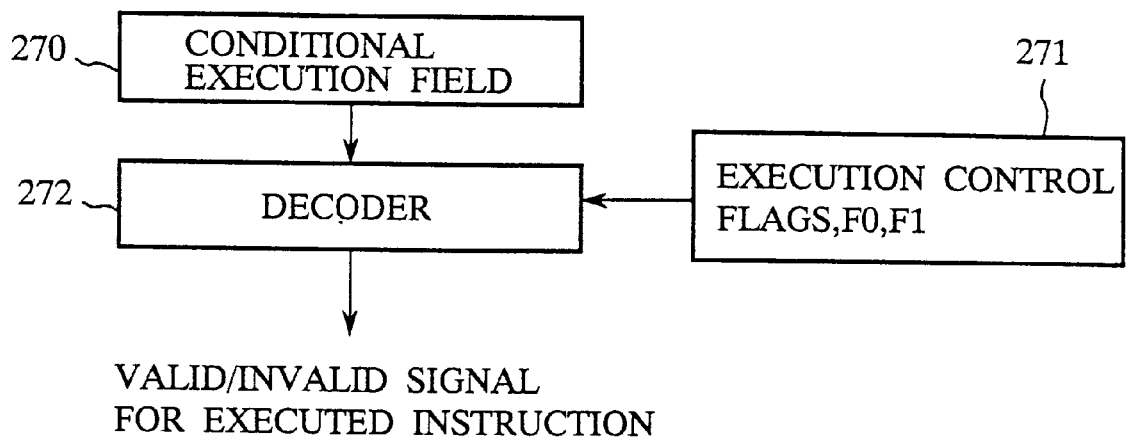
FIG. 31 is a block diagram showing the configuration of a conditional execution decision section.

FIG. 31 is a block diagram showing the configuration of the conditional execution decision section 261. In FIG. 31, the reference number 271 designates flags that are the same of the F0 flag 181 and F1 flag 182. The reference number 272 indicates the decoder for decoding the condition that has been set in the conditional execution field 270 and for checking whether the condition set in the conditional execution field 270 is equal to the condition set in the execution control flag 271.

Next, a description will now be given of the operation of the microprocessor as the ninth embodiment.

First, the operation of the microprocessor having conditional execution instructions when it executes the program shown in FIG. 28 will be explained.

The addition result of the instruction 283 in the program shown in FIG. 28 is transferred from the ALU 15 through the E1 bus to the E2 register and stored in the E2 register during the E2 period. The output from the E2 register is stored in the W1 register 243 during the W1 period in the pipeline of the instruction 283 through the E2 bus.

When the instruction 283 is executed, the conditional execution field 270 is CC=000, as prescribed above, this instruction is always active in spite of the value of the execution control flag 271. Accordingly, the conditional execution decision section 261 decides that this instruction is active, and then transfers the decision result to both the general purpose write control section 262 and the register output control section 252. The general purpose register write control section 262 outputs the control signal indicating the permission of the write operation to the general purpose register file 5 according to the decision result from the conditional execution decision section 261.

The data stored in the W1 register 243 is written into the general purpose register file 5 during the W2 period in the pipeline of the instruction 283 according to the control signal from the general purpose register write control section 262. The data R4 in the instruction 284 is transferred from the general purpose register file 5 and then stored into the D2 register 242 during the D2 period through the S2 bus.

The bypass decision section 251 decides that the instruction 284 causes the data interference, and transfers the decision result to the register output control section 252. The register output control section 252 outputs the control signal, that indicates the permission of the write operation to the D2 bus, to the E2 register 241 and also outputs the control signal, that indicates the prevention of the write operation to the D2 bus, to the D2 register storing the data of the general purpose register file 5.

The E2 register 241 outputs the stored data to the D2 bus according to the control signal from the register output control section 252. On the other hand, the D2 register 242 outputs no stored data to the D2 bus according to the control signal from the register output control section 252. The E1 register 240 receives and stores the output data transferred from the E2 register through the D2 bus during the E1 period of the pipeline of the instruction 210 and then outputs the received data to the ALU 15.

Next, the operation of the microprocessor as the ninth embodiment when the instruction 283 in the program shown in FIG. 28 is a conditional execution instruction.

Figure 32:
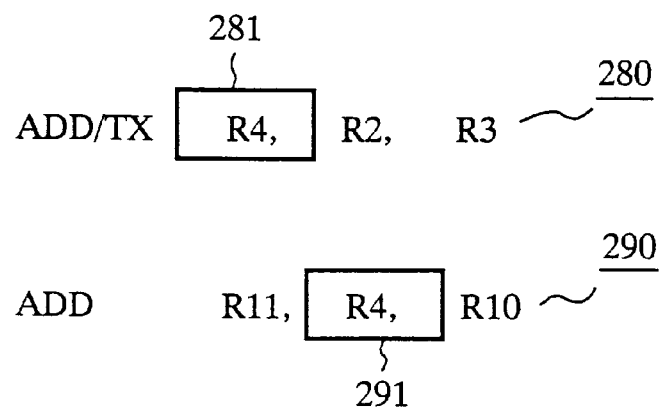
FIG. 32 is an explanation diagram showing the occurrence of data interference when an instruction in the program shown in FIG. 28 is a conditional execution instruction.

FIG. 32 is an explanation diagram showing the occurrence of data interference when an instruction in the program shown in FIG. 28 is the conditional execution instruction. In FIG. 32, the instruction 280 is the conditional execution instruction. Because the "/TX" is described in this instruction 280, the instruction 280 becomes active when the value of the execution control flag F0 is "1" and becomes inactive when the execution control flag F0 is "0". In this case, the status of the F1 flag does not matter.

When the instruction 280 is active, the value of the general purpose register (R4) 291 in the instruction is equal to the value of the addition result of the instruction 280. When the instruction 280 is inactive, the value of the general purpose register (R4) 291 in the instruction 290 is equal to the value before the instruction 280 is executed. The addition result of the instruction 280 shown in FIG. 32 is transferred from the ALU 15 to the E2 register 241 through the E1 bus and then stored into the E2 register during the E2 period of the pipeline of the instruction 283. The output from the E2 register 241 is stored into the W1 register 243 through the E2 bus during the W1 period in the pipeline of the instruction 280.

In the case of the instruction 280, the conditional execution field 270 is CC=001, the conditional execution decision section 261 decides that the instruction 280 is active when the F0 flag of the execution control flag 271 is "1" and the instruction 280 is inactive when the F0 flag of the execution control flag 271 is "0". The conditional execution decision section 261 outputs the decision result to both the general purpose register write control section 262 and the register output control section 252.

First, when the instruction 280 is active, the same operation in which the microprocessor executes the program shown in FIG. 28 will be executed.

Next, the operation will now be explained when the instruction 280 is inactive.

The general purpose register write control section 262 outputs the control signal indicating the prevention of the write operation to the general purpose register file 5 according to the decision result of the conditional execution decision section 261. The data stored in the W1 register 243 is not written into the general purpose register file 5 according to the control signal from the general purpose register write control section 262. The D2 register receives and stores data in the general purpose register file 5 addressed by R4 in the instruction 290 through the S2 bus during the D2 period in the pipeline of the instruction 290.

The bypass decision section 251 decides the occurrence of the data interference as the data hazard of the instruction 210, outputs the decision result to the register output control section 252.

The register output control section 252 outputs the control signal, that indicates the permission of the write operation of the data output to the D2 bus through the data pass D0, to the D2 register 242 storing the data of the general purpose register file 5.

The E2 register 241 does not output the stored data to the D2 bus through the bypass B0 according to the control signal transferred from register output control section 252.

On the other hand, the D2 register 242 outputs the stored data to the D2 bus according to the control signal from the register output control section 252. The E1 register 240 receives the output data from the E2 register through the D2 bus during the E1 period of the pipeline of the instruction 284 and then outputs the received data to the ALU 15. The ALU 15 performs the addition calculation based on the output data from the E1 register.

As described above, according to the microprocessor of the ninth embodiment, the occurrence of the data interference caused between the pipelines of instructions including a conditional execution instruction is detected. Then, the output from the register output control section 252, whose operation is performed based on the decision result of the bypass decision section 251, is controlled according to the decision result of the conditional decision section 261 in the execution conditional execution control section 260. Thereby, the data transfer through the bypass B0 and the data pass D0 is controlled. It is thereby possible to execute the instruction efficiently and to avoid wrong operation caused by the data interference or the data hazard, even if the data interference occurs among the pipelines of the instructions including conditional execution instructions.

Tenth Embodiment

Figure 33:
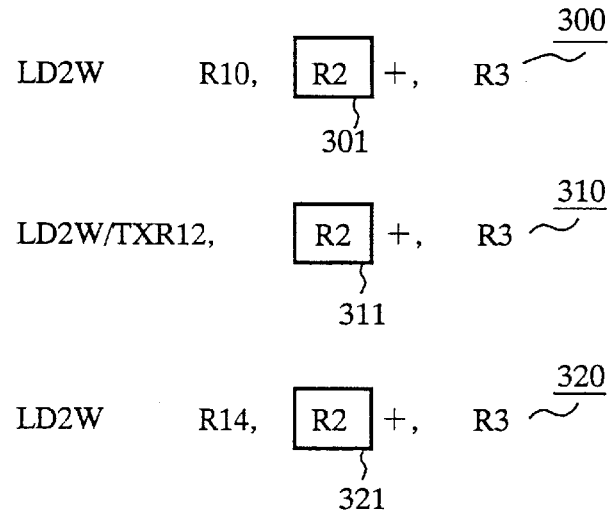
FIG. 33 is an explanation diagram showing an example of a program to be executed by the microprocessor of the tenth embodiment according to the present invention.
Figure 35:
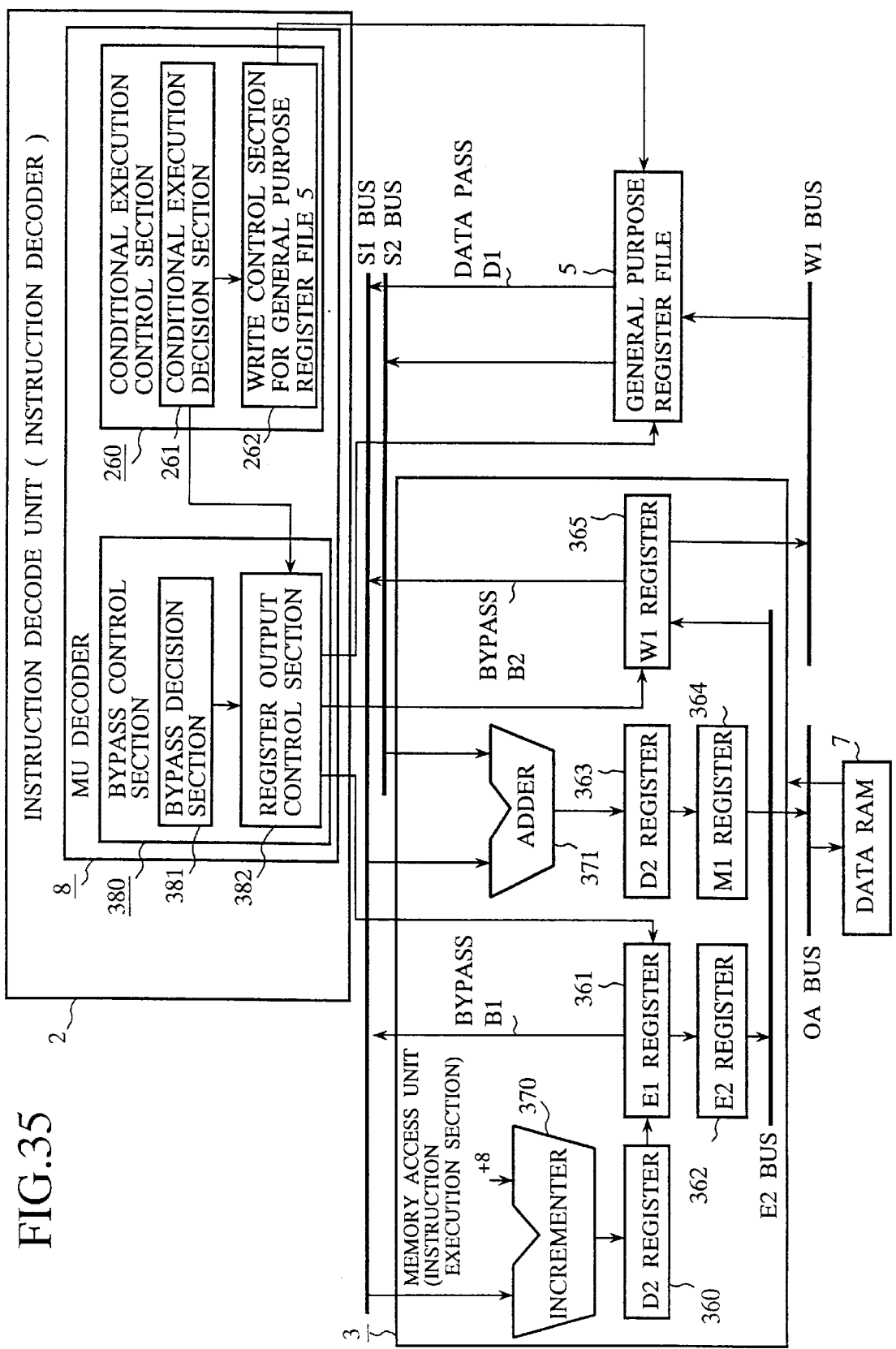
FIG. 35 is a block diagram showing the configuration of the microprocessor of the tenth embodiment when the program shown in FIG. 33 is executed.

FIG. 33 is an explanation diagram showing an example of a program to be executed by the microprocessor of the tenth embodiment according to the present invention. FIG. 35 is a block diagram showing the configuration of the microprocessor of the tenth embodiment when the program shown in FIG. 33 is executed. The components in the microcomputer of the tenth embodiment that are equal in function and configuration to the components of the ninth embodiment shown in FIG. 30 and of the microprocessor shown in FIG. 4, and FIGS. 13A to 13D are referred by the same reference numbers. Therefore the explanation of the same components are omitted here for brevity.

The LD2W instruction 300 shown in FIG. 33 reads a 8-byte data item stored in the memory addressed by a memory address obtained by the sum of values set in the general purpose registers designated by the second operand and the third operand, and writes the readout 8 byte data item into the general purpose registers addressed by the first operand and by the address obtained by adding the register number set in the general purpose register by 1. In FIG. 33, the reference character "+" in the second operand designates that the addressing mode is a post increment. After the data is read from the memory, the value in the general purpose register designated by the second operand is added by 8.

In the program shown in FIG. 33, the instruction 300 reads a 8-byte data item from the memory addressed by the memory address that is the sum of the values of the registers R2 and R3, and then writes this 8-byte data item to the registers R10 and R11. The value in the register R2 is added by the value "8" after the data readout.

The instruction 310 is a conditional execution instruction. The character "/TX" in the instruction 310 designates that the instruction 310 becomes active when the execution control flag F0 is "1" and becomes inactive when the execution control flag F0 is "0". In this case, the status of the F1 flag does not matter. When the instruction 310 is active, a data item is read from the memory addressed by the sum of the values of the register R2 and R3 that have been updated by the execution of the instruction 300 and then written into the registers R12 and R13. After the data readout from the memory, the value in the register R2 is added by 8.

When the instruction 310 is inactive, the values of the registers R12, R13, and R2 are not changed.

When the instruction 310 is active, the instruction 320 reads the data stored in the memory addressed by the sum of the register R3 and the register R2 whose value has been updated by the execution of the instruction 310, and writes the readout data item into the register R14 and R15.

When the instruction 310 is inactive, the instruction 320 reads the data stored in the memory addressed by the sum of the registers R3 and R2 whose value has been updated by the execution of the instruction 300, and writes this data item into the registers R14 and R15. After the data readout from the memory, the value in the register R2 is added by the value "8".

Figure 34:
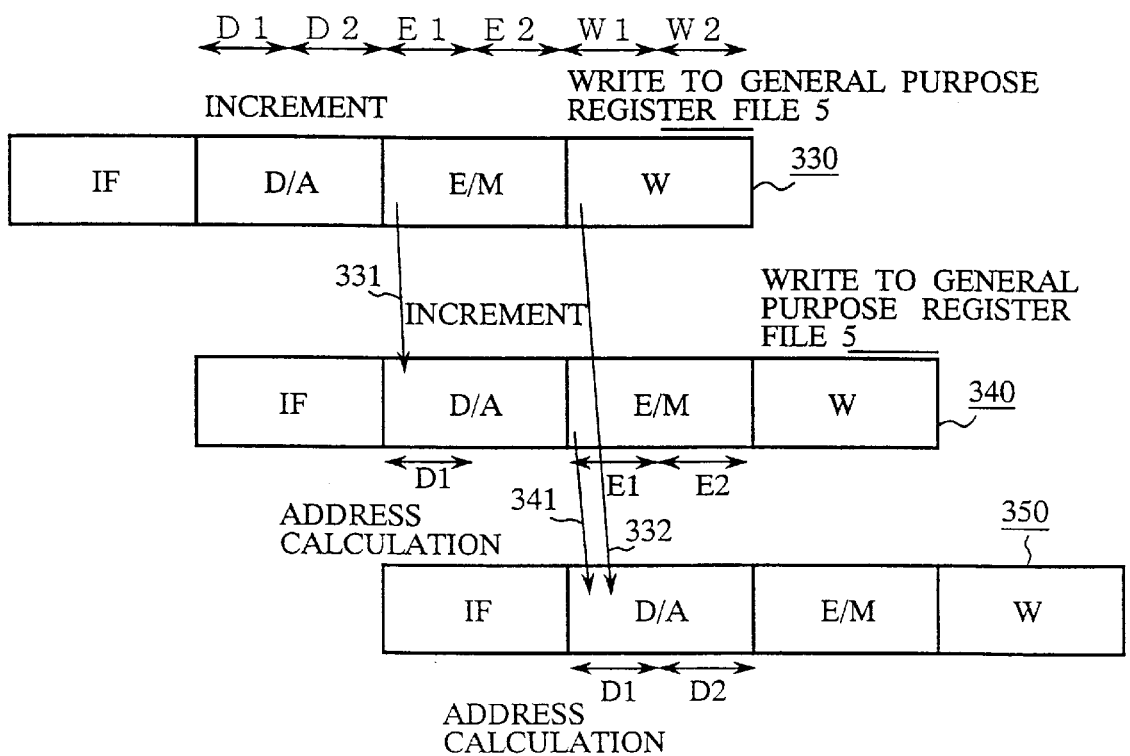
FIG. 34 is a diagram showing the operation of a pipeline when the microprocessor of the tenth embodiment shown in FIG. 35 executes the program shown in FIG. 33.

FIG. 34 is a diagram showing the operation of a pipeline when the microprocessor of the tenth embodiment shown in FIG. 35 executes the program shown in FIG. 33. In FIG. 34, the pipeline 330 corresponds to the instruction 300 and the pipeline 340 corresponds to the instruction 310, and the pipeline 350 corresponds to the instruction 320.

FIG. 34 shows that the stages designated in a same column among the pipelined 330, 340, and 350 are executed simultaneously. In the instruction 300, because the value obtained by the addition of the value of the register R2 and the value "8" is written into the register R2 during the W2 period in the pipeline 330, it is not updated during D1 period of the pipeline 340 of the instruction 310 in which the value of the register R2 is read by the instruction 310. This causes the data interference or data hazard. Thereby, as shown by the arrow 331, the value of the register R2 that has been updated during the D1 period in the pipeline 330 of the instruction 300 is transferred during the E1 period in the pipeline 330 of the instruction 300 and the D1 period in the pipeline 340 of the instruction 310.

When the instruction 310 is active, because the updated value is written into the register R2 during the W2 period in the pipeline 330, the value of the register R2 is not updated during D1 period in the pipeline 350 of the instruction 320 in which the value of the register R2 is read by the instruction 320. This causes the data interference or data hazard. Accordingly, as shown by the arrow 341, the value of the register R2 that has been updated by the instruction 310 during the D1 period in the pipeline 340 is transferred to the pipeline 350 of the instruction 320 during the D1 period in the pipeline 350 of the instruction 320 and the E1 period in the pipeline 340 of the instruction 310.

When the instruction 310 is inactive, because the value that is updated by the sum of the value of the register R2 and the value "8" is written into the register R2 during the W2 period in the pipeline 330 of the instruction 300, the value of the register R2 is not updated during D1 period in the pipeline 350 of the instruction 320 in which the value of the register R2 is read by the instruction 320. This causes the data interference or data hazard. Thereby, as shown by the arrow 332, the value of the register R2 that has been updated by the instruction 300 during the D1 period in the pipeline 330 is transferred to the pipeline 350 of the instruction 320 during the D1 period in the pipeline 350 of the instruction 320 and the W1 period in the pipeline 330 of the instruction 300.

FIG. 35 is the block diagram showing the configuration of the microprocessor of the tenth embodiment when the program shown in FIG. 33 is executed. In FIG. 35, the The microprocessor of the tenth embodiment comprises the ALU 15, the general purpose register file 5, the memory access unit 3, the MU decoder 8 whose reference numbers are the same as those of the microprocessor of the first embodiment shown in FIG. 4. The conditional execution control section 260 is equal in configuration and function to that of the microprocessor of the ninth embodiment shown in FIG. 30.

In the memory access unit 3 as the instruction execution unit shown in FIG. 35, the reference number 360 designates the D2 register for receiving and storing data output from the incrementer 370 during the D1 period, and for outputting the received data to the E1 register 361. The reference number 361 denotes the E1 register for receiving and storing data output from the D2 register 360 bus during the E1 period, and for outputting the received data to the E2 register, and for further outputting the received data to the S1 bus through the bypass B1 according to the control signal output from the register output control section 382. The reference number 363 denotes the D2 register for receiving and storing data output from the adder 371 during the D2 period, and for outputting the received data to the M1 register. The reference number 364 indicates the M1 register for receiving the output from the D2 register 363 during the E1 period, and for outputting the received data to the OA bus. The reference number 365 indicates the W1 register for receiving the data on the E2 bus during the W1 period, and for outputting the received data to the W1 bus and for further outputting the received data to the S1 bus through the bypass S2. The reference number 370 indicates the incrementer for incrementing the data on the S1 bus by the value "8" and for outputting the added data. The reference numbers 371 indicates the adder for adding the data on the S1 bus and the data on the S2 bus and for outputting the addition result to the D2 register 363.

In the MU decoder 8, The reference number 380 denotes the bypass control section for controlling the operation of the bypasses B1 and B2.

In the bypass control section 380, the reference number 381 designates the bypass decision section for judging whether the data interference or the data hazard occurs between the pipelines to execute instructions or not and for checking the state of the data interference when the data interference occurs, and for outputting the decision result to the register output control section 382. The reference number 382 designates the register output control section for performing the data transfer operation of the value in the E1 register 361 through the bypass B1 according to the decision result obtained from the bypass decision section 381 and the decision result of the conditional execution decision section 261, for performing the data transfer of the value in the W1 register 365 through the bypass B2, and for outputting control signals, that control the data transfer to the S1 bus from the general purpose register file 5 through the data pass D1, to the E1 register 361, the W1 register 365, and the general purpose register file 5.

Next, a description will now be given of the operation of the microprocessor of the tenth embodiment.

First, the operation when the microprocessor of the tenth embodiment executes the program shown in FIG. 33 will be explained.

In the execution of the instruction 300, the data items stored in both the register R2 and R3 in the general purpose register file 5 are transferred to the adder 371 through the S1 bus and the S2 bus, respectively. In addition to this, the data in the register R2 is also transferred to the incrementer 370 through the S1 bus. The addition result of the adder 371 is transferred to the OA bus through the D2 register 363 and the M1 register 364 as the memory address of the data RAM 7.

On the other hand, the incrementer 370 adds the value in the register R2 in the general purpose register file 5 by 8 and outputs the addition result to the E1 register 361 through the D2 register 360.

The received and stored data in the E1 register is also stored in the E2 register 362 and output to the W1 register through the E2 bus.

The data stored in the register W1 is transferred to the general purpose register file 5 through the W1 bus in order to update the value of the register R2.

In the instruction 310 shown in FIG. 33, the bypass decision section 381 decides the occurrence of the data interference about the value of the register R2 between the instructions 310 and the instruction 300, and outputs the decision result to the output control section 382. The register output control section 382 outputs the control signal, that indicates the permission of the output to the S1 bus, to the E1 register storing the addition result of the register R2 obtained by the execution of the instruction 300, and outputs the control signal, that indicates the prevention of the output to both the W1 register 365 and the general purpose register file 5. The data from the E1 register 361 that is output to the S1 bus through the bypass B1 is transferred to both the adder 371 and the incrementer 370. The addition result of the adder 371 is output to the OA bus through the D2 register 363 and the M1 register 364 as the memory address for the data RAM 7. The addition result of the incrementer 370 is stored in the E1 register 361 through the D2 register 360. The data stored in the E1 register 361 is also stored in the E2 register 362 and then output to the W1 register 365 through the E2 bus. The data stored in the W1 register 365 is output to the general purpose register file 5 through the W1 bus.

The conditional execution field is CC=001. The conditional execution decision section 261 decides that the instruction 310 is active when the value of the F0 flag of the execution control flag 271 is "1", and outputs the decision result to both the general purpose register write control section 262 and the register output control section 382, simultaneously. When the instruction 310 is active, the general purpose register write control section 262 outputs the control signal, that indicates the permission of the writing, to the general purpose register file 5. Thereby, the general purpose register file 5 stores the updated value of the register R2 on the W1 bus into the register.

When the instruction 310 is inactive, the general purpose register write control section 262 outputs the control signal, that indicates the prevention of the writing, to the general purpose register file 5. Thereby, the general purpose register file 5 does not perform the writing operation of the updated result of the R2 register on the W1 bus.

In the instruction 320, the bypass decision section 381 decides the occurrence of the data interference or the data hazard about the value of the register R2 between the instructions 300, 310, and 330, outputs the decision result to the register output control section 382.

According to the decision result for the instruction 310 output from the conditional execution decision section 261, the register output control section 382 outputs the control signal, that indicates the permission of the write operation of the data output to the S1 bus through the bypass B1, to the E1 register 261 storing the addition result for the register R2 obtained by the execution of the instruction 310 when the instruction 310 is active. Furthermore, the register output control section 382 outputs the control signal, that indicates the prevention of the writing to the S1 bus through the bypass B2 and the data pass D1, to the general purpose register file 5 and the W1 register 365 storing the addition result for the register R2 obtained by the execution of the instruction 300.

When the instruction 310 is inactive, the register output control section 382 outputs the control signal, that indicates the prevention of the data transfer to the S1 bus through the bypass B1 and the data pass D1, to the general purpose register file 5 and the E1 register 361 storing the addition result for the register R2 obtained by the execution of the instruction 310. Furthermore, the register output control section 382 also outputs the control signal, that indicates the permission of the data transfer to the S1 bus through the bypass B2, to the W1 register 365 storing the addition result for the register R2 obtained by the execution of the instruction 300.

When the instruction 310 is active, the incrementer 370 and the adder 371 input the data from the E1 register through the S1 bus.

On the other hand, when the instruction 310 is inactive, both the incrementer 370 and the adder 371 input the data from the W1 register 365 through the S1 bus. The addition result of the adder 371 is transferred to the OA bus through the D2 register 363 and the M1 register 364 as the memory address for accessing the data RAM 7.

The addition result of the incrementer 370 is transferred to the E1 register 361 through the D2 register 360. The data stored in the E1 register 361 is transferred and stored into the E2 register 362 and also output to the W1 register through the E2 bus. The data stored in the W1 register is output to the general purpose register file 5 through the W1 bus.

As described in detail, according to the microprocessor of the tenth embodiment, the conditional execution decision section 261 in the conditional execution control section 260 incorporated in the instruction decode unit 2 controls the output from the bypass decision circuit 381 in the bypass control section 380 to check the state of the data interference, controls the control signal provided by the register output control section 382, and selects the bypasses B1 and B2 and the data pass D1 in order to execute the data transfer. It is thereby possible to execute the instruction efficiently and to avoid wrong operation caused by the data interference or the data hazard, even if the data interference occurs among a plurality of pipelines including instructions having conditional execution instruction.

As set forth above in detail, according to the present invention, a microprocessor having conditional execution instructions comprises a memory section comprising an instruction RAM for storing instructions including the conditional execution instructions forming a program and a data RAM for storing data, an instruction decoder, connected to the memory section, for decoding the instructions, control registers for storing information to control execution of the instructions, a plurality of registers for storing the data, an operation unit for performing arithmetic operations, instruction execution units, connected to the instruction decoder, for performing the instructions according to output from the instruction decoder, an execution halt circuit for temporarily halting the execution of a current instruction, that is currently executed, according to a preceding instruction in the program, a conditional execution decision circuit for judging whether the current instruction is executed or not, and a conditional execution control circuit for canceling a starting signal to initiate the execution of the preceding instruction when the conditional execution decision circuit decides to cancel the execution of the preceding instruction. Hence, this makes it possible to have the effect to eliminate the penalty of a pipeline.

Furthermore, according to the present invention, the microprocessor having conditional execution instructions has the configuration in which the execution halt circuit halts the execution of the current instruction until a memory access completion signal indicating the completion of the memory accessing is transferred from the memory section when the preceding instruction accesses the memory section and it requires several clocks to transfer the memory access completion signal from the memory section, the operation of the conditional execution decision circuit is controlled according to the memory access completion signal transferred from the memory section, the conditional execution decision circuit decides whether the execution of the preceding instruction is permitted or not according to a value of conditional execution field in the current instruction and a value of a general purpose flag in the control registers, and the conditional execution control circuit cancels an access start signal to initiate the memory access operation of the preceding instruction when the conditional execution decision circuit decides to cancel the execution of the preceding instruction. Hence, this makes it possible to have the effect to eliminate the penalty of a pipeline.

Moreover, according to the present invention, the microprocessor having conditional execution instructions further comprises a data interference decision circuit for judging whether a destination register designation field of the preceding instruction is equal to a source register designation field of the current instruction when the current instruction reads the operation result of the preceding instruction from a general purpose register in the memory section before the preceding instruction writes this operation result to the general purpose register, and a bypass through which the operation result of the preceding instruction is directly transferred to the instruction execution units to execute the current instruction without through the general purpose register, and wherein the execution halt circuit halts the execution of the current instruction until the operation result of the preceding instruction can be transferred through the bypass, and wherein the conditional execution decision circuit judges whether the execution of the preceding instruction can be performed or not according to the value of the execution conditional field in the preceding instruction and the value of the general purpose flag obtained from the control registers, and wherein the operation of the execution halt circuit and the bypass are controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit and cancels the control signal indicating to control the operation of the bypass for transferring the operation result of the preceding instruction to the instruction execution units to execute the current instruction. Hence, this makes it possible to have the effect to eliminate the penalty of a pipeline.

Furthermore, according to the present invention, the microprocessor having conditional execution instructions further comprises a data interference decision circuit for judging whether a destination register designation field of the preceding instruction is equal to a source register designation field of the current instruction when the current instruction reads the operation result of the preceding instruction from a general purpose register in the memory section before the preceding instruction writes this operation result to the general purpose register, wherein the execution halt circuit halts the execution of the current instruction until the operation result of the preceding instruction is written into the general purpose register, and wherein the conditional execution decision circuit judges whether the execution of the preceding instruction can be performed or not according to the value of the execution conditional field in the preceding instruction and the value of the general purpose flag obtained from the control registers, and wherein the operation of the execution halt circuit is controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit. Hence, this makes it possible to have the effect to eliminate the penalty of a pipeline.

Still further, according to the present invention, the microprocessor having conditional execution instructions further comprises a data interference decision circuit for judging whether a destination register designation field of the preceding instruction is equal to a source register designation field of the current instruction when the current instruction executed by a different instruction execution unit reads the operation result of the preceding instruction from a general purpose register in the memory section before the preceding instruction writes this operation result to the general purpose register, and a bypass through which the operation result of the preceding instruction is directly transferred to the different instruction execution unit to execute the current instruction without through the general purpose register, and wherein the execution halt circuit halts the execution of the current instruction until the operation result of the preceding instruction can be transferred through the bypass, and wherein the conditional execution decision circuit judges whether the execution of the preceding instruction can be performed or not according to the value of the execution conditional field in the preceding instruction and the value of the general purpose flag obtained from the control register, and wherein the operation of the execution halt circuit and the bypass is controlled based on a control signal transferred from the data interference decision circuit, and wherein when the conditional execution decision circuit judges to cancel the execution of the preceding instruction, the conditional execution control circuit cancels the control signal indicating to halt the execution of the current instruction transferred from the execution halt circuit, and also cancels the control signal indicating to control the operation of the bypass for transferring the operation result of the preceding instruction to the different instruction execution unit to execute the current instruction. Hence, this makes it possible to have the effect to eliminate the penalty of a pipeline.

Furthermore, according to the present invention, the microprocessor having conditional execution instructions further comprises a flag interference decision circuit for judging whether a destination flag designation field of the preceding instruction is equal to a source flag designation field of the current instruction when the current instruction reads the operation result of the preceding instruction from a general purpose flag in the control registers before the preceding instruction writes this operation result to the general purpose flag in the control registers, wherein the execution halt circuit halts the execution of the current instruction until the operation result of the preceding instruction is written into the general purpose flag in the control registers, and wherein the conditional execution decision circuit judges whether the execution of the preceding instruction can be performed or not according to the value of the execution conditional field in the preceding instruction and the value of the general purpose flag in the control registers, and wherein the operation of the execution halt circuit is controlled based on a control signal transferred from the flag interference decision circuit, and wherein when the conditional execution decision circuit judges to cancel the execution of the preceding instruction, the conditional execution control circuit cancels the control signal indicating to halt the execution of the current instruction transferred from the execution halt circuit. Hence, this makes it possible to have the effect to eliminate the penalty of a pipeline.

Moreover, according to the present invention, the microprocessor having conditional execution instructions further comprises a flag interference decision circuit for judging whether a destination flag designation field of the preceding instruction is equal to a source flag designation field of the current instruction when the current instruction performs a conditional execution decision by using a general purpose flag in the control registers before the preceding instruction writes this operation result to the general purpose flag in the control registers, wherein the execution halt circuit halts the execution of the current instruction until the operation result of the preceding instruction is written into the general purpose flag in the control registers, and wherein the conditional execution decision circuit judges whether the execution of the preceding instruction can be performed or not according to the value of the execution conditional field in the preceding instruction and the value of the general purpose flag in the control registers, and wherein the operation of the execution halt circuit is controlled based on a control signal transferred from the flag interference decision circuit, and wherein when the conditional execution decision circuit judges to cancel the execution of the preceding instruction, the conditional execution control circuit cancels the control signal indicating to halt the execution of the current instruction transferred from the execution halt circuit. Hence, this makes it possible to have the effect to eliminate the penalty of a pipeline.

Furthermore, according to the present invention, the microprocessor having conditional execution instructions further comprises a mode flag decision circuit for detecting whether the preceding instruction is an instruction to update the value of the mode flag in the control registers when the preceding instruction updates the mode flag in the control registers, wherein the execution halt circuit halts the execution of the current instruction until the preceding instruction updates the value of the mode flag in the control registers, and wherein the conditional execution decision circuit judges whether the execution of the preceding instruction can be performed or not according to the conditional execution field in the preceding instruction and the value of the general purpose flag obtained from the control registers, and wherein the operation of the execution halt circuit is controlled based on a control signal transferred from the conditional execution decision circuit, and wherein when the conditional execution decision circuit judges to cancel the execution of the preceding instruction, the conditional execution control circuit cancels the control signal indicating to halt the execution of the current instruction transferred from the execution halt circuit. Hence, this makes it possible to have the effect to eliminate the penalty of a pipeline.

Moreover, according to the present invention, the microprocessor having conditional execution instructions further comprises a simultaneous use decision circuit for detecting whether or not sub-instructions in the preceding instruction use a data read/write pass simultaneously when the preceding instruction includes not less than two sub-instructions and when the sub-instructions are executed by using the data read/write pass simultaneously between the operation unit and the general purpose registers, and a collision avoidance circuit for halting the execution of one of the sub-instruction in order to avoid the simultaneous use of the data read/write pass in the execution of the sub-instructions, and wherein the execution halt circuit for halting the execution of the current instruction during a time period equal to a time for the halting of the execution of the sub-instruction, and wherein the conditional execution decision circuit judges whether or not the execution of the preceding instruction can be performed according to the conditional execution field in the preceding instruction and the value of the general purpose flag in the control registers, and wherein the operation of the collision avoidance circuit and the execution halt circuit is controlled based on a control signal transferred from the conditional execution decision circuit, and wherein when the conditional execution decision circuit judges to cancel the execution of the preceding instruction, and when the simultaneous use of the data read/write pass is not used, the conditional execution control circuit cancels the control signal indicating the execution of the sub-instruction in the preceding instruction transferred from the collision avoidance circuit and the control signal indicating to halt the execution of the current instruction transferred from the execution halt circuit. Hence, this makes it possible to have the effect to eliminate the penalty of a pipeline.

Moreover, according to the present invention, the microprocessor having conditional execution instructions having conditional execution instructions comprises an instruction decoder for decoding instructions including the conditional execution instructions each having a conditional execution field and an operation field, registers comprising a general purpose flag to which an execution condition of the conditional execution instruction is set, an instruction execution section for executing the instruction according to output from the instruction decoder, a plurality of general purpose registers for storing execution results of the instruction executions, and a bypass incorporated in the instruction execution section for bypassing the operation result of the instruction, that has been executed previously, stored in the registers without through the plurality of general purpose registers. In the microprocessor, the instruction decoder comprises a conditional execution decision section for judging whether or not conditional data set in the general purpose register flag is equal to a condition set in the execution conditional field and a bypass control section for controlling use of the bypass according to a decision result of the conditional execution decision section. Hence, this makes it possible to have the effect to execute the instruction efficiency even if the instruction using the bypass is executed after the execution of the conditional execution instruction without causing error operation and the penalty of a pipeline.

Still further, according to the present invention, the bypass control section incorporated in the microprocessor comprises a bypass decision section for judging whether or not a data interference occurs in pipelines of the instruction executed by the instruction execution section, and a register output control section for controlling data transfer operation of the registers through the bypass according to the decision result of the bypass decision section, the conditional execution control section comprises a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section controls the operation of the registers and the plurality of general purpose registers and bypass so that the data transfer through the registers and the bypass is halted and the data transfer through the general purpose registers is permitted according to the decision result transferred from the conditional execution decision section. Hence, this makes it possible to have the effect to execute the instruction efficiency even if the instruction using the bypass is executed after the execution of the conditional execution instruction without causing error operation and the penalty of a pipeline.

Furthermore, according to the present invention, the microprocessor having conditional execution instructions comprises an instruction decoder for decoding instructions including the conditional execution instructions each having a conditional execution field and an operation field, registers comprising a general purpose flag to which an execution condition of the conditional execution instruction is set, instruction execution sections for executing the instructions according to output from the instruction decoder, a plurality of general purpose registers for storing execution results of the instruction execution sections, a plurality of bypasses incorporated in the instruction execution sections for bypassing operation results of the instructions, that have been executed previously, stored in the registers, and a plurality of data passes for data transfer through the plurality of general purpose registers. In this microprocessor, the instruction decoder comprises a conditional execution decision section for judging whether or not a conditional data item set in the general purpose flag is equal to a condition set in the execution conditional field and a bypass control section for controlling data transfer through one of the plurality of bypasses and the plurality of data passes according to the decision of the conditional execution decision section. Hence, this makes it possible to have the effect to execute the instruction efficiency even if the instruction using the bypass is executed after the execution of the conditional execution instruction without causing error operation and the penalty of a pipeline.

Furthermore, according to the present invention, the bypass control section incorporated in the microprocessor comprises a bypass decision section for judging whether or not a data interference occurs in pipelines of the instructions executed by the instruction execution sections, and a register output control section for controlling data transfer operation of the registers through the bypasses according to the decision result of the bypass decision section, the conditional execution control section comprises a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section selects one of the plurality of bypasses and the data passes in order to perform the data transfer through the selected one according to the decision result transferred from the conditional execution decision section. Hence, this makes it possible to have the effect to execute the instruction efficiency even if the instruction using the bypass is executed after the execution of the conditional execution instruction without causing error operation and the penalty of a pipeline.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A microprocessor for executing conditional execution instructions, comprising:

a memory section comprising an instruction RAM for storing instructions including the conditional execution instructions forming a program and a data RAM for storing data;

an instruction decoder, connected to the memory section, for decoding the instructions;

control registers for storing information to control execution of the instructions;

a plurality of registers for storing the data;

an operation unit for performing arithmetic operations;

instruction execution units, connected to the instruction decoder, for executing a preceding instruction and a current instruction simultaneously and/or in parallel according to output from the instruction decoder;

an execution halt circuit for temporarily halting the further execution of the current instruction when a data hazard is detected between the preceding instruction and the current instruction in the program;

a conditional execution decision circuit for judging whether the current instruction is being executed or not; and a conditional execution control circuit for canceling the further execution of the preceding instruction when the conditional execution decision circuit judges that the current instruction is not being executed, so that the further execution of the current instruction is resumed.

2. A microprocessor for executing conditional execution instructions as claimed in claim 1, wherein the execution halt circuit halts the execution of the current instruction until a memory access completion signal indicating the completion of memory accessing is transferred from the memory section when the preceding instruction accesses the memory section which requires several clocks to transfer the memory access completion signal from the memory section, the operation of the conditional execution decision circuit is controlled according to the memory access completion signal transferred from the memory section, the conditional execution decision circuit decides whether to cancel the further execution of the preceding instruction according to a value of a conditional execution field in the current instruction and a value of a general purpose flag in the control registers, and the conditional execution control circuit cancels an access start signal to initiate the memory access operation of the preceding instruction when the conditional execution decision circuit decides to cancel the further execution of the preceding instruction.

3. A microprocessor for executing conditional execution instructions as claimed in claim 1, further comprising a data interference decision circuit for judging whether a destination register designation field of the preceding instruction is equal to a source register designation field of the current instruction when the current instruction reads an operation result of the preceding instruction from a general purpose register in the memory section before the preceding instruction writes the operation result to the general purpose register, and a bypass through which the operation result of the preceding instruction is directly transferred to the instruction execution units to execute the current instruction without passing through the general purpose register, and wherein the execution halt circuit halts the further execution of the current instruction until the operation result of the preceding instruction can be transferred through the bypass, and wherein the conditional execution decision circuit judges whether to cancel the further execution of the preceding instruction according to the value of a conditional execution field in the preceding instruction and a value of a general purpose flag obtained from the control registers, and wherein the operation of the execution halt circuit and the bypass are controlled based on control signals transferred from the data interference decision circuit, and wherein when the conditional execution decision circuit judges to cancel the further execution of the preceding instruction, the conditional execution control circuit cancels a control signal indicating to halt the further execution of the current instruction transferred from the execution halt circuit and also cancels a control signal indicating to control the operation of the bypass for transferring the operation result of the preceding instruction to the instruction execution units for the execution of the current instruction.

4. A microprocessor for executing condition execution instructions as claimed in claim 1, further comprising a data interference decision circuit for judging whether a destination register designation field of the preceding instruction is equal to a source register designation field of the current instruction when the current instruction reads an operation result of the preceding instruction from a general purpose register in the memory section before the preceding instruction writes the operation result to the general purpose register, wherein the execution halt circuit halts the further execution of the current instruction until the operation result of the preceding instruction is written into the general purpose register, and wherein the conditional execution decision circuit judges whether to cancel the further execution of the preceding instruction according to a value of a conditional execution field in the preceding instruction and a value of the general purpose flag obtained from the control registers, and wherein the operation of the execution halt circuit is controlled based on a control signal transferred from the data interference decision circuit, and wherein when the conditional execution decision circuit judges to cancel the further execution of the preceding instruction, the conditional execution control circuit cancels the control signal indicating to halt the further execution of the current instruction transferred from the execution halt circuit.

5. A microprocessor for executing conditional execution instructions as claimed in claim 1, further comprising a data interference decision circuit for judging whether a destination register designation field of the preceding instruction is equal to a source register designation field of the current instruction when the current instruction is executed by a different instruction execution unit and reads an operation result of the preceding instruction from a general purpose register in the memory section before the preceding instruction writes the operation result to the general purpose register, and a bypass through which the operation result of the preceding instruction is directly transferred to the different instruction execution unit to execute the current instruction without passing through the general purpose register, and wherein the execution halt circuit halts the further execution of the current instruction until the operation result of the preceding instruction can be transferred through the bypass, and wherein the conditional execution decision circuit judges whether to cancel the further execution of the preceding instruction according to the value of a conditional execution field in the preceding instruction and a value of a general purpose flag obtained from the control register, and wherein the operation of the execution halt circuit and the bypass are controlled based on control signals transferred from the data interference decision circuit, and wherein when the conditional execution decision circuit judges to cancel the further execution of the preceding instruction, the conditional execution control circuit cancels a control signal indicating to halt the further execution of the current instruction transferred from the execution halt circuit, and also cancels a control signal indicating to control the operation of the bypass for transferring the operation result of the preceding instruction to the different instruction execution unit for the execution of the current instruction.

6. A microprocessor for executing conditional execution instructions as claimed in claim 1, further comprising a flag interference decision circuit for judging whether a destination flag designation field of the preceding instruction is equal to a source flag designation field of the current instruction when the current instruction reads an operation result of the preceding instruction from a general purpose flag in the control registers before the preceding instruction writes the operation result to the general purpose flag in the control registers, wherein the execution halt circuit halts the further execution of the current instruction until the operation result of the preceding instruction is written into the general purpose flag in the control registers, and wherein the conditional execution decision circuit judges whether to cancel the further execution of the preceding instruction according to a value of a conditional execution field in the preceding instruction and a value of a general purpose flag in the control registers, and wherein the operation of the execution halt circuit is controlled based on a control signal transferred from the flag interference decision circuit, and wherein when the conditional execution decision circuit judges to cancel the further execution of the preceding instruction, the conditional execution control circuit cancels the control signal indicating to halt the execution of the current instruction transferred from the execution halt circuit.

7. A microprocessor for executing conditional execution instructions as claimed in claim 1, further comprising a flag interference decision circuit for judging whether a destination flag designation field of the preceding instruction is equal to a source flag designation field of the current instruction when the current instruction performs a conditional execution decision by using a general purpose flag in the control registers before the preceding instruction writes an operation result to a general purpose flag in the control registers, wherein the execution halt circuit halts the further execution of the current instruction until the operation result of the preceding instruction is written into the general purpose flag in the control registers, and wherein the conditional execution decision circuit judges whether to cancel the further execution of the preceding instruction according to a value of a conditional execution field in the preceding instruction and a value of the general purpose flag in the control registers, and wherein the operation of the execution halt circuit is controlled based on a control signal transferred from the flag interference decision circuit, and wherein when the conditional execution decision circuit judges to cancel the further execution of the preceding instruction, the conditional execution control circuit cancels the control signal indicating to halt the further execution of the current instruction transferred from the execution halt circuit.

8. A microprocessor for executing conditional execution instructions as claimed in claim 1, further comprising a mode flag decision circuit for detecting whether the preceding instruction to update a value of a mode flag in the control registers when the preceding instruction updates the mode flag in the control registers, wherein the execution halt circuit halts the further execution of the current instruction until the preceding instruction updates the value of the mode flag in the control registers, and wherein the conditional execution decision circuit judges whether to cancel the further execution of the preceding instruction according to a conditional execution field in the preceding instruction and a value of a general purpose flag obtained from the control registers, and wherein the operation of the execution halt circuit is controlled based on a control signal transferred from the conditional execution decision circuit, and wherein when the conditional execution decision circuit judges to cancel the further execution of the preceding instruction, the conditional execution control circuit cancels the control signal indicating to halt the further execution of the current instruction transferred from the execution halt circuit.

9. A microprocessor for executing conditional execution instructions as claimed in claim 1, further comprising:
a simultaneous use decision circuit for detecting whether or not sub-instructions in the preceding instruction use a data read/write pass simultaneously when the preceding instruction includes at least two sub-instructions and when the sub-instructions are executed by using the data read/write pass simultaneously between an operation unit and general purpose registers, and a collision avoidance circuit for halting the further execution of one of the sub-instructions in order to avoid the simultaneous use of the data read/write pass in the execution of the sub-instructions, and wherein the execution halt circuit for halting the further execution of the current instruction during a time period equal to a time for halting the execution of the sub-instruction, and wherein the conditional execution decision circuit judges whether or not to cancel the further execution of the preceding instruction according to a conditional execution field in the preceding instruction and a value of a general purpose flag in the control registers, and wherein the operation of the collision avoidance circuit and the execution halt circuit are controlled based on control signals transferred from the conditional execution decision circuit, and wherein when the conditional execution decision circuit judges to cancel the further execution of the preceding instruction and when the data read/write pass is not simultaneously used, the conditional execution control circuit cancels a control signal indicating the execution of the sub-instruction in the preceding instruction transferred from the collision avoidance circuit and a control signal indicating to halt the execution of the current instruction transferred from the execution halt circuit.

10. A microprocessor for executing conditional execution instructions, comprising:
an instruction decoder for decoding instructions including the conditional execution instructions, each instruction having a conditional execution field including a condition code and an operation field including an operation, said condition code indicating active and inactive conditions of said operation;

registers including a general purpose flag indicating an execution condition of the conditional execution instruction;

an instruction execution section for executing the instruction according to output from the instruction decoder;

a plurality of general purpose registers for storing execution results of the instruction executions; and a bypass incorporated in the instruction execution section for bypassing an operation result of a previously executed instruction stored in the registers, without passing through the plurality of general purpose registers, wherein the instruction decoder includes a conditional execution control section for determining a decision result based on whether the execution condition indicated by the general purpose flag is equal to an active condition indicated by said condition code and a bypass control section for controlling data transfer through the bypass according to the decision result of the conditional execution control section.

11. A microprocessor for executing conditional execution instructions as claimed in claim 10, wherein the bypass control section includes a bypass decision section for judging whether or not a data interference occurs in pipelines of the instruction executed by the instruction execution section, and a register output control section for controlling data transfer operation of the registers through the bypass according to the decision result of the bypass decision section, the conditional execution control section includes a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section controls the operation of the registers and the plurality of general purpose registers and bypass so that the data transfer through the registers and the bypass is halted and the data transfer through the general purpose registers is permitted according to the decision result transferred from the conditional execution decision section.

12. A microprocessor for executing conditional execution instructions, comprising:

an instruction decoder for decoding instructions including the conditional execution instructions, each instruction having a conditional execution field including a condition code and an operation field including an operation, said condition code indicating active and inactive conditions of said operation;

registers including a general purpose flag indicating an execution condition of the conditional execution instruction;

instruction execution sections for executing the instructions according to output from the instruction decoder;

a plurality of general purpose registers for storing execution results of the instruction sections;

a plurality of bypasses incorporated in the instruction execution sections for bypassing operation results of previously executed instructions stored in the registers, and a plurality of data passes for data transfer through the plurality of general purpose registers, wherein the instruction decoder includes a conditional execution control section for determining a decision result based on whether the execution condition indicated by the general purpose flag is equal to an active condition indicated by said condition code and a bypass control section for controlling data transfer through one of the plurality of bypasses and the plurality of data passes according to the decision result of the conditional execution control section.

13. A microprocessor for executing conditional execution instructions as claimed in claim 12, wherein the bypass control section includes a bypass decision section for judging whether or not a data interference occurs in pipelines of the instructions executed by the instruction execution sections, and a register output control section for controlling data transfer operation of the registers through the bypasses according to the decision result of the bypass decision section, the conditional execution control section includes a conditional execution decision section for judging whether the conditional execution instruction to be executed is active or inactive, and a general purpose register write control section for controlling write operation to the plurality of general purpose registers based on the decision result of the conditional execution decision section, and wherein even if the bypass decision section judges an occurrence of the data interference, the register output control section selects one of the plurality of bypasses and the data passes in order to perform the data transfer through the selected one according to the decision result transferred from the conditional execution decision section.

14. A microprocessor capable of executing a plurality of instruction pipelines simultaneously and/or in parallel, each instruction pipeline including a plurality of sequentially executable pipeline stages, said microprocessor comprising:

a data interference decision circuit for detecting the occurrence of a data hazard between a preceding instruction pipeline and a following instruction pipeline and for generating a pipeline interlock signal to stall the execution of remaining stages of the following instruction pipeline; and a conditional execution decision control circuit for generating a conditional execution cancel signal which cancels execution of all subsequent stages of the preceding instruction pipeline and cancels the pipeline interlock signal to execute the remaining stages of the following instruction pipeline.

15. The microprocessor as claimed in claim 14, further comprising a collision avoidance circuit which receives the pipeline interlock signal and generates a bypass selection signal to execute a bypass operation in order to avoid the detected data hazard and wherein the conditional execution cancel signal cancels the bypass selection signal.

16. The microprocessor as claimed in claim 14, further comprising a selector control circuit which receives the pipeline interlock signal and stalls the execution of the remaining stages of the following instruction pipeline.

17. The microprocessor as claimed in claim 15, further comprising a selector control circuit which receives the pipeline interlock signal and stalls the execution of the remaining stages of the following instruction pipeline.

18. A microprocessor capable of executing a plurality of instruction pipelines simultaneously and/or in parallel, each instruction pipeline including a plurality of sequentially executable pipeline stages, said microprocessor comprising:

data interference decision means for detecting the occurrence of a data hazard between a preceding instruction pipeline and a following instruction pipeline and for generating a pipeline interlock signal to stall the execution of remaining stages of the following instruction pipeline; and conditional execution decision control means for executing the remaining stages of the following instruction pipeline by canceling execution of all subsequent stages of the preceding instruction pipeline and canceling the pipeline interlock signal.

19. The microprocessor as claimed in claim 18, further comprising collision avoidance means for receiving the pipeline interlock signal and generating a bypass selection signal to execute a bypass operation in order to avoid the detected data hazard, and wherein the conditional execution cancel signal cancels the bypass selection signal.

* * * * *